(12) United States Patent
Chen et al.

(10) Patent No.: US 11,004,209 B2
(45) Date of Patent: May 11, 2021

(54) METHODS AND SYSTEMS FOR APPLYING COMPLEX OBJECT DETECTION IN A VIDEO ANALYTICS SYSTEM

(71) Applicant: QUALCOMM Incorporated, San Diego, CA (US)

(72) Inventors: Ying Chen, San Diego, CA (US); Yang Zhou, San Jose, CA (US); Karthik Nagarajan, Poway, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 16/158,079

(22) Filed: Oct. 11, 2018

(65) Prior Publication Data

US 2019/0130580 A1    May 2, 2019

Related U.S. Application Data

(60) Provisional application No. 62/577,493, filed on Oct. 26, 2017, provisional application No. 62/578,884, (Continued)

(51) Int. Cl.
*G06T 7/20* (2017.01)
*G06T 7/246* (2017.01)
(Continued)

(52) U.S. Cl.
CPC ............ *G06T 7/20* (2013.01); *G06K 9/00711* (2013.01); *G06K 9/2054* (2013.01); *G06K 9/346* (2013.01);
(Continued)

(58) Field of Classification Search
None
See application file for complete search history.

(56) References Cited

U.S. PATENT DOCUMENTS 9,165,369 B1 * 10/2015 Zhang .................... G06K 9/628
9,424,493 B2 *  8/2016 He ......................... G06K 9/6255
(Continued)

OTHER PUBLICATIONS

J. Hosang, R. Benenson and B. Schiele, "Learning Non-maximum Suppression," 2017 IEEE Conference on Computer Vision and Pattern Recognition (CVPR), Honolulu, HI, May 2017, pp. 6469-6477, doi: 10.1109/CVPR.2017.685 (Year: 2017).*
(Continued)

*Primary Examiner* — Andrae S Allison
(74) *Attorney, Agent, or Firm* — QUALCOMM Incorporated

(57) ABSTRACT

Techniques and systems are provided for tracking objects in one or more video frames. For example, a first set of one or more bounding regions are determined for a video frame based on a trained classification network applied to the video frame. The first set of one or more bounding regions are associated with one or more objects in the video frame. One or more blobs can be detected for the video frame. A blob includes pixels of at least a portion of an object in the video frame. A second set of one or more bounding regions are determined for the video frame that are associated with the one or more blobs. A final set of one or more bounding regions is determined for the video frame using the first set of one or more bounding regions and the second set of one or more bounding regions. Object tracking can then be performed for the video frame using the final set of one or more bounding regions.

30 Claims, 41 Drawing Sheets

Related U.S. Application Data filed on Oct. 30, 2017, provisional application No. 62/578,977, filed on Oct. 30, 2017.

(51) Int. Cl.
  *G06K 9/00* (2006.01)
  *G06K 9/20* (2006.01)
  *G06K 9/34* (2006.01)
  *G06K 9/62* (2006.01)

(52) U.S. Cl.
  CPC ............ *G06K 9/6267* (2013.01); *G06T 7/246* (2017.01); *G06T 2207/10016* (2013.01); *G06T 2207/20084* (2013.01)

(56) References Cited

U.S. PATENT DOCUMENTS

| | | | |
|---|---|---|---|
| 2013/0259302 A1* | 10/2013 | Huang | G06T 7/246 382/103 |
| 2014/0003725 A1* | 1/2014 | Kawano | G06T 7/187 382/203 |
| 2014/0254863 A1 | 9/2014 | Marks et al. | |
| 2016/0171311 A1 | 6/2016 | Case et al. | |
| 2016/0171852 A1* | 6/2016 | Lin | G06K 9/00771 382/103 |
| 2016/0180195 A1* | 6/2016 | Martinson | G06K 9/6202 382/103 |
| 2016/0189378 A1* | 6/2016 | Ozaki | G06K 9/00127 382/134 |
| 2017/0147905 A1* | 5/2017 | Huang | G06K 9/6232 |
| 2018/0046865 A1* | 2/2018 | Chen | G06K 9/00771 |
| 2018/0047171 A1* | 2/2018 | Chen | G06T 7/13 |
| 2018/0089505 A1* | 3/2018 | El-Khamy | G06T 7/73 |
| 2018/0285647 A1* | 10/2018 | Chen | G06K 9/00718 |

OTHER PUBLICATIONS

Sermanet, et al.," OverFeat: Integrated recognition, localization and detection using convolutional networks," ICLR, 2014; Simonyan, et al., "Very Deep Convolutional Networks for Large-Scale Image Recognition," arxiv 1409.1556, 2014, hereinafter, "Simonyan 2014." (Year: 2014).*

F. Liang, S. Yang, T. Mai and Y. Yang, "The Design of Objects Bounding Boxes Non-Maximum Suppression and Visualization Module Based on FPGA," 2018 IEEE 23rd International Conference on Digital Signal Processing (DSP), Shanghai, China, 2018, pp. 1-5, doi: 10.1109/ICDSP.2018.8631668. (Year: 2018).*

S. Ren, K. He, R. Girshick, and J. Sun. Faster R-CNN: Towards real-time object detection with region proposal networks. In NIPS, 2015. (Year: 2015).*

International Search Report and Written Opinion—PCT/US2018/055544—ISA/EPO—dated Feb. 5, 2019.

Redmon J., et al., "You Only Look Once: Unified, Real-Time Object Detection", Proceedings of the 2016 IEEE Conference on Computer Vision and Pattern Recognition, IEEE, Jun. 27, 2016 (Jun. 27, 2016). pp. 779-788, XP033021255, DOI: 10.1109/CVPR.2016.91, [retrieved on Dec. 9, 2016], cited in the application, Sections 2. 3. 4.1.

Sermanet P et al., "OverFeat: Integrated Recognition, Localization and Detection using Convolutional Networks", Dec. 21, 2013 (Dec. 21, 2013). XP055545560, 16 Pages, Retrieved from the Internet: URL:https://arxiv.org/pdf/1312.6229.pdf [retrieved on Jan. 22, 2019], cited in the application, Sections 3.3.4-5.

Simonyan K., et al., "Very Deep Convolutional Networks for Large-Scale Image Recognition", Sep. 4, 2014, XP055270857, Retrieved from the Internet: URL:http://arxiv.org/pdf/1409.1556v6.pdf [retrieved on May 6, 2016], cited in the application, Sections 4.2A, 14 pages.

* cited by examiner

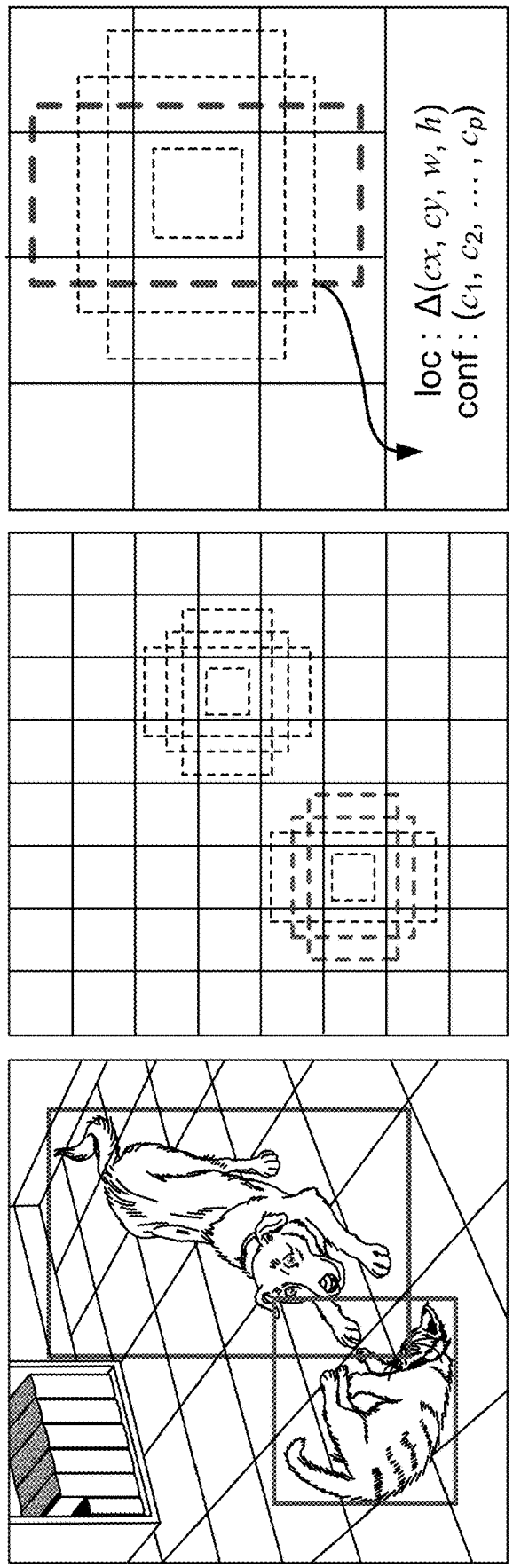

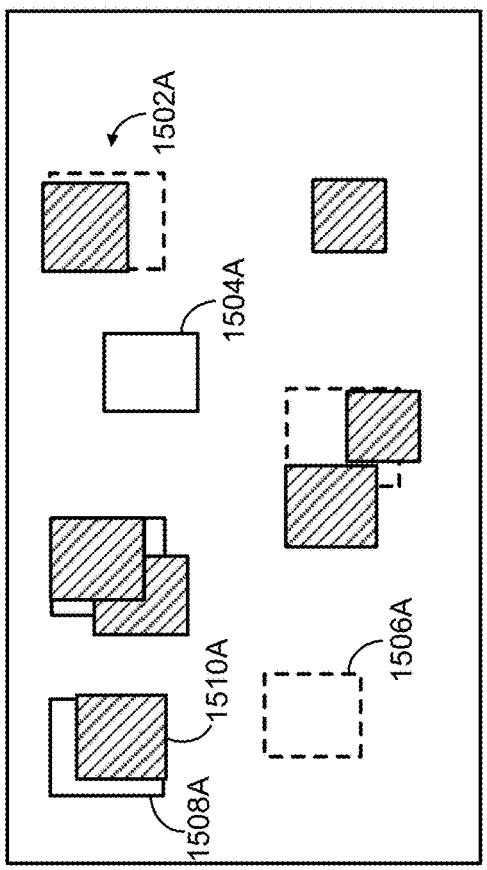
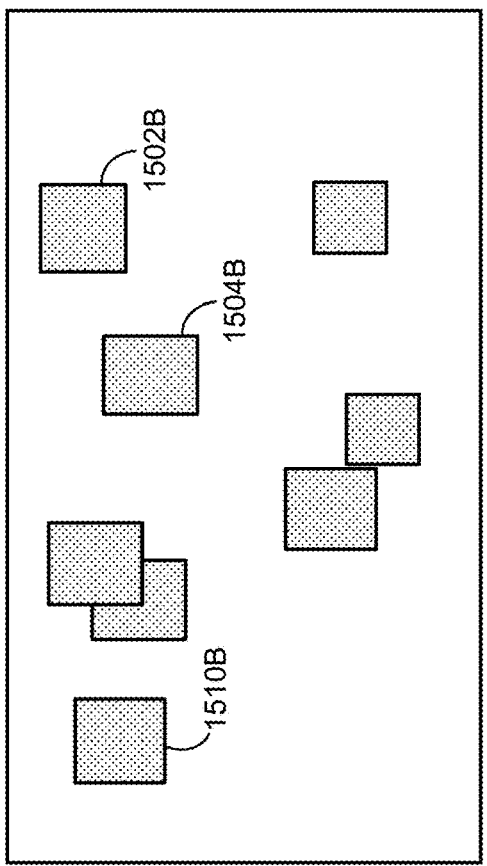
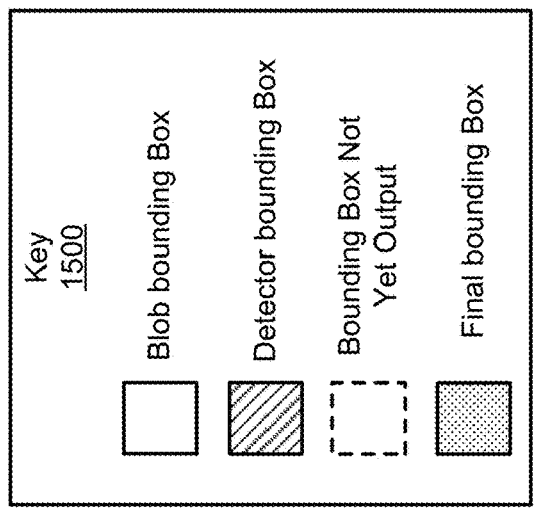
FIG. 15A
FIG. 15B

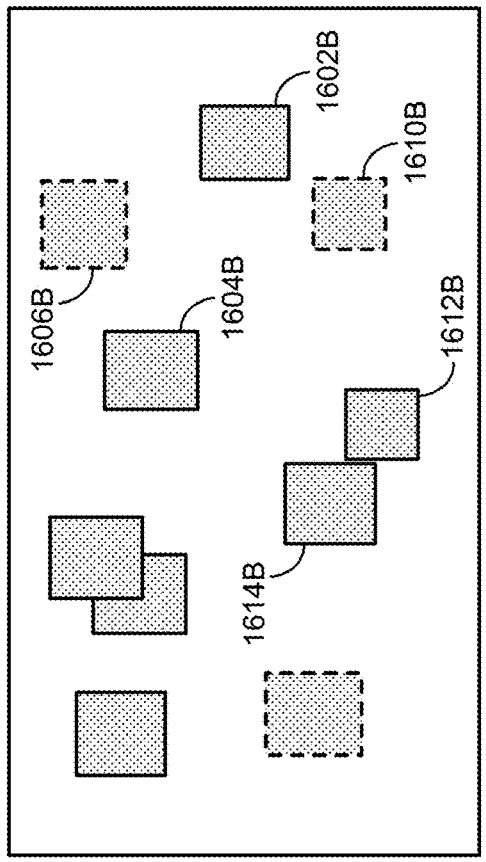
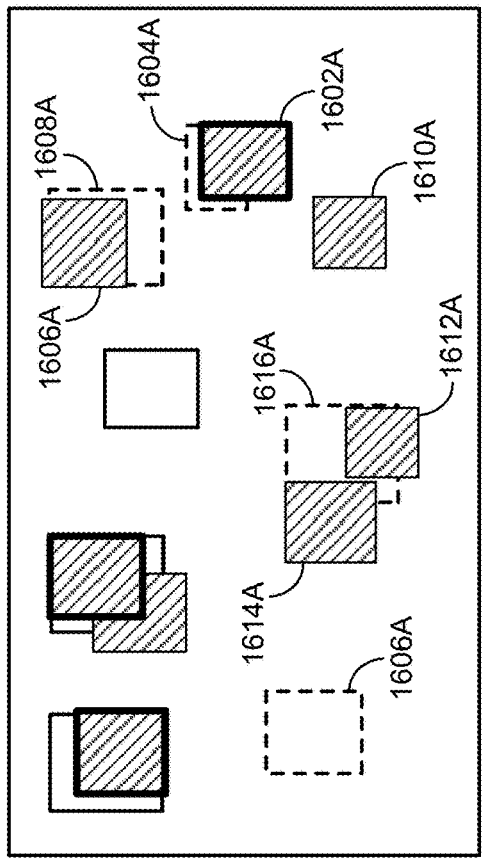
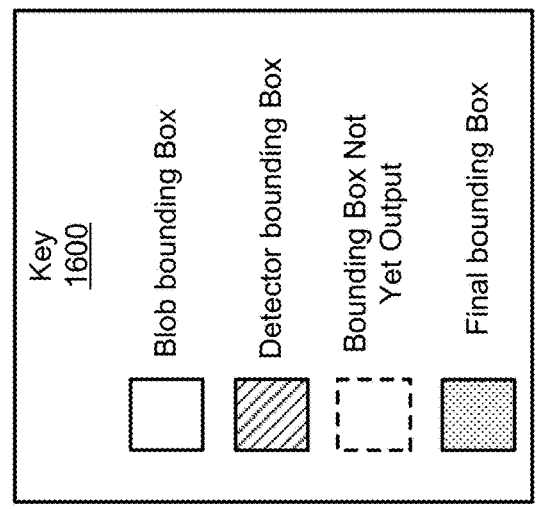
FIG. 16A
FIG. 16B

1800

DETERMINE A FIRST SET OF ONE OR MORE BOUNDING REGIONS FOR A VIDEO FRAME BASED ON A TRAINED CLASSIFICATION NETWORK APPLIED TO THE VIDEO FRAME, WHEREIN THE FIRST SET OF ONE OR MORE BOUNDING REGIONS ARE ASSOCIATED WITH ONE OR MORE OBJECTS IN THE VIDEO FRAME
1802

DETECT ONE OR MORE BLOBS FOR THE VIDEO FRAME, WHEREIN A BLOB INCLUDES PIXELS OF AT LEAST A PORTION OF AN OBJECT IN THE VIDEO FRAME
1804

DETERMINE A SECOND SET OF ONE OR MORE BOUNDING REGIONS FOR THE VIDEO FRAME, WHEREIN THE SECOND SET OF ONE OR MORE BOUNDING REGIONS ARE ASSOCIATED WITH THE ONE OR MORE BLOBS
1806

DETERMINE A FINAL SET OF ONE OR MORE BOUNDING REGIONS FOR THE VIDEO FRAME USING THE FIRST SET OF ONE OR MORE BOUNDING REGIONS AND THE SECOND SET OF ONE OR MORE BOUNDING REGIONS
1808

PERFORM OBJECT TRACKING FOR THE VIDEO FRAME USING THE FINAL SET OF ONE OR MORE BOUNDING REGIONS
1810

OBTAIN A SET OF ONE OR MORE DETECTOR BOUNDING REGIONS FOR A VIDEO FRAME, THE SET OF ONE OR MORE DETECTOR BOUNDING REGIONS BEING BASED ON APPLICATION OF AN OBJECT DETECTOR TO ONE OR MORE VIDEO FRAMES, WHEREIN THE SET OF ONE OR MORE DETECTOR BOUNDING REGIONS ARE ASSOCIATED WITH ONE OR MORE OBJECTS IN THE VIDEO FRAME
3102

↓

DETECT ONE OR MORE BLOBS FOR THE VIDEO FRAME, WHEREIN A BLOB INCLUDES PIXELS OF AT LEAST A PORTION OF AN OBJECT IN THE VIDEO FRAME
3104

↓

DETERMINE A SET OF ONE OR MORE FOREGROUND BOUNDING REGIONS FOR THE VIDEO FRAME, THE SET OF ONE OR MORE FOREGROUND BOUNDING REGIONS BEING ASSOCIATED WITH THE ONE OR MORE BLOBS
3106

↓

DETERMINE ONE OR MORE ASSOCIATIONS BETWEEN THE SET OF ONE OR MORE DETECTOR BOUNDING REGIONS AND THE SET OF ONE OR MORE FOREGROUND BOUNDING REGIONS
3108

↓

DETERMINE ONE OR MORE STATES OF THE ONE OR MORE ASSOCIATIONS
3110

↓

DETERMINE, BASED ON THE DETERMINED ONE OR MORE STATES, A FINAL SET OF ONE OR MORE BOUNDING REGIONS FOR THE VIDEO FRAME USING THE SET OF ONE OR MORE DETECTOR BOUNDING REGIONS AND THE SET OF ONE OR MORE FOREGROUND BOUNDING REGIONS
3112

↓

PERFORMING OBJECT TRACKING FOR THE VIDEO FRAME USING THE FINAL SET OF ONE OR MORE BOUNDING REGIONS
3114

FIG. 31

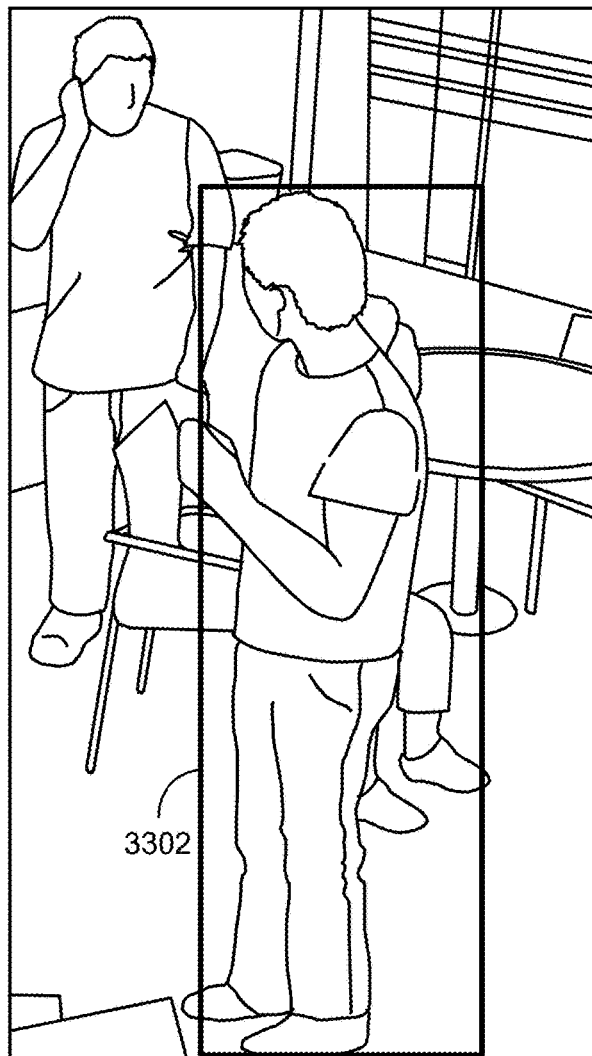
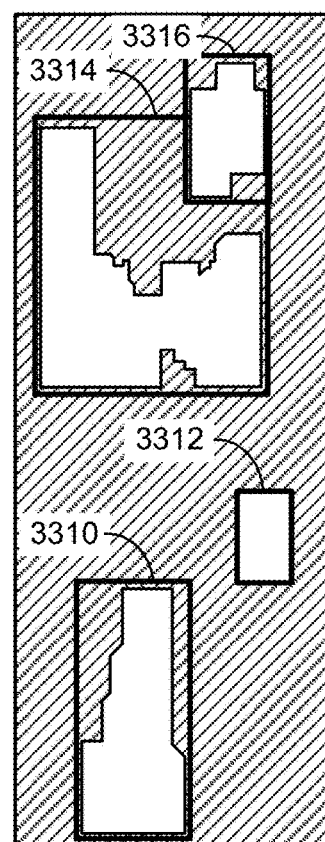
FIG. 33A  FIG. 33B

4600

OBTAIN A SET OF DETECTOR BOUNDING REGIONS FOR A VIDEO FRAME, THE SET OF DETECTOR BOUNDING REGIONS BEING BASED ON APPLICATION OF AN OBJECT DETECTOR TO ONE OR MORE VIDEO FRAMES, WHEREIN THE SET OF DETECTOR BOUNDING REGIONS ARE ASSOCIATED WITH TRACKERS FOR TRACKING ONE OR MORE OBJECTS IN THE VIDEO FRAME
4602

↓

GROUP THE SET OF DETECTOR BOUNDING REGIONS INTO AT LEAST A FIRST GROUP OF BOUNDING REGIONS AND A SECOND GROUP OF BOUNDING REGIONS
4604

↓

DETECT ONE OR MORE BLOBS FOR THE VIDEO FRAME
4606

↓

DETERMINE A SET OF ONE OR MORE FOREGROUND BOUNDING REGIONS FOR THE VIDEO FRAME, THE SET OF ONE OR MORE FOREGROUND BOUNDING REGIONS BEING ASSOCIATED WITH THE ONE OR MORE BLOBS, WHEREIN A BLOB INCLUDES PIXELS OF AT LEAST A PORTION OF AN OBJECT IN THE VIDEO FRAME
4608

↓

ADD AT LEAST ONE FOREGROUND BOUNDING REGION FROM THE SET OF ONE OR MORE FOREGROUND BOUNDING REGIONS TO THE FIRST GROUP
4610

↓

MODIFY A FIRST DETECTOR BOUNDING REGION FROM THE FIRST GROUP BASED ON A FIRST FOREGROUND BOUNDING REGION FROM THE FIRST GROUP
4612

↓

PERFORM OBJECT TRACKING FOR AN OBJECT IN THE VIDEO FRAME USING THE MODIFIED FIRST DETECTOR BOUNDING REGION
4614

FIG. 46

METHODS AND SYSTEMS FOR APPLYING COMPLEX OBJECT DETECTION IN A VIDEO ANALYTICS SYSTEM

CROSS-REFERENCE TO RELATED APPLICATIONS

This application claims the benefit of U.S. Provisional Application No. 62/577,493, filed Oct. 26, 2017, the benefit of U.S. Provisional Application No. 62/578,884, filed Oct. 30, 2017, and the benefit of U.S. Provisional Application No. 62/578,977, filed Oct. 30, 2017, all of which are hereby incorporated by reference, in their entirety and for all purposes.

FIELD

The present disclosure generally relates to video analytics for detecting and tracking objects, and more specifically to techniques and systems for detecting and tracking objects in images by applying complex object detection in a video analytics system.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption. In some cases, the video data can also be processed by the devices and systems themselves.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. The system with the video analytics can be on a camera device and/or on a server. In some cases, video analytics system can send alerts or alarms for certain events of interest. More advanced video analytics is needed to provide efficient and robust video sequence processing.

BRIEF SUMMARY

In some examples, techniques and systems are described for detecting and tracking objects in images by applying a hybrid video analytics system. In some examples, techniques and systems are described for determining final sets of bounding regions for use in a hybrid video analytics system that performs object detection. The complex object detection combines blob detection and deep learning to more accurately detect objects in the images. For example, a blob detection component of a video analytics system can use image data from one or more video frames to generate or identify blobs for the one or more video frames. A blob represents at least a portion of one or more objects in a video frame (also referred to as a "picture"). Blob detection can utilize background subtraction to determine a background portion of a scene and a foreground portion of scene. Blobs can then be detected based on the foreground portion of the scene. Blob bounding regions (e.g., bounding boxes or other bounding region) can be associated with the blobs, in which case a blob and a blob bounding region can be used interchangeably. A blob bounding region is a shape surrounding a blob, and can be used to represent the blob.

The hybrid video analytics system can apply a complex object detector to detect (e.g., classify and/or localize) objects in some of the video frames. In some cases, the complex object detector can be part of a deep learning system and can apply a trained classification network. For instance, the complex object detector can apply a deep learning network (also referred to as deep networks and deep neural networks) to identify objects in a video frame based on past information about similar objects that the detector has learned based on training data (e.g., training data can include images of objects used to train the system). Any suitable type of deep learning network can be used, including convolutional neural networks (CNNs), autoencoders, deep belief nets (DBNs), Recurrent Neural Networks (RNNs), among others. One illustrative example of a deep learning network detector that can be used includes a single-shot object detector (SSD). Another illustrative example of a deep learning network detector that can be used includes a You only look once (YOLO) detector. Any other suitable deep network-based detector can be used.

In some cases, the hybrid video analytics system can apply the complex object detector at a very low frequency, while background subtraction based blob detection can be performed for the majority of the frames. For example, the complex object detector can apply neural network-based object detection (e.g., using a trained network) every N frames, with N being determined based on the delay required to process a frame using the deep learning network and the frame rate of the video sequence. Each frame for which the complex object detector is applied is referred to as a key frame. For other frames (non-key frames), blob detection is applied without also applying the complex object detector. An object classified by the complex object detector can be localized using a bounding region (e.g., a bounding box or other bounding region) representing the classified object. A bounding region generated using the complex object detector is referred to herein as a detector bounding region or a high confidence bounding region. Once a tracker has at least one bounding region that is a high confidence bounding region detected in a key frame, in the subsequent frames, the tracker is referred to herein as a high confidence tracker.

The blob bounding regions (from blob detection) and the detector bounding regions (from the deep learning system) can be generated for a same video frame, and can be analyzed to determine a final set of bounding regions for the video frame and, in some cases, a status for each of the bounding regions in the final set of bounding regions.

In some examples, the high confidence bounding regions and the foreground bounding regions can be associated with one another based on spatial relationships between the different bounding regions. Different types or categories of associations can be determined between the high confidence bounding regions and the foreground bounding regions. For example, the association types can include normal associations, merge associations, split associations, absorbed or lost associations, and non-detected associations. A final bounding region can be determined differently based on the different types of associations. Each of the bounding regions in the final set of bounding regions can represent a blob detected for the video frame.

The final set of bounding regions determined for a video frame (representing blobs in the video frame) can be provided, for example, for blob processing, object tracking, and other video analytics functions. For example, temporal information of the blobs can be used to identify stable objects or blobs so that a tracking layer can be established. Object tracking can be performed to track the detected blobs and the objects represented by the blobs. The final set of bounding regions (e.g., bounding boxes or other bounding region) can be maintained by the video analytics system and can be associated with trackers and tracked blobs. For example, a final bounding region can be displayed as tracking a tracked blob when certain conditions are met (e.g., the blob has been tracked for a certain number of frames, a certain period of time, and/or other suitable conditions). In some cases, a blob bounding region for a blob being tracked by a tracker can be used as the tracker bounding region.

In some examples, techniques and systems are also described for tracking objects in crowd scenes using a hybrid video analytics system that performs object detection. For example, in some cases, a hybrid video analytics system can encounter issues when the scene being analyzed for object detection and tracking is a crowd scene with many crowded objects. For example, when objects in the crowded scene start to merge into each other (e.g., people, cars, and/or other objects come close together and/or overlap in the scene), the background subtraction results may be very inconsistent such that the detected and tracked blobs may not accurately represent the real objects in the scene. Such inconsistencies can be caused by various situations that are common in a crowded scene. For example, blobs of multiple objects may already be connected to one another and thus can be merged into one blob. In another example, an object can be static or have relatively slow motion in a crowded scene, in which case, after blob detection, there may be multiple separated blobs corresponding to the object due to background subtraction detecting part of the object as background. In some cases, the problems associated with a crowded scene can occur even more frequently for indoor scenes (e.g., in a home security scenario and/or other suitable indoor application), where distances from the one or more cameras are typically shorter than in outdoor scenes.

The techniques and systems related to crowd scenes operate to consistently and accurately track objects in a crowded scene. For example, the high confidence (or detector) bounding regions of the high confidence trackers and the foreground bounding regions (from blob detection) for a video frame can be grouped into groups or regions. A group can be analyzed to determine whether to modify or bypass one or more of the high confidence bounding boxes in the group. In some cases, one or more of the high confidence bounding regions in the group can be modified based on one or more associated foreground bounding regions in the group. In some cases, such crowd-based tracking techniques are performed only for non-key frames. However, the crowd-based tracking techniques can also be applied to key frames in some instances.

According to at least one example, a method of tracking objects in one or more video frames is provided. The method includes determining a first set of one or more bounding regions for a video frame based on a trained classification network applied to the video frame. The first set of one or more bounding regions are associated with one or more objects in the video frame. The method further includes detecting one or more blobs for the video frame. A blob includes pixels of at least a portion of an object in the video frame. The method further includes determining a second set of one or more bounding regions for the video frame. The second set of one or more bounding regions are associated with the one or more blobs. The method further includes determining a final set of one or more bounding regions for the video frame using the first set of one or more bounding regions and the second set of one or more bounding regions. The method further includes performing object tracking for the video frame using the final set of one or more bounding regions.

In another example, an apparatus for tracking objects in one or more video frames is provided that includes a memory configured to store video data and a processor. The processor is configured to and can determine a first set of one or more bounding regions for a video frame based on a trained classification network applied to the video frame. The first set of one or more bounding regions are associated with one or more objects in the video frame. The processor is further configured to and can detect one or more blobs for the video frame. A blob includes pixels of at least a portion of an object in the video frame. The processor is further configured to and can determine a second set of one or more bounding regions for the video frame. The second set of one or more bounding regions are associated with the one or more blobs. The processor is further configured to and can determine a final set of one or more bounding regions for the video frame using the first set of one or more bounding regions and the second set of one or more bounding regions. The processor is further configured to and can perform object tracking for the video frame using the final set of one or more bounding regions.

In another example, a non-transitory computer-readable medium is provided that has stored thereon instructions that, when executed by one or more processors, cause the one or more processor to: determining a first set of one or more bounding regions for a video frame based on a trained classification network applied to the video frame, wherein the first set of one or more bounding regions are associated with one or more objects in the video frame; detecting one or more blobs for the video frame, wherein a blob includes pixels of at least a portion of an object in the video frame; determining a second set of one or more bounding regions for the video frame, wherein the second set of one or more bounding regions are associated with the one or more blobs; determining a final set of one or more bounding regions for the video frame using the first set of one or more bounding regions and the second set of one or more bounding regions; and performing object tracking for the video frame using the final set of one or more bounding regions.

In another example, an apparatus for tracking objects in one or more video frames is provided. The apparatus includes means for determining a first set of one or more bounding regions for a video frame based on a trained classification network applied to the video frame. The first set of one or more bounding regions are associated with one or more objects in the video frame. The apparatus further includes means for detecting one or more blobs for the video frame, and means for determining a second set of one or more bounding regions for the video frame. The second set of one or more bounding regions are associated with the one or more blobs. A blob includes pixels of at least a portion of an object in the video frame. The apparatus further includes means for determining a final set of one or more bounding regions for the video frame using the first set of one or more bounding regions and the second set of one or more bounding regions. The apparatus further includes means for performing object tracking for the video frame using the final set of one or more bounding regions.

In some aspects, the video frame is part of a sequence of video frames capturing images of a scene. In such aspects, the blob detection is performed for each video frame of the sequence to detect one or more blobs in each video frame, and the trained classification network is applied to less than all video frames of the sequence of video frames.

In some aspects, a bounding region of the first set of one or more bounding regions is associated with an object classification, the object classification indicating a category of an object associated with the bounding region. In some cases, the bounding region of the first set of one or more bounding regions is associated with a confidence level. The confidence level indicates a likelihood that the object associated with the bounding region includes the category.

In some aspects, the methods, apparatuses, and computer-readable medium described above further comprise: identifying an object classification associated with a bounding region of the first set of one or more bounding regions, the object classification indicating a category of an object associated with the bounding region; determining the category of the object is not a category of interest; and removing the bounding region from the first set of one or more bounding regions in response to determining the category of the object is not a category of interest.

In some aspects, the methods, apparatuses, and computer-readable medium described above further comprise: determining an overlapping region between a first bounding region of the first set of one or more bounding regions and a second bounding region of the second set of one or more bounding regions; determining an area of the first bounding region or the second bounding region within the overlapping region is greater than an overlapping threshold; and determining the first bounding region is associated with the second bounding region in response to determining the area of the first bounding region or the second bounding region within the overlapping region is greater than the overlapping threshold.

In some aspects, determining the final set of one or more bounding regions includes:

determining a bounding region of the second set of one or more bounding regions is not associated with any bounding regions of the first set of one or more bounding regions; and excluding the bounding region from the final set of one or more bounding regions in response to determining the bounding region is not associated with any bounding regions of the first set of one or more bounding regions. In some cases, the bounding region is removed from the second set of one or more bounding regions only when a high confidence scenario is determined to be present. In some examples, a high confidence scenario is determined to be present when an indoor scene is captured by the video frame or when objects of interest in the scene are larger than a threshold size.

In some aspects, the methods, apparatuses, and computer-readable medium described above further comprise: determining a confidence value associated with a bounding region of the first set of one or more bounding regions is above a confidence threshold; and determining that, during object tracking for the video frame, a tracker associated with the bounding region will be output in response to determining the confidence value associated with the bounding region is above the confidence threshold.

In some aspects, determining the final set of one or more bounding regions includes: determining a confidence value associated with a first bounding region of the first set of one or more bounding regions is above a confidence threshold; determining a second bounding region of the second set of one or more bounding regions that is associated with the first bounding region of the first set of one or more bounding regions; and excluding the second bounding region from the final set of one or more bounding regions in response to determining the confidence value associated with the first bounding region is above the confidence threshold.

In some aspects, determining the final set of one or more bounding regions includes: determining a confidence value associated with a bounding region of the first set of one or more bounding regions is below a confidence threshold; determining the bounding region is associated with at least one bounding region of the second set of one or more bounding regions; and adding the bounding region to the final set of one or more bounding regions in response to determining the bounding region is associated with at least one bounding region of the second set of one or more bounding regions.

In some aspects, determining the final set of one or more bounding regions includes: determining a confidence value associated with a bounding region of the first set of one or more bounding regions is below a confidence threshold; determining the bounding region is not associated with any bounding regions of the second set of one or more bounding regions; and excluding the bounding region from the final set of one or more bounding regions in response to determining the bounding region is not associated with any bounding regions of the second set of one or more bounding regions. In some examples, the bounding region is excluded from the final set of one or more bounding regions only when a low confidence scenario is determined to be present. In some cases, a low confidence scenario is determined to be present when an outdoor scene is captured by the video frame or when objects of interest in the scene are smaller than a threshold size.

In some aspects, determining the final set of one or more bounding regions includes: determining a confidence value associated with a bounding region of the first set of one or more bounding regions is below a confidence threshold; determining the bounding region is not associated with any bounding regions of the second set of one or more bounding regions; and adding the bounding region to the final set of one or more bounding regions. In such aspects, the methods, apparatuses, and computer-readable medium described above further comprise determining that, during object tracking for the video frame, a tracker associated with the first bounding region will not be immediately output in response to determining the bounding region is not associated with any bounding regions of the second set of one or more bounding regions.

In some aspects, determining the final set of one or more bounding regions includes: determining a bounding region of the second set of one or more bounding regions is associated with at least two bounding regions of the first set of one or more bounding regions; and adding the at least two bounding regions to the final set of one or more bounding regions in response to determining the bounding region is associated with at least two bounding regions of the first set of one or more bounding regions. In such aspects, the methods, apparatuses, and computer-readable medium described above further comprise determining that, during object tracking for the video frame, trackers associated with the at least two bounding regions will be output.

In some aspects, determining the final set of one or more bounding regions includes: determining a bounding region of the second set of one or more bounding regions is associated with at least one bounding region of the first set of one or more bounding regions; and determining first bounding region is associated with a true positive object in response to determining the bounding region is associated with at least one bounding region of the first set of one or more bounding regions. In such aspects, the methods, apparatuses, and computer-readable medium described above further comprise replacing the bounding region with the at least one bounding region of the first set of one or more bounding regions.

In some aspects, determining the final set of one or more bounding regions includes: determining a bounding region of the second set of one or more bounding regions is not associated with any bounding regions of the first set of one or more bounding regions; and adding the bounding region to the final set of one or more bounding regions. In some cases, the bounding region is added to the final set of one or more bounding regions only when a low confidence scenario is determined to be present. In some examples, a low confidence scenario is determined to be present when an outdoor scene is captured by the video frame or when objects of interest in the scene are smaller than a threshold size.

In some aspects, the methods, apparatuses, and computer-readable medium described above further comprise: obtaining a subsequent video frame, the subsequent video frame being obtained later in time than the video frame, wherein the trained classification network is not applied to the subsequent video frame; determining, for the subsequent video frame, an associated bounding region is not detected for a bounding region of the first set of one or more bounding regions determined for the video frame; and maintaining, for the subsequent video frame, the bounding region of the first set of one or more bounding region determined for the video frame.

In some aspects, the methods, apparatuses, and computer-readable medium described above further comprise: obtaining a subsequent video frame, the subsequent video frame being obtained later in time than the video frame, wherein the trained classification network is not applied to the subsequent video frame; determining a bounding region determined for the subsequent video frame is associated with at least two bounding regions of the first set of one or more bounding regions determined for the video frame; and splitting the bounding region into the at two bounding regions for the subsequent video frame.

In some aspects, the methods, apparatuses, and computer-readable medium described above further comprise: grouping the first set of one or more bounding regions into at least a first group of bounding regions and a second group of bounding regions; adding at least one bounding region from the second set of one or more bounding regions to the first group; modifying a first bounding region from the first group based on a second bounding region from the first group, the second bounding region being from the added at least one bounding region from the second set of one or more bounding regions; and performing object tracking for an object in the video frame using the modified first bounding region.

In some aspects, modifying the first bounding region from the first group based on the second bounding region from the first group includes shifting a location of the first bounding region to align with a location of the second bounding region.

In some aspects, grouping the first set of one or more bounding regions into at least the first group and the second group comprises: determining a spatial relationship between at least two bounding regions from the first set of one or more bounding regions; and grouping the at least two bounding regions into the first group of bounding regions based on the spatial relationship.

In some aspects, the spatial relationship includes an amount of overlap between the at least two bounding regions. For example, the at least two bounding regions are grouped into the first group of bounding regions when the at least two bounding regions overlap.

According to at least one other example, a method of tracking objects in a sequence of video frames is provided. The method includes obtaining a set of one or more detector bounding regions for a video frame. The set of one or more detector bounding regions are based on application of an object detector to one or more video frames. The set of one or more detector bounding regions are associated with one or more objects in the video frame. The method further includes detecting one or more blobs for the video frame. A blob includes pixels of at least a portion of an object in the video frame. The method further includes determining a set of one or more foreground bounding regions for the video frame. The set of one or more foreground bounding regions are associated with the one or more blobs. The method further includes determining one or more associations between the set of one or more detector bounding regions and the set of one or more foreground bounding regions. The method further includes determining one or more states of the one or more associations. The method further includes determining, based on the determined one or more states, a final set of one or more bounding regions for the video frame using the set of one or more detector bounding regions and the set of one or more foreground bounding regions. The method further includes performing object tracking for the video frame using the final set of one or more bounding regions.

In another example, an apparatus for tracking objects in a sequence of video frames is provided that includes a memory configured to store one or more video frames of the sequence of video frames and a processor. The processor is configured to and can obtain a set of one or more detector bounding regions for a video frame. The set of one or more detector bounding regions are based on application of an object detector to one or more video frames. The set of one or more detector bounding regions are associated with one or more objects in the video frame. The processor is further configured to and can detect one or more blobs for the video frame. A blob includes pixels of at least a portion of an object in the video frame. The processor is further configured to and can determine a set of one or more foreground bounding regions for the video frame. The set of one or more foreground bounding regions are associated with the one or more blobs. The processor is further configured to and can determine one or more associations between the set of one or more detector bounding regions and the set of one or more foreground bounding regions. The processor is further configured to and can determine one or more states of the one or more associations. The processor is further configured to and can determine, based on the determined one or more states, a final set of one or more bounding regions for the video frame using the set of one or more detector bounding regions and the set of one or more foreground bounding regions. The processor is further configured to and can perform object tracking for the video frame using the final set of one or more bounding regions.

In another example, a non-transitory computer-readable medium is provided that has stored thereon instructions that, when executed by one or more processors, cause the one or more processor to: obtain a set of one or more detector bounding regions for a video frame, the set of one or more detector bounding regions being based on application of an object detector to one or more video frames, wherein the set of one or more detector bounding regions are associated with one or more objects in the video frame; detect one or more blobs for the video frame, wherein a blob includes pixels of at least a portion of an object in the video frame; determine a set of one or more foreground bounding regions for the video frame, the set of one or more foreground bounding regions being associated with the one or more blobs; determine one or more associations between the set of one or more detector bounding regions and the set of one or more foreground bounding regions; determine one or more states of the one or more associations; determine, based on the determined one or more states, a final set of one or more bounding regions for the video frame using the set of one or more detector bounding regions and the set of one or more foreground bounding regions; and perform object tracking for the video frame using the final set of one or more bounding regions.

In another example, an apparatus for tracking objects in a sequence of video frames is provided. The apparatus includes means for obtaining a set of one or more detector bounding regions for a video frame. The set of one or more detector bounding regions are based on application of an object detector to one or more video frames. The set of one or more detector bounding regions are associated with one or more objects in the video frame. The apparatus further includes means for detecting one or more blobs for the video frame. A blob includes pixels of at least a portion of an object in the video frame. The apparatus further includes means for determining a set of one or more foreground bounding regions for the video frame. The set of one or more foreground bounding regions are associated with the one or more blobs. The apparatus further includes means for determining one or more associations between the set of one or more detector bounding regions and the set of one or more foreground bounding regions. The apparatus further includes means for determining one or more states of the one or more associations. The apparatus further includes means for determining, based on the determined one or more states, a final set of one or more bounding regions for the video frame using the set of one or more detector bounding regions and the set of one or more foreground bounding regions. The apparatus further includes means for performing object tracking for the video frame using the final set of one or more bounding regions.

In some aspects, the object detector is a complex object detector. In some aspects, the object detector is based on a trained classification network. As noted above, a key frame is a frame from the sequence of video frames to which the object detector is applied. In some cases, blob detection is performed for each video frame of the sequence of video frames to detect one or more blobs in each video frame, and the object detector is applied only to key frames of the sequence of video frames. The frames that the object detector (e.g., the complex object detector) are not applied to are referred to as non-key frames.

In some aspects, an association between a first detector bounding region (also referred to as a "high confidence bounding region") of the set of one or more detector bounding regions and a first foreground bounding region of the set of one or more foreground bounding regions is determined based on an overlap between the first detector bounding region and the first foreground bounding region. In some cases, determining the one or more associations between the set of one or more detector bounding regions and the set of one or more foreground bounding regions comprises: determining an overlapping region between a first detector bounding region of the set of one or more detector bounding regions and a first foreground bounding region of the set of one or more foreground bounding regions; determining an area of the first detector bounding region or the first foreground bounding region within the overlapping region is greater than a first overlapping threshold; and determining the first detector bounding region is associated with the first foreground bounding region in response to determining the area of the first detector bounding region or the first foreground bounding region within the overlapping region is greater than the first overlapping threshold.

In some aspects, determining the one or more states of the one or more associations comprises: determining an association between at least two detector bounding regions of the set of one or more detector bounding regions and a first foreground bounding region of the set of one or more foreground bounding regions; and determining the association is a merge association. In some examples, determining, based on the determined one or more states, the final set of one or more bounding regions for the video frame comprises adding the at least two detector bounding regions to the final set of one or more bounding regions based on the association being a merge association. In some examples, determining, based on the determined one or more states, the final set of one or more bounding regions for the video frame further comprises: determining one or more regions of the first foreground bounding region that are not overlapped with a region corresponding to the at least two detector bounding regions; selecting a candidate region of the one or more regions; determining the candidate region is greater than a candidate threshold; and adding the candidate region to the final set of one or more bounding regions based on the candidate region being greater than the candidate threshold. In some cases, the region corresponding to the at least two detector bounding regions includes a union region between the at least two detector bounding regions.

In some aspects, the methods, apparatuses, and computer-readable medium described above further comprise: determine the video frame is a non-key frame, wherein the object detector is not applied to non-key frames of the sequence of video frames; and modify, based on the video frame being a non-key frame, one or more detector bounding regions from the at least two detector bounding regions. In such aspects, determining the final set of one or more bounding regions for the video frame includes adding the modified one or more detector bounding regions to the final set of one or more bounding regions. In some examples, modifying the one or more detector bounding regions includes modifying one or more locations of the one or more detector bounding regions so that the one or more detector bounding regions cover additional foreground pixels of the first foreground bounding region.

In some aspects, determining the one or more states of the one or more associations comprises: determining a first detector bounding region of the set of one or more detector bounding regions is associated with at least two foreground bounding regions of the set of one or more foreground bounding regions; and determining the association is a split association. In some examples, determining, based on the determined one or more states, the final set of one or more bounding regions for the video frame comprises: determining the video frame is a key frame, wherein the object detector is applied to the key frame; and adding the first detector bounding region to the final set of one or more bounding regions based on the association being a split association and based on the video frame being a key frame. In some examples, determining, based on the determined one or more states, the final set of one or more bounding regions for the video frame comprises: determining the video frame is a non-key frame, wherein the object detector is not applied to non-key frames of the sequence of video frames; combining, based on the video frame being a non-key frame, the at least two foreground bounding regions into a combined foreground bounding region; determining whether an overlapping region between the combined foreground bounding region and the first detector bounding region is greater than a second overlapping threshold; and adding the first detector bounding region or the combined foreground bounding region to the final set of one or more bounding regions based on whether the overlapping region is greater than the second overlapping threshold. In some cases, the first detector bounding region is added to the final set of one or more bounding regions when the overlapping region is greater than the second overlapping threshold. In some cases, the combined foreground bounding region is added to the final set of one or more bounding regions when the overlapping region is less than the second overlapping threshold.

In some aspects, determining the one or more states of the one or more associations comprises: determining a first detector bounding region of the set of one or more detector bounding regions is associated with only a first foreground bounding region of the set of one or more foreground bounding regions; and determining the association is a normal association. In some examples, determining, based on the determined one or more states, the final set of one or more bounding regions for the video frame comprises: determining the video frame is a key frame, wherein the object detector is applied to the key frame; and adding the first detector bounding region to the final set of one or more bounding regions based on the association being a normal association and based on the video frame being a key frame. In some examples, determining, based on the determined one or more states, the final set of one or more bounding regions for the video frame comprises: determining the video frame is a non-key frame, wherein the object detector is not applied to non-key frames of the sequence of video frames; determining whether an overlapping region between the first detector bounding region and the first foreground bounding region is greater than a second overlapping threshold; and adding the first detector bounding region or the first foreground bounding region to the final set of one or more bounding regions based on whether the overlapping region is greater than the second overlapping threshold. In some cases, the first detector bounding region is added to the final set of one or more bounding regions when the overlapping region is greater than the second overlapping threshold. In some cases, the first foreground bounding region is added to the final set of one or more bounding regions when the overlapping region is less than the second overlapping threshold.

In some aspects, determining the one or more states of the one or more associations comprises: determining a first detector bounding region of the set of one or more detector bounding regions is not associated with any foreground bounding regions from the set of one or more foreground bounding regions; and determining the association is an absorbed association, wherein an absorbed association is associated with an object that has been detected as background. In some examples, determining, based on the determined one or more states, the final set of one or more bounding regions for the video frame comprises adding the first detector bounding region to the final set of one or more bounding regions based on the association being an absorbed association.

In some aspects, determining the one or more states of the one or more associations comprises: determining a first foreground bounding region of the set of one or more foreground bounding regions is not associated with any detector bounding regions from the set of one or more detector bounding regions; and determining the association is a non-detected association. In some examples, determining, based on the determined one or more states, the final set of one or more bounding regions for the video frame comprises adding the first foreground bounding region to the final set of one or more bounding regions based on the association being a non-detected association.

According to at least one example of the crowd-based techniques noted above, a method of tracking objects in a sequence of video frames is provided. The method includes obtaining a set of detector bounding regions for a video frame. The set of detector bounding regions are based on application of an object detector to one or more video frames. The set of detector bounding regions are associated with trackers for tracking one or more objects in the video frame. The method further includes grouping the set of detector bounding regions into at least a first group of bounding regions and a second group of bounding regions. The method further includes detecting one or more blobs for the video frame, where a blob includes pixels of at least a portion of an object in the video frame. The method further includes determining a set of one or more foreground bounding regions for the video frame. The set of one or more foreground bounding regions are associated with the one or more blobs. The method further includes adding at least one foreground bounding region from the set of one or more foreground bounding regions to the first group. The method further includes modifying a first detector bounding region from the first group based on a first foreground bounding region from the first group. The method further includes performing object tracking for an object in the video frame using the modified first detector bounding region.

In another example, an apparatus for tracking objects in a sequence of video frames is provided that includes a memory configured to store video data and a processor. The processor is configured to and can obtain a set of detector bounding regions for a video frame. The set of detector bounding regions are based on application of an object detector to one or more video frames. The set of detector bounding regions are associated with trackers for tracking one or more objects in the video frame. The processor is further configured to and can group the set of detector bounding regions into at least a first group of bounding regions and a second group of bounding regions. The processor is further configured to and can detect one or more blobs for the video frame, where a blob includes pixels of at least a portion of an object in the video frame. The processor is further configured to and can determine a set of one or more foreground bounding regions for the video frame. The set of one or more foreground bounding regions are associated with the one or more blobs. The processor is further configured to and can add at least one foreground bounding region from the set of one or more foreground bounding regions to the first group. The processor is further configured to and can modify a first detector bounding region from the first group based on a first foreground bounding region from the first group. The processor is further configured to and can perform object tracking for an object in the video frame using the modified first detector bounding region.

In another example, a non-transitory computer-readable medium is provided that has stored thereon instructions that, when executed by one or more processors, cause the one or more processor to: obtain a set of detector bounding regions for a video frame, the set of detector bounding regions being based on application of an object detector to one or more video frames, wherein the set of detector bounding regions are associated with trackers for tracking one or more objects in the video frame; group the set of detector bounding regions into at least a first group of bounding regions and a second group of bounding regions; detecting one or more blobs for the video frame, wherein a blob includes pixels of at least a portion of an object in the video frame; determine a set of one or more foreground bounding regions for the video frame, the set of one or more foreground bounding regions being associated with the one or more blobs; add at least one foreground bounding region from the set of one or more foreground bounding regions to the first group; modify a first detector bounding region from the first group based on a first foreground bounding region from the first group; and perform object tracking for an object in the video frame using the modified first detector bounding region.

In another example, an apparatus for tracking objects in a sequence of video frames is provided. The apparatus includes means for obtaining a set of detector bounding regions for a video frame. The set of detector bounding regions are based on application of an object detector to one or more video frames. The set of detector bounding regions are associated with trackers for tracking one or more objects in the video frame. The method further includes grouping the set of detector bounding regions into at least a first group of bounding regions and a second group of bounding regions. The method further includes detecting one or more blobs for the video frame, where a blob includes pixels of at least a portion of an object in the video frame. The method further includes determining a set of one or more foreground bounding regions for the video frame. The set of one or more foreground bounding regions are associated with the one or more blobs. The method further includes adding at least one foreground bounding region from the set of one or more foreground bounding regions to the first group. The method further includes modifying a first detector bounding region from the first group based on a first foreground bounding region from the first group. The method further includes performing object tracking for an object in the video frame using the modified first detector bounding region.

In some aspects, the object detector is a complex object detector. In some aspects, the object detector is based on a trained classification network. As noted above, a key frame is a frame from the sequence of video frames to which the object detector is applied. In some cases, blob detection is performed for each video frame of the sequence of video frames to detect one or more blobs in each video frame, and the object detector is applied only to key frames of the sequence of video frames. The frames that the object detector (e.g., the complex object detector) are not applied to are referred to as non-key frames.

In some aspects, modifying the first detector bounding region from the first group based on the first foreground bounding region from the first group includes shifting a location of the first detector bounding region to align with a location of the first foreground bounding region.

In some aspects, grouping the set of bounding regions into at least the first group and the second group comprises: determining a spatial relationship between a first bounding region and a second bounding region; and grouping the first bounding region and the second bounding region into the first group of bounding regions based on the spatial relationship.

In some aspects, the spatial relationship includes an overlap between the first bounding region and the second bounding region. For example, the first bounding region and the second bounding region are grouped into the first group of bounding regions when the first bounding region overlaps with the second bounding region.

In some aspects, two or more groups of bounding regions are merged when at least one bounding region in a group from the two or more groups overlaps with a union of bounding regions in another group from the two or more groups.

In some aspects, the at least one foreground bounding region from the set of one or more foreground bounding regions is added to the first group or to the second group based on an overlap between the one or more foreground bounding regions and the first group or the second group.

In some aspects, the crowd-based methods, apparatuses, and computer-readable medium described above further comprise determining whether the first group is a crowd group. In such aspects, the first detector bounding region is modified based on the first foreground bounding region when the first group is determined to be a crowd group.

In some cases, determining whether the first group is a crowd group comprises: determining a number of detector bounding regions in the first group is greater than a threshold number of detector bounding regions; and determining the first group is a crowd group based on the number of detector bounding regions in the first group being greater than the threshold number of detector bounding regions.

In some cases, determining whether the first group is a crowd group further comprises: determining a number of foreground bounding regions in the first group is greater than a threshold number of foreground bounding regions; and determining the first group is a crowd group based on the number of detector bounding regions in the first group being greater than the threshold number of detector bounding regions and based on the number of foreground bounding regions in the first group being greater than the threshold number of foreground bounding regions.

In some cases, determining whether the first group is a crowd group comprises: determining a sum of sizes of one or more foreground bounding regions in the first group is less than a sum of sizes of one or more detector bounding regions in the first group; and determining the first group is a crowd group based on the sum of sizes of the one or more foreground bounding regions in the first group being less than the sum of sizes of the one or more detector bounding regions in the first group.

In some aspects, the crowd-based methods, apparatuses, and computer-readable medium described above further comprise: obtaining a plurality of foreground bounding regions that are in the first group; and selecting the first foreground bounding region from the first group to use for modifying the first detector bounding region.

In some cases, selecting the first foreground bounding region from the first group to use for modifying the first detector bounding region comprises: determining the first foreground bounding region is a largest foreground bounding region in the first group; and selecting the first foreground bounding region based on the first foreground bounding region being the largest foreground bounding region in the first group.

In some cases, selecting the first foreground bounding region from the first group to use for modifying the first detector bounding region further comprises: determining the first foreground bounding region is larger than a threshold size; and selecting the first foreground bounding region based on the first foreground bounding region being the largest foreground bounding region in the first group and based on the first foreground bounding region being larger than the threshold size.

In some aspects, the crowd-based methods, apparatuses, and computer-readable medium described above further comprise: determining that multiple detector bounding regions in the first group are associated with the first foreground bounding region in the first group; determining costs associated with the multiple detector bounding regions, wherein a cost associated with a detector bounding region is based on an amount the detector bounding region needs to be modified to be aligned with the first foreground bounding region; and determining, based on a cost associated with the first detector bounding region being a lowest cost among the determined costs, to modify the first detector bounding region based on the first foreground bounding region.

In some aspects, the crowd-based methods, apparatuses, and computer-readable medium described above further comprise: determining one or more detector bounding regions from a boundary region of the first group; determining an amount of overlap between each of the one or more detector bounding regions and one or more remaining foreground bounding regions in the first group; determining a second detector bounding region from the one or more detector bounding regions, the second detector bounding region being determined based on the second detector bounding region having a largest amount of overlap with the one or more remaining foreground bounding regions in the first group; determining a second foreground bounding region from the one or more remaining foreground bounding regions that has a largest spatial relationship with the second detector bounding region; and modifying the second detector bounding region from the first group based on the second foreground bounding region from the first group.

In some aspects, the crowd-based methods, apparatuses, and computer-readable medium described above further comprise refining the first group of bounding regions. In such aspects, refining the first group of bounding regions comprises: removing a detector bounding region from the first group of bounding regions; determine a union region of a set of remaining bounding regions in the first group after the detector bounding region has been removed; determining that all foreground bounding regions in the first group are overlapping with the union region; and updating the first group of detector bounding regions to exclude the detector bounding region from the first group.

In some aspects, any of the apparatuses described above can be a mobile device. In some aspects, the apparatuses include a camera for capturing the one or more video frames and/or the sequence of video frames. In some aspects, the apparatuses include a display for displaying the one or more video frames and/or the sequence of video frames. In some aspects, an apparatus can include a mobile device with a camera for capturing the one or more video frames and a display for displaying the one or more video frames and/or the sequence of video frames.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 8A-FIG. 8C are diagrams illustrating an example of a single-shot object detector, in accordance with some examples.

FIG. 15A is a diagram illustrating an example of bounding boxes generated using a deep learning system and a blob detection system, in accordance with some examples.

FIG. 15B is a diagram illustrating an example of a final set of bounding boxes generated using the bounding boxes shown in FIG. 12A, in accordance with some examples.

FIG. 16A is a diagram illustrating an example of bounding boxes generated using a deep learning system and a blob detection system, in accordance with some examples.

FIG. 16B is a diagram illustrating an example of a final set of bounding boxes generated using the bounding boxes shown in FIG. 12A, in accordance with some examples.

FIG. 18 is a flowchart illustrating an example of an object detection process, in accordance with some embodiments.

FIG. 31 is a flowchart illustrating an example of an object tracking process, in accordance with some embodiments.

FIG. 33A is another video frame of a crowd scene, in accordance with some examples.

FIG. 33B is a foreground mask binary image of the crowd scene shown in FIG. 8A, in accordance with some examples.

FIG. 46 is a flowchart illustrating an example of an object tracking process, in accordance with some embodiments.

DETAILED DESCRIPTION

Figure 1:
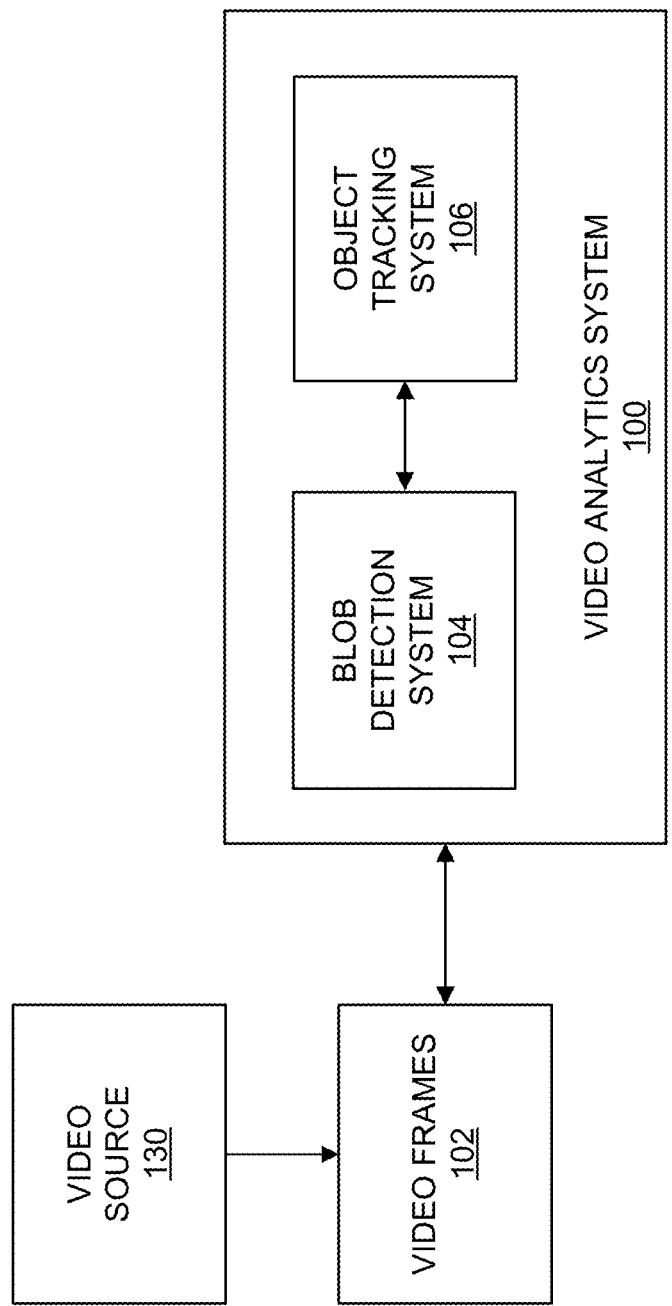
FIG. 1 is a block diagram illustrating an example of a system including a video source and a video analytics system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a sequence of video frames from a video source and can process the video sequence to perform a variety of tasks. One example of a video source can include an Internet protocol camera (IP camera) or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of an event of interest and can send an alert or alarm to a central control room to alert a user of the event of interest.

As described in more detail herein, a video analytics system can generate and detect foreground blobs that can be used to perform various operations, such as object tracking (also called blob tracking) and/or the other operations described above. A blob tracker (also referred to as an object tracker) can be used to track one or more blobs in a video sequence using one or more bounding boxes. Details of an example video analytics system with blob detection and object tracking are described below with respect to FIG. 1-FIG. 4.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection system 104 and an object tracking system 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking. The blob detection system 104 can detect one or more blobs in video frames (e.g., video frames 102) of a video sequence, and the object tracking system 106 can track the one or more blobs across the frames of the video sequence. As used herein, a blob refers to foreground pixels of at least a portion of an object (e.g., a portion of an object or an entire object) in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding box can be associated with a blob. In some examples, a tracker can also be represented by a tracker bounding region. A bounding region of a blob or tracker can include a bounding box, a bounding circle, a bounding ellipse, or any other suitably-shaped region representing a tracker and/or a blob. While examples are described herein using bounding boxes for illustrative purposes, the techniques and systems described herein can also apply using other suitably shaped bounding regions. A bounding box associated with a tracker and/or a blob can have a rectangular shape, a square shape, or other suitable shape. In the tracking layer, in case there is no need to know how the blob is formulated within a bounding box, the term blob and bounding box may be used interchangeably.

As described in more detail below, blobs can be tracked using blob trackers. A blob tracker can be associated with a tracker bounding box and can be assigned a tracker identifier (ID). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below.

In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t(C_{tx}, C_{ty})$ denotes the center position of a bounding box of the tracker in a current frame, with $C_{tx}$ being the x-coordinate of the bounding box, and $C_{ty}$ being the y-coordinate of the bounding box. The term $C_{t-1}(C_{t-1x}, C_{t-1y})$ denotes the center position (x and y) of a bounding box of the tracker in a previous frame. In some implementations, it is also possible to use four parameters to estimate x, y, width, height at the same time. In some cases, because the timing for video frame data is constant or at least not dramatically different overtime (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used.

Using the blob detection system 104 and the object tracking system 106, the video analytics system 100 can perform blob generation and detection for each frame or picture of a video sequence. For example, the blob detection system 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection system 104 and the object tracking system 106 are described with respect to FIGS. 3-4.

Figure 2:
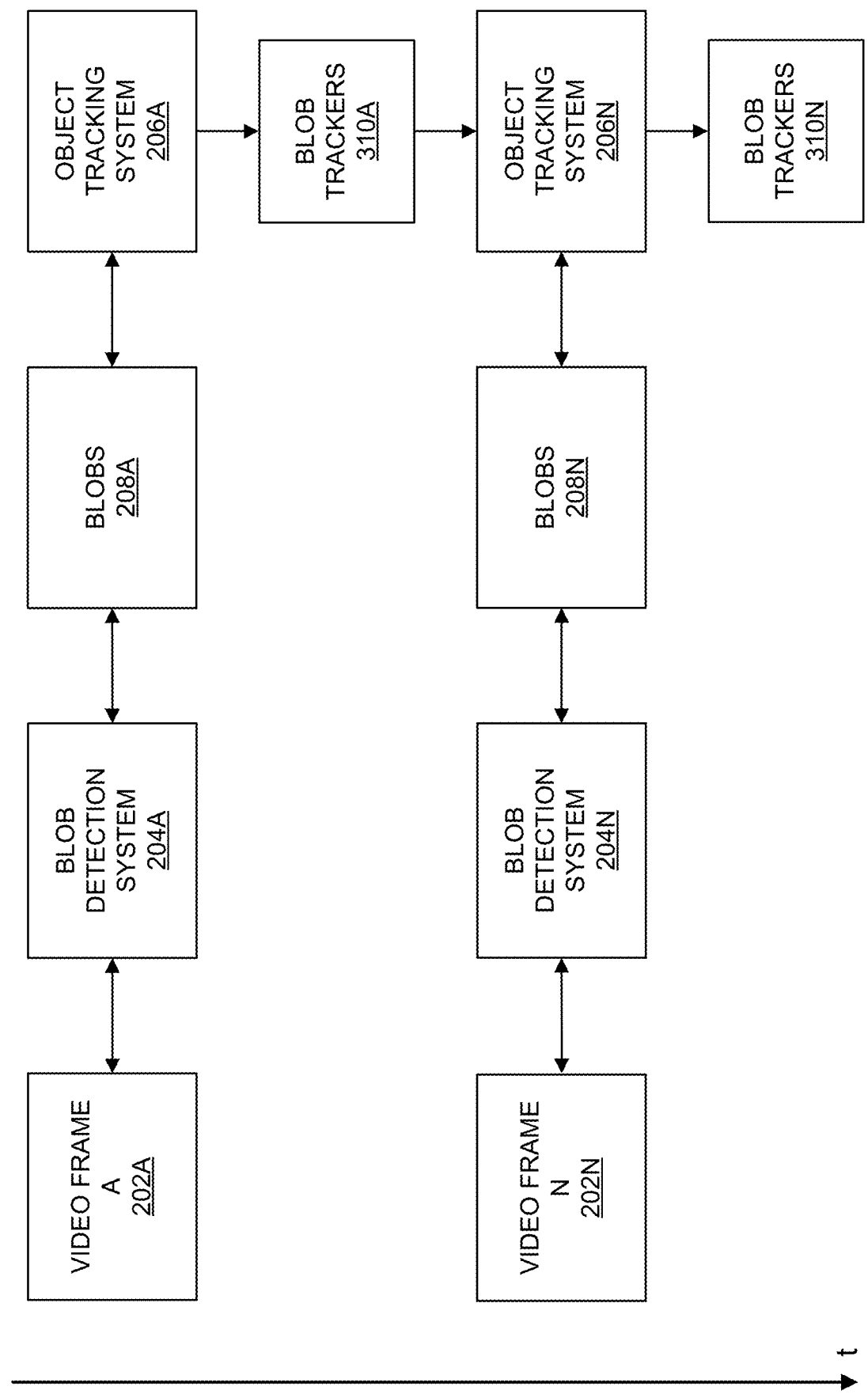
FIG. 2 is an example of a video analytics system processing video frames, in accordance with some examples.

FIG. 2 is an example of the video analytics system (e.g., video analytics system 100) processing video frames across time t. As shown in FIG. 2, a video frame A 202A is received by a blob detection system 204A. The blob detection system 204A generates foreground blobs 208A for the current frame A 202A. After blob detection is performed, the foreground blobs 208A can be used for temporal tracking by the object tracking system 206A. Costs (e.g., a cost including a distance, a weighted distance, or other cost) between blob trackers and blobs can be calculated by the object tracking system 206A. The object tracking system 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers can be updated, including in terms of positions of the trackers, according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection system 204N generates foreground blobs 208N for the frame N 202N. The object tracking system 206N can then perform temporal tracking of the blobs 208N. For example, the object tracking system 206N obtains the blob trackers 310A that were updated based on the prior video frame A 202A. The object tracking system 206N can then calculate a cost and can associate the blob trackers 310A and the blobs 208N using the newly calculated cost. The blob trackers 310A can be updated according to the data association to generate updated blob trackers 310N.

Figure 3:
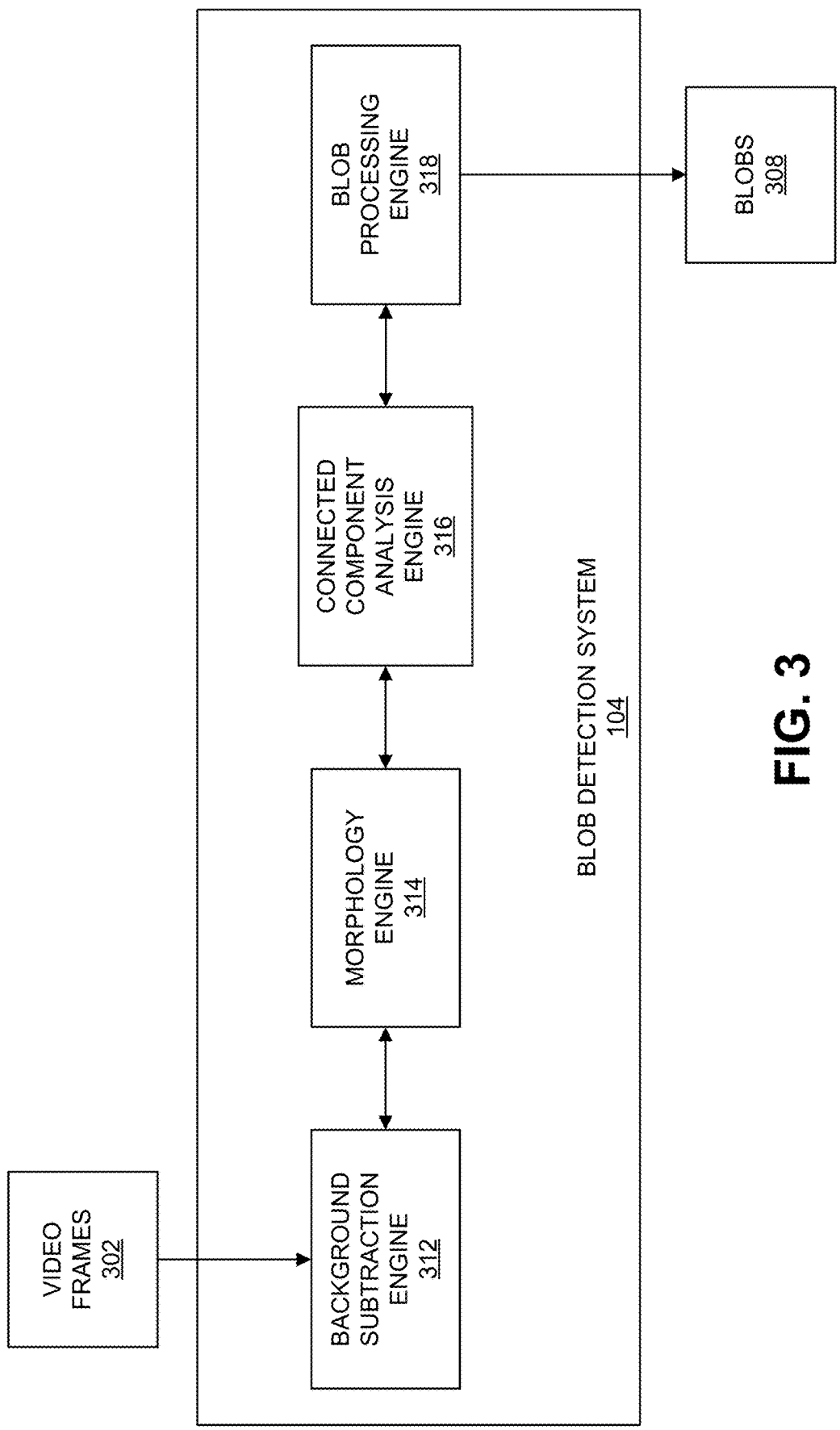
FIG. 3 is a block diagram illustrating an example of a blob detection system, in accordance with some examples.

FIG. 3 is a block diagram illustrating an example of a blob detection system 104. Blob detection is used to segment moving objects from the global background in a scene. The blob detection system 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (also referred to as a Gaussian mixture model (GMM)). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_i) = \sum_{i=1}^{K} \omega_{i,t} N(X_t | \mu_{2,t}, \Sigma_{i,t})$$

Equation (1)

An equation of the GMM model is shown in equation (1), wherein there are K Gaussian models. Each Guassian model has a distribution with a mean of $\mu$ and variance of $\Sigma$, and has a weight $\omega$. Here, i is the index to the Gaussian model and t is the time instance. As shown by the equation, the parameters of the GMM change over time after one frame (at time t) is processed. In GMM or any other learning based background subtraction, the current pixel impacts the whole model of the pixel location based on a learning rate, which could be constant or typically at least the same for each pixel location. A background subtraction method based on GMM (or other learning based background subtraction) adapts to local changes for each pixel. Thus, once a moving object stops, for each pixel location of the object, the same pixel value keeps on contributing to its associated background model heavily, and the region associated with the object becomes background.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with 3×3 window size is called first, and three function calls of dilation of 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. In some implementation of connected component analysis, a set of bounding boxes are returned in a way that each bounding box contains one component of connected pixels. One example of the connected component analysis performed by the connected component analysis engine 316 is implemented as follows:

for each pixel of the foreground mask
  if it is a foreground pixel and has not been processed, the following steps apply:
    Apply FloodFill function to connect this pixel to other foreground and generate a connected component
    Insert the connected component in a list of connected components.
    Mark the pixels in the connected component as being processed}

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection system 104. In some examples, there may be a filtering process for the connected components (bounding boxes). For instance, the blob processing engine 318 can perform content-based filtering of certain blobs. In some cases, a machine learning method can determine that a current blob contains noise (e.g., foliage in a scene). Using the machine learning information, the blob processing engine 318 can determine the current blob is a noisy blob and can remove it from the resulting blobs that are provided to the object tracking engine 106. In some cases, the blob processing engine 318 can filter out one or more small blobs that are below a certain size threshold (e.g., an area of a bounding box surrounding a blob is below an area threshold). In some examples, there may be a merging process to merge some connected components (represented as bounding boxes) into bigger bounding boxes. For instance, the blob processing engine 318 can merge close blobs into one big blob to remove the risk of having too many small blobs that could belong to one object. In some cases, two or more bounding boxes may be merged together based on certain rules even when the foreground pixels of the two bounding boxes are totally disconnected. In some embodiments, the blob detection engine 104 does not include the blob processing engine 318, or does not use the blob processing engine 318 in some instances. For example, the blobs generated by the connected component analysis engine 316, without further processing, can be input to the object tracking system 106 to perform blob and/or object tracking.

In some implementations, density based blob area trimming may be performed by the blob processing engine 318. For example, when all blobs have been formulated after post-filtering and before the blobs are input into the tracking layer, the density based blob area trimming can be applied. A similar process is applied vertically and horizontally. For example, the density based blob area trimming can first be performed vertically and then horizontally, or vice versa. The purpose of density based blob area trimming is to filter out the columns (in the vertical process) and/or the rows (in the horizontal process) of a bounding box if the columns or rows only contain a small number of foreground pixels.

The vertical process includes calculating the number of foreground pixels of each column of a bounding box, and denoting the number of foreground pixels as the column density. Then, from the left-most column, columns are processed one by one. The column density of each current column (the column currently being processed) is compared with the maximum column density (the column density of all columns). If the column density of the current column is smaller than a threshold (e.g., a percentage of the maximum column density, such as 10%, 20%, 30%, 50%, or other suitable percentage), the column is removed from the bounding box and the next column is processed. However, once a current column has a column density that is not smaller than the threshold, such a process terminates and the remaining columns are not processed anymore. A similar process can then be applied from the right-most column. One of ordinary skill will appreciate that the vertical process can process the columns beginning with a different column than the left-most column, such as the right-most column or other suitable column in the bounding box.

The horizontal density based blob area trimming process is similar to the vertical process, except the rows of a bounding box are processed instead of columns. For example, the number of foreground pixels of each row of a bounding box is calculated, and is denoted as row density. From the top-most row, the rows are then processed one by one. For each current row (the row currently being processed), the row density is compared with the maximum row density (the row density of all the rows). If the row density of the current row is smaller than a threshold (e.g., a percentage of the maximum row density, such as 10%, 20%, 30%, 50%, or other suitable percentage), the row is removed from the bounding box and the next row is processed. However, once a current row has a row density that is not smaller than the threshold, such a process terminates and the remaining rows are not processed anymore. A similar process can then be applied from the bottom-most row. One of ordinary skill will appreciate that the horizontal process can process the rows beginning with a different row than the top-most row, such as the bottom-most row or other suitable row in the bounding box.

One purpose of the density based blob area trimming is for shadow removal. For example, the density based blob area trimming can be applied when one person is detected together with his or her long and thin shadow in one blob (bounding box). Such a shadow area can be removed after applying density based blob area trimming, since the column density in the shadow area is relatively small. Unlike morphology, which changes the thickness of a blob (besides filtering some isolated foreground pixels from formulating blobs) but roughly preserves the shape of a bounding box, such a density based blob area trimming method can dramatically change the shape of a bounding box.

Figure 4:
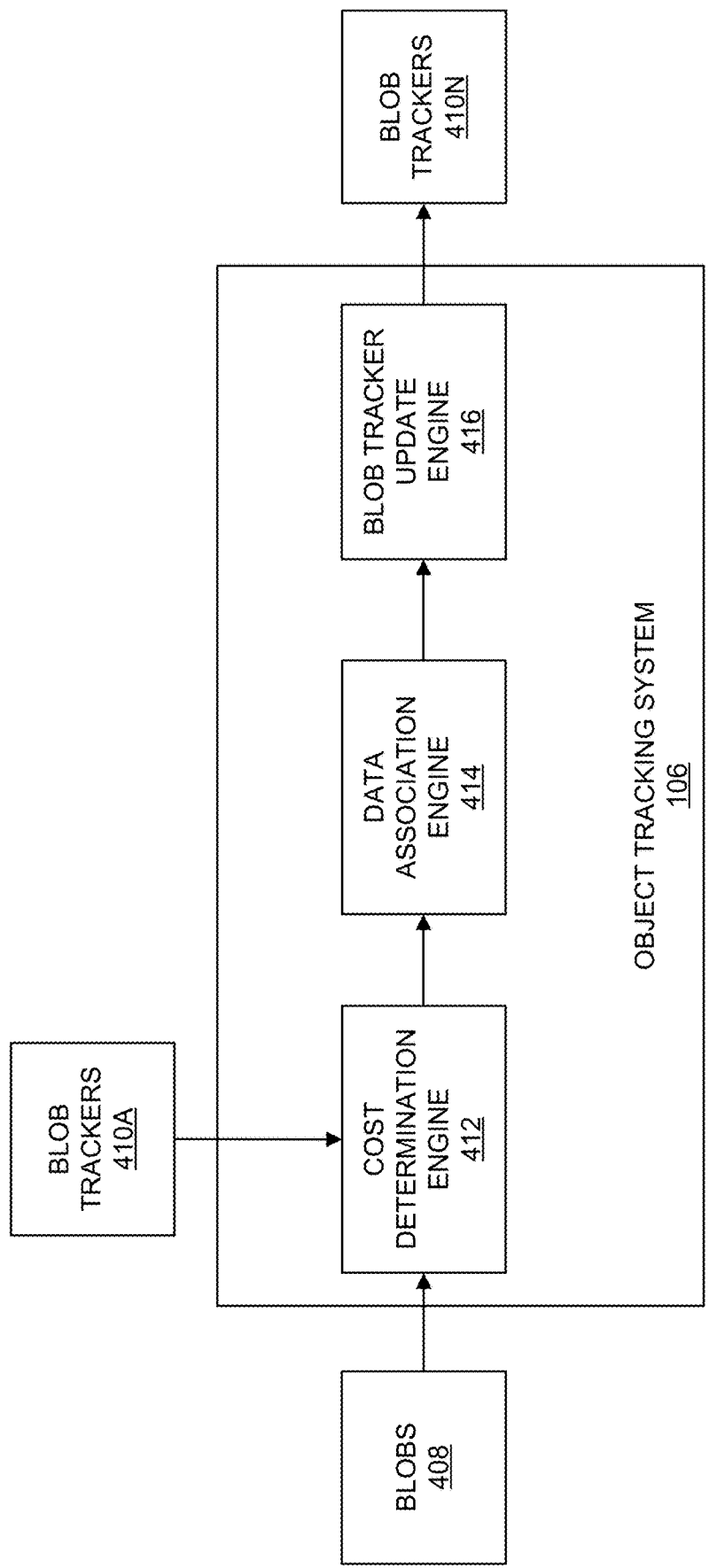
FIG. 4 is a block diagram illustrating an example of an object tracking system, in accordance with some examples.

Once the blobs are detected and processed, object tracking (also referred to as blob tracking) can be performed to track the detected blobs. FIG. 4 is a block diagram illustrating an example of an object tracking engine 106. The input to the blob/object tracking is a list of the blobs 408 (e.g., the bounding boxes of the blobs) generated by the blob detection engine 104. In some cases, a tracker is assigned with a unique ID, and a history of bounding boxes is kept. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking system 106 can obtain the blobs 408 of a current video frame from the blob detection system 104. The cost determination engine 412 can also obtain the blob trackers 410A updated from the previous video frame (e.g., video frame A 202A). A cost function can then be used to calculate costs between the blob trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$Cost_{tb} = \sqrt{(t_x - b_x)^2 + (t_y - b_y)^2}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker (or tracker bounding box) with a corresponding blob (or blob bounding box) and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible. Regardless of the association technique that is used, the data association engine 414 can rely on the distance between the blobs and trackers.

Once the association between the blob trackers 410A and blobs 408 has been completed, the blob tracker update engine 416 can use the information of the associated blobs, as well as the trackers' temporal statuses, to update the status (or states) of the trackers 410A for the current frame. Upon updating the trackers 410A, the blob tracker update engine 416 can perform object tracking using the updated trackers 410N, and can also provide the updated trackers 410N for use in processing a next frame.

The status or state of a blob tracker can include the tracker's identified location (or actual location) in a current frame and its predicted location in the next frame. The location of the foreground blobs are identified by the blob detection engine 104. However, as described in more detail below, the location of a blob tracker in a current frame may need to be predicted based on information from a previous frame (e.g., using a location of a blob associated with the blob tracker in the previous frame). After the data association is performed for the current frame, the tracker location in the current frame can be identified as the location of its associated blob(s) in the current frame. The tracker's location can be further used to update the tracker's motion model and predict its location in the next frame. Further, in some cases, there may be trackers that are temporarily lost (e.g., when a blob the tracker was tracking is no longer detected), in which case the locations of such trackers also need to be predicted (e.g., by a Kalman filter). Such trackers are temporarily not shown to the system. Prediction of the bounding box location helps not only to maintain certain level of tracking for lost and/or merged bounding boxes, but also to give more accurate estimation of the initial position of the trackers so that the association of the bounding boxes and trackers can be made more precise.

As noted above, the location of a blob tracker in a current frame may be predicted based on information from a previous frame. One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) (e.g., the blob(s) bounding box(es)) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Other than the location of a tracker, the state or status of a tracker can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., two or more), or other suitable tracker states.

There may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other objects of interest) intersect, the two trackers associated with the two objects will be merged together for certain frames, and the merge or occlusion status needs to be recorded for high level video analytics.

Regardless of the tracking method being used, a new tracker starts to be associated with a blob in one frame and, moving forward, the new tracker may be connected with possibly moving blobs across multiple frames. When a tracker has been continuously associated with blobs and a duration (a threshold duration) has passed, the tracker may be promoted to be a normal tracker. A normal tracker is output as an identified tracker-blob pair. For example, a tracker-blob pair is output at the system level as an event (e.g., presented as a tracked object on a display, output as an alert, and/or other suitable event) when the tracker is promoted to be a normal tracker. In some implementations, a normal tracker (e.g., including certain status data of the normal tracker, the motion model for the normal tracker, or other information related to the normal tracker) can be output as part of object metadata. The metadata, including the normal tracker, can be output from the video analytics system (e.g., an IP camera running the video analytics system) to a server or other system storage. The metadata can then be analyzed for event detection (e.g., by rule interpreter). A tracker that is not promoted as a normal tracker can be removed (or killed), after which the tracker can be considered as dead.

As noted above, blob trackers can have various temporal states, such as a new state for a tracker of a current frame that was not present before the current frame, a lost state for a tracker that is not associated or matched with any foreground blob in the current frame, a dead state for a tracker that fails to associate with any blobs for a certain number of consecutive frames (e.g., 2 or more frames, a threshold duration, or the like), a normal state for a tracker that is to be output as an identified tracker-blob pair to the video analytics system, or other suitable tracker states. Another temporal state that can be maintained for a blob tracker is a duration of the tracker. The duration of a blob tracker includes the number of frames (or other temporal measurement, such as time) the tracker has been associated with one or more blobs.

As previously described, blob tracker can be promoted or converted to be a normal tracker when certain conditions are met. A tracker is given a new state when the tracker is created and its duration of being associated with any blobs is 0. The duration of the blob tracker can be monitored, as well as its temporal state (new, lost, hidden, or the like). As long as the current state is not hidden or lost, and as long as the duration is less than a threshold duration T1, the state of the new tracker is kept as a new state. A hidden tracker may refer to a tracker that was previously normal (thus independent), but later merged into another tracker C. In order to enable this hidden tracker to be identified later due to the anticipation that the merged object may be split later, it is still kept as associated with the other tracker C which is containing it.

The threshold duration T1 is a duration that a new blob tracker must be continuously associated with one or more blobs before it is converted to a normal tracker (transitioned to a normal state). The threshold duration can be a number of frames (e.g., at least N frames) or an amount of time. In one illustrative example, a blob tracker can be in a new state for 30 frames (corresponding to one second in systems that operate using 30 frames per second), or any other suitable number of frames or amount of time, before being converted to a normal tracker. If the blob tracker has been continuously associated with blobs for the threshold duration (duration≥T1), the blob tracker is converted to a normal tracker by being transitioned from a new status to a normal status If, during the threshold duration T1, the new tracker becomes hidden or lost (e.g., not associated or matched with any foreground blob), the state of the tracker can be transitioned from new to dead, and the blob tracker can be removed from blob trackers maintained for a video sequence (e.g., removed from a buffer that stores the trackers for the video sequence).

In some examples, objects may intersect or group together, in which case the blob detection system can detect one blob (a merged blob) that contains more than one object of interest (e.g., multiple objects that are being tracked). For example, as a person walks near another person in a scene, the bounding boxes for the two persons can become a merged bounding box (corresponding to a merged blob). The merged bounding box can be tracked with a single blob tracker (referred to as a container tracker), which can include one of the blob trackers that was associated with one of the blobs making up the merged blob, with the other blob(s)' trackers being referred to as merge-contained trackers. For example, a merge-contained tracker is a tracker (new or normal) that was merged with another tracker when two blobs for the respective trackers are merged, and thus became hidden and carried by the container tracker.

A tracker that is split from an existing tracker is referred to as a split-new tracker. The tracker from which the split-new tracker is split is referred to as a parent tracker or a split-from tracker. In some examples, a split-new tracker can result when an object is detected as multiple separate blobs, in which case the multiple blobs are associated (or matching or mapping) to one active tracker. For instance, one active tracker can only be mapped to one blob. All the other blobs (the blobs remaining from the multiple blobs that are not mapped to the tracker) cannot be mapped to any existing trackers. In such examples, new trackers will be created for the other blobs, and these new trackers are assigned the state "split-new." Such a split-new tracker can be referred to as the child tracker of the original tracker its associated blob is mapped to. The corresponding original tracker can be referred to as the parent tracker (or the split-from tracker) of the child tracker. In some examples, a split-new tracker can also result from a merge-contained tracker. As noted above, a merge-contained tracker is a tracker that was merged with another tracker (when two blobs for the respective trackers are merged) and thus became hidden and carried by the container tracker. A merge-contained tracker can be split from the container tracker if the container tracker is active and the container tracker has a mapped blob in the current frame.

As previously described, the threshold duration T1 is a duration that a new blob tracker must be continuously associated with one or more blobs before it is converted to a normal tracker. A threshold duration T2 is defined for a split-new tracker, and is the duration that a split-new tracker must be continuously associated with one or more blobs before it is converted to a normal tracker. In some examples, the threshold duration T2 used for split-new trackers can be the same as the threshold duration T1 used for new trackers (e.g., 20 frames, 30 frames, 32 frames, 60 frames, 1 second, 2 seconds, or other suitable duration or number of frames). In some examples, the threshold duration T2 for split-new trackers can be a shorter duration than the threshold duration T1 used for new trackers. For example, T2 can be set to a smaller value than T1. In some examples, the duration T2 can be proportional to T1. In one illustrative example, T1 may indicate one second of duration, in which case the duration is equal to the (average) frame rate of the input video (e.g., 30 frames at 30 frames per second (fps), 60 frames at 60 fps, or other suitable duration and frame rate). In such an example, the duration T2 can be set to half of T1.

As described above, video analytics systems that use motion-based object/blob detection and tracking mainly track moving objects detected as a set of blobs. Each blob does not necessarily correspond to an object. In addition, each blob may not necessarily correspond to a truly moving object. Since the motion detection is performed using background subtraction, the complexity of the solution is not proportional to the number of moving objects in the scene. However, a benefit of video analytics systems that rely on motion-based object/blob detection is that such systems can be performed by relatively low power devices (e.g., less powerful IP camera (IPC) devices). For example, such a video analytics solution could be implemented in a low complexity arm-based chip set, such as the Qualcomm Snapdragon™ 625 (SD625 or the APQ8053 chip). Such a solution could even offer real-time performance (e.g., 30 fps) utilizing only 1 CPU core.

However, such a solution may not be accurate in some scenarios. In some cases, inconsistent motion trajectory of an object can lead to missed detections. For example, a moving object typically triggers a continuous set of detected blobs in successive video frames. These detections (as recorded by a history of blobs) serve as the initial motion trajectory of a candidate that can subsequently be considered as a tracked object (e.g., if the threshold duration is met, and/or other condition is met). However, there can be several causes for the trajectory not triggering a true positive object to be reported in the system. One cause can include that the trajectory is broken in one video frame, resulting in the whole object being killed. Illustrative reasons that the trajectory can be broken include bad lighting conditions that result in a failed object detection for one or more frames, an object becoming merged with another object and no longer contributing to an individual initial motion trajectory of an existing object, as well as various other reasons. Another cause for the trajectory not triggering a true positive object can include that the trajectory of an object does not appear to resemble a typical moving object, such as when movement associated with the initial motion trajectory is small, when the blob sizes associated with the initial motion trajectory are quite inconsistent, among other cases.

Figure 5:
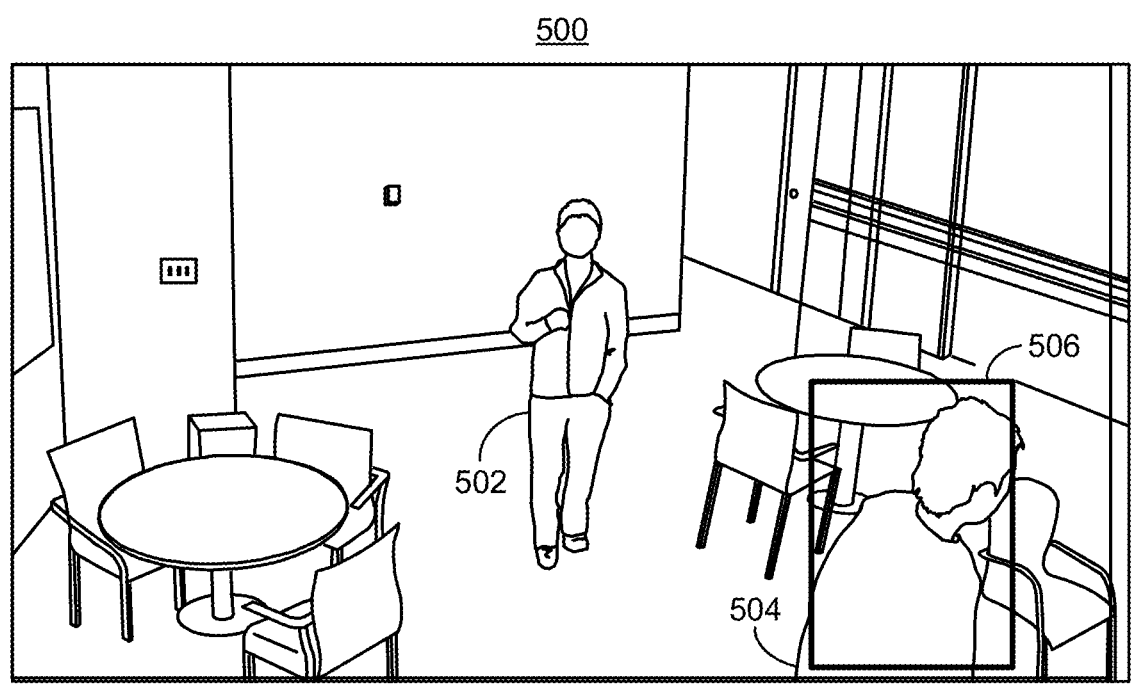
FIG. 5 is a video frame of an environment with various objects, in accordance with some examples.

FIG. 5 shows a video frame 500 illustrating a situation when an object (person 502) is not detected. For example, person 504 is detected and is tracked (shown by bounding box 506) by the video analytics system. However, the person 502 is not detected and thus is not tracked in the video frame 500. As noted above, the person 502 may not be detected and tracked due to lighting conditions and/or due to the movement of the person 502 being too small.

Another reason a motion-based video analytics systems can be inaccurate is due to a long duration (the threshold duration) being required to confirm whether an object is a true positive or not. For example, the initial motion trajectory of an object may require a threshold duration of, for example, a half second, one second, or other suitable duration. When the system determines the initial motion trajectory is not sufficient to output the object, it may wait for several more cycles of the threshold duration (e.g., another half second or another one second). In such cases, a typical tracking delay can be as large as two seconds or even four seconds in some extreme cases. Such tracking delay can lead to missed detections if the object does not "live" long enough in the scene.

Figure 6:
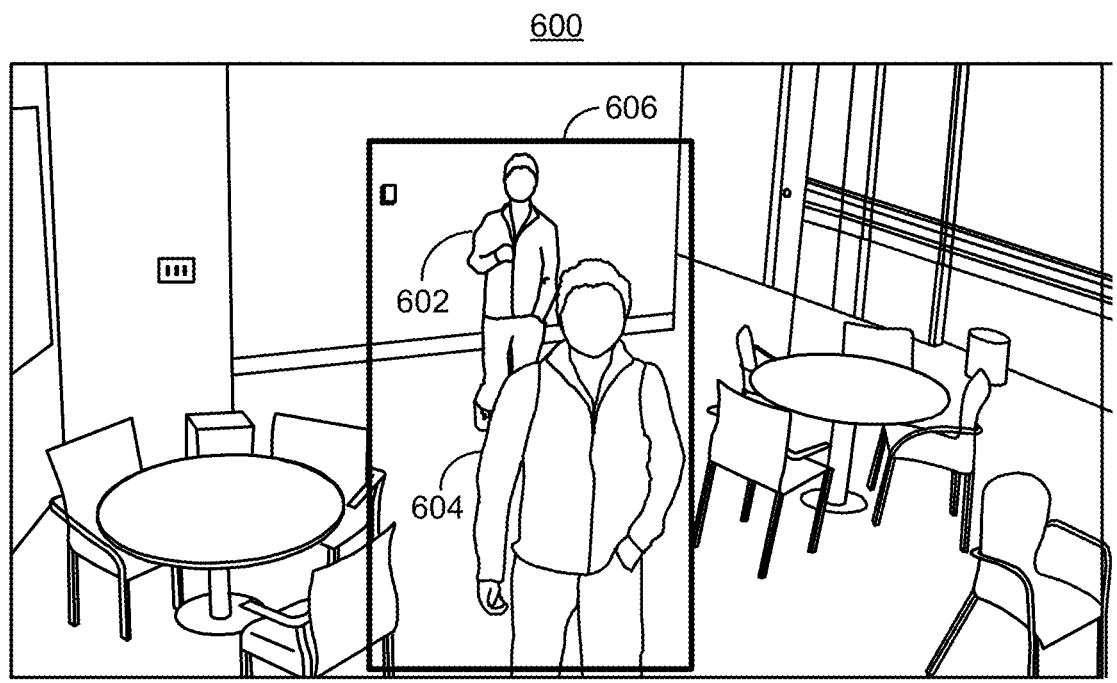
FIG. 6 is a video frame of an environment with various objects, in accordance with some examples.

Furthermore, when multiple objects are detected as a single blob (a merge situation) and are tracked as a single object due to a merge situation, the video analytics system can have difficulties tracking the individual objects detected in the merged blob. For example, for indoor cases (e.g., indoor video surveillance applications), it is common to have objects merged together, since a detected blob may simply contain two or more objects. FIG. 6 shows a video frame 600 illustrating a situation when objects are merged together. For example, person 602 and person 604 are detected as a single blob and are merged together by the video analytics system. As a result, a single object is tracked by the video analytics system, as shown by bounding box 606. There is a need to maintain individuality in object detection and tracking in such merge cases, which can be difficult with motion-based video analytics system.

Figure 7:
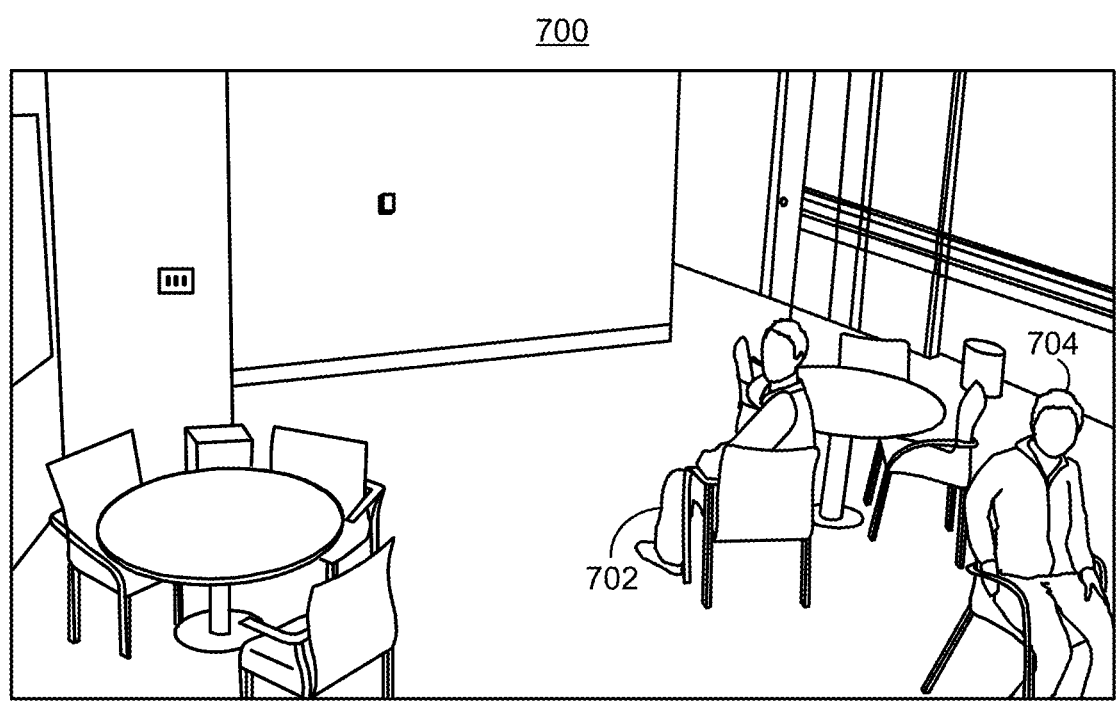
FIG. 7 is a video frame of an environment with various objects, in accordance with some examples.

In some cases, foreground objects can be absorbed into the background as a result of a motion-based video analytics system relying on background subtraction for object detection. For example, objects may stop moving or can begin moving slowly, which are referred to as still or static objects. Still objects can gradually get absorbed into the background as the pixels representing the object are detected as background pixels. However, when the objects are not absolutely still or rigid, it can be difficult to use sleeping object detection-based techniques to detect and track such objects. An example of such a situation is illustrated by the video frame 700 shown in FIG. 7. As shown, the person 702 and the person 704 are sitting in chairs and thus are not moving. Due to the lack of movement, the persons 702 and 704 are not detected as foreground objects and also are not tracked by the video analytics system. Such a situation may occur more often in indoor environments.

Random movements from parts of a stopped object can also cause issues in video analytics systems. For example, parts of an object can continue to display motion even after the object stops moving (e.g., hands, heads, arms or other parts of people continue moving when the people are standing still). Motion blobs contributed by such smaller movements will be detected, but will only represent a small portion of the entire object. Such blobs should be effectively filtered out or otherwise used to indicate the movement or activity of the real object instead of parts of it.

Complex object detectors can also be used to classify (and/or localize) objects in one or more video frames of a video sequence. For example, a complex object detector can be based on a trained classification neural network, such as a deep learning network (also referred to herein as a deep network and a deep neural network), that can be used to classify and/or localize objects in a video frame. A trained deep learning network can identify objects in an image based on knowledge gleaned from training images (or other data) that include similar objects and labels indicating the classification of those objects.

A neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the network includes nodes (e.g., feature maps, neurons, filters, kernels, or the like). The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics. For a classification network, the deep learning system can classify an object in a video frame using the determined high-level features. The output can be a single class, a probability of classes that best describes the object, or other suitable output. For example, the output can include probability values indicating probabilities (or confidence levels or confidence values) that the object includes one or more classes of objects (e.g., a probability the object is a person, a probability the object is a dog, a probability the object is a cat, or the like).

In some cases, nodes in the input layer can represent data, nodes in the one or more hidden layers can represent computations, and nodes in the output layer can represent results from the one or more hidden layers. In one illustrative example, a deep learning neural network can be used to determine whether an object in a video frame is a person. In such an example, nodes in an input layer of the network can include normalized values for pixels of an image (e.g., with one node representing one normalized pixel value), nodes in a hidden layer can be used to determine whether certain common features of a person are present (e.g., two legs are present, a face is present at the top of the object, two eyes are present at the top left and top right of the face, a nose is present in the middle of the face, a mouth is present at the bottom of the face, and/or other features common for a person), and nodes of an output layer can indicate whether a person is detected or not. This example network can have a series of many hidden layers, with early layers determining low-level features of the object in the video frame (e.g., curves, edges, and/or other low-level features), and later layers building up a hierarchy of more high-level and abstract features of the object (e.g., legs, a head, a face, a nose, eyes, mouth, and/or other features). Based on the determined high-level features, the deep learning network can classify the object as being a person or not (e.g., based on a probability of the object being a person relative to a threshold value).

Various complex object detectors (e.g., a deep learning-based detector) can be used to detect or classify objects in video frames. For example, SSD is a fast single-shot object detector that can be applied for multiple object categories. A feature of the SSD model is the use of multi-scale convolutional bounding box outputs attached to multiple feature maps at the top of the neural network. Such a representation allows the SSD to efficiently model diverse box shapes. It has been demonstrated that, given the same VGG-16 base architecture, SSD compares favorably to its state-of-the-art object detector counterparts in terms of both accuracy and speed. An SSD deep learning detector is described in more detail in K. Simonyan and A. Zisserman, "Very deep convolutional networks for large-scale image recognition," CoRR, abs/1409.1556, 2014, which is hereby incorporated by reference in its entirety for all purposes.

FIG. 8A includes an image and FIG. 8B and FIG. 8C include diagrams illustrating how SSD (with the VGG deep network base model) operates. For example, SSD matches objects with default boxes of different aspect ratios (shown as dashed rectangles in FIG. 8B and FIG. 8C). Each element of the feature map has a number of default boxes associated with it. Any default box with an intersection-over-union with a ground truth box over a threshold (e.g., 0.4, 0.5, 0.6, or other suitable threshold) is considered a match for the object. For example, two of the 8×8 boxes (shown in blue in FIG. 8B) are matched with the cat, and one of the 4×4 boxes (shown in red in FIG. 8C) is matched with the dog. SSD has multiple features maps, with each feature map being responsible for a different scale of objects, allowing it to identify objects across a large range of scales. For example, the boxes in the 8×8 feature map of FIG. 8B are smaller than the boxes in the 4×4 feature map of FIG. 8C. In one illustrative example, an SSD detector can have six feature maps in total.

For each default box in each cell, the SSD neural network outputs a probability vector of length c, where c is the number of classes, representing the probabilities of the box containing an object of each class. In some cases, a background class is included that indicates that there is no object in the box. The SSD network also outputs (for each default box in each cell) an offset vector with four entries containing the predicted offsets required to make the default box match the underlying object's bounding box. The vectors are given in the format (cx, cy, w, h), with cx indicating the center x, cy indicating the center y, w indicating the width offsets, and h indicating height offsets. The vectors are only meaningful if there actually is an object contained in the default box. For the image shown in FIG. 8A, all probability labels would indicate the background class with the exception of the three matched boxes (two for the cat, one for the dog).

Another deep learning-based detector that can be used to detect or classify objects in video frames includes the You only look once (YOLO) detector, which is an alternative to the SSD object detection system. The YOLO detector, when run on a Titan X, processes images at 40-90 fps with a mAP of 78.6% (based on VOC 2007). The SSD300 model runs at 59 FPS on the Nvidia Titan X, and can typically execute faster than the current YOLO 1. YOLO 1 has also been recently replaced by its successor YOLO 2. A YOLO deep learning detector is described in more detail in J. Redmon, S. Divvala, R. Girshick, and A. Farhadi, "You only look once: Unified, real-time object detection," arXiv preprint arXiv:1506.02640, 2015, which is hereby incorporated by reference in its entirety for all purposes.

Figure 9C:
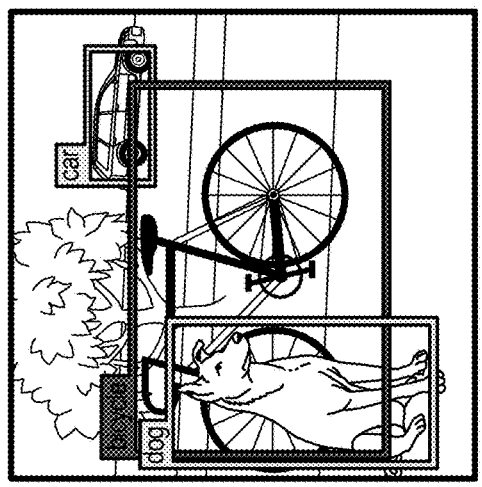
FIG. 9A-FIG. 9C are diagrams illustrating an example of a you only look once (YOLO) detector, in accordance with some examples.
Figure 9B:
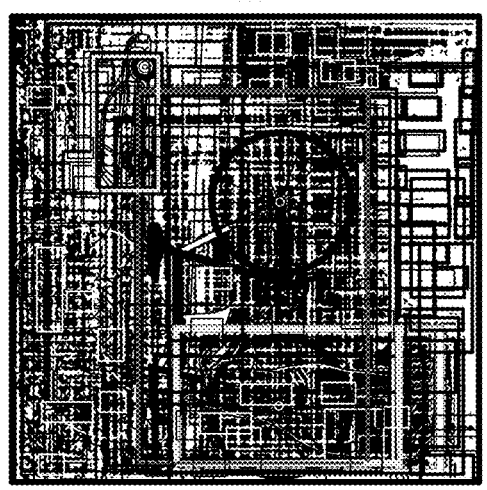
Figure 9A:
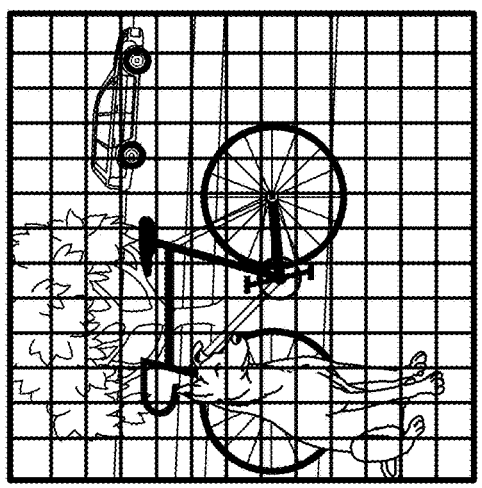

FIG. 9A includes an image and FIG. 9B and FIG. 9C include diagrams illustrating how the YOLO detector operates. The YOLO detector can apply a single neural network to the full image. As shown, the YOLO network divides the image into regions and predicts bounding boxes and probabilities for each region. These bounding boxes are weighted by the predicted probabilities. For example, as shown in FIG. 9A, the YOLO detector divides up the image into a grid of 13-by-13 cells. Each of the cells is responsible for predicting five bounding boxes. A confidence score is provided that indicates how certain it is that the predicted bounding box actually encloses an object. This score does not include a classification of the object that might be in the box, but indicates if the shape of the box is suitable. The predicted bounding boxes are shown in FIG. 9B. The boxes with higher confidence scores have thicker borders.

Each cell also predicts a class for each bounding box. For example, a probability distribution over all the possible classes is provided. Any number of classes can be detected, such as a bicycle, a dog, a cat, a person, a car, or other suitable object class. The confidence score for a bounding box and the class prediction are combined into a final score that indicates the probability that that bounding box contains a specific type of object. For example, the yellow box with thick borders on the left side of the image in FIG. 9B is 85% sure it contains the object class "dog." There are 169 grid cells (13×13) and each cell predicts 5 bounding boxes, resulting in 845 bounding boxes in total. Many of the bounding boxes will have very low scores, in which case only the boxes with a final score above a threshold (e.g., above a 30% probability, 40% probability, 50% probability, or other suitable threshold) are kept. FIG. 9C shows an image with the final predicted bounding boxes and classes, including a dog, a bicycle, and a car. As shown, from the 845 total bounding boxes that were generated, only the three bounding boxes shown in FIG. 9C were kept because they had the best final scores.

Complex detectors (e.g., using deep learning networks) can also have issues when being used to classify and/or localize objects in a video sequence. For example, deep learning based complex detectors are quite slow and the results cannot be generated real-time on camera devices (e.g., at 30 fps when a camera device is operating a 30 fps frame rate), such as an IP camera device or other suitable device used to capture video sequences of a scene. Deep learning-based complex detectors can only achieve real-time performance on certain graphic cards (e.g., an Nvidia graphics card). Experiments even suggest that it could take many seconds to finish object detection for one frame.

There are further optimizations in terms of deep learning algorithms, including using GoogLeNet v2 to replace VGG in SSD. In low-tier chipsets, such as the SD625, the CPUs are much slower and the absence of a high-performance vector-DSP, such as the HVX (Hexagon Vector eXtensions), prevents efficient parallel processing. In addition, the GPU in a SD625 chipset has performance capabilities that are far inferior to the Nvidia Titan X. So, the fastest deep learning-based detector (even by using the GPU) is still expected to consume 0.5-1 second for one frame. The above execution latency is many-fold (15-30×) inferior to that offered by a conventional video analytics solution for processing one frame, wherein 30 ms of latency is sufficient for the latter case.

Other issues are also present with deep learning based detectors. For example, many kinds of objects are detected by deep learning detectors, but some of the detected objects might not be interesting for the video analytics system and thus should not be reported as detected events. Such objects may be considered as false positives. For example, if a portrait is present in the scene, a video analytics system would not want to indicate an event (e.g. an alert) that such an object is present. An example of false positive detection is illustrated by the video frame 1000 shown in FIG. 10. As shown, two bounding boxes 1004 and 1006 are detected for the person 1002. The bounding box 1006 is detected for the person 1002 with a low confidence value, while the bounding box 1004 is detected with a high confidence value. Deep learning based solutions are also limited to the object categories that the network is trained for. As a result, an object that is not part of the trained network can go un-detected.

Figure 11:
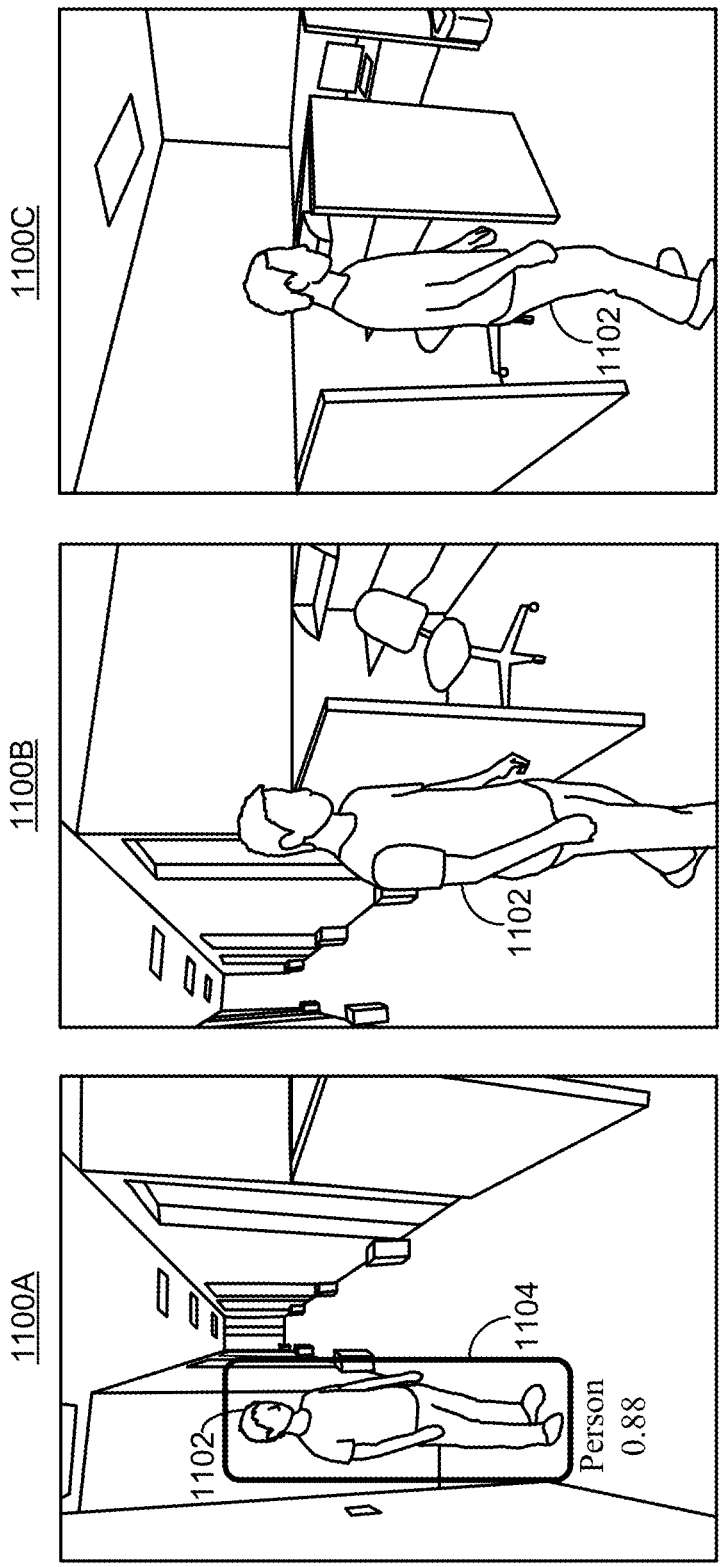
FIG. 11A-FIG. 11C are video frames of an environment with an object moving through the environment, in accordance with some examples.

Furthermore, even through deep learning based detectors are quite slow, such detectors may be used for tracking. However, such a tracking system offers good performance only under the situation of very small motion or a relatively static scene (objects within it have very little or no motion). For instance, whenever a person is moving with a normal speed in a scene, the person cannot be detected by a deep learning based complex object detector. FIG. 11A-FIG. 11C show an example of a person 1102 moving within a scene. As shown in FIG. 11A, the person 1102 is standing still, in which case the person is detected with confidence (illustrated by bounding box 1104, a "person" class, and a confidence level or value of 0.88) by a deep learning based detector. However, when the person 1102 is walking with normal speed, as shown in FIG. 11B and FIG. 11C, the person is not detected at all. Such a lack of detection is based on the latency required to detect an object being greater than real-time. For example, it may take at least a half second or more to detect an object using a deep learning network, in which case the person cannot be classified at each frame of the video sequence capturing the person.

Deep learning based detect objection approaches are also sensitive to object features. If key object characteristics can be hidden (e.g., facial landmarks such as eyes, nose, mouth, or the like in a deep learning-based face detector), the objects might go un-detected.

In order to improve the object detection and tracking accuracy in motion-based video analytics systems, a hybrid video analytics system is provided herein that is based on the synergistic use of motion-based video analytics and complex object detection (e.g., full-frame or region of interest based object detection) and that provides bounding regions of relevant objects. The complex object detection can be based on application of a trained classification network (e.g., a deep learning network) to classify and localize the relevant objects. Unlike detectors such as the Aggregate Channel Features (ACF) detector, which is relatively easy to implement in real-time (e.g., at a frame rate of 30 frames per second (fps)), the complex object detector (e.g., based on a deep learning network) applied by the video analytics system discussed herein provides object detection with a much higher accuracy, but at the cost of large latencies when executed independently (even for a small input image resolution). By applying a combined video analytics object detection/tracking system and a complex object detection system, the problems described above can be avoided. For example, the hybrid video analytics system described herein provides object detection and tracking with high-accuracy, while achieving real-time performance without such latencies. Such high-accuracy, real-time performance can even be achieved by a device (e.g., an IP camera or other device) that does not have a graphics card. Furthermore, the complexity of an object classification system is reduced using the techniques described herein. By reducing the complexity, the amount of computer resources (e.g., devices, storage, and processor usage) required to generate detection, tracking, and classification results is reduced.

Figure 12:
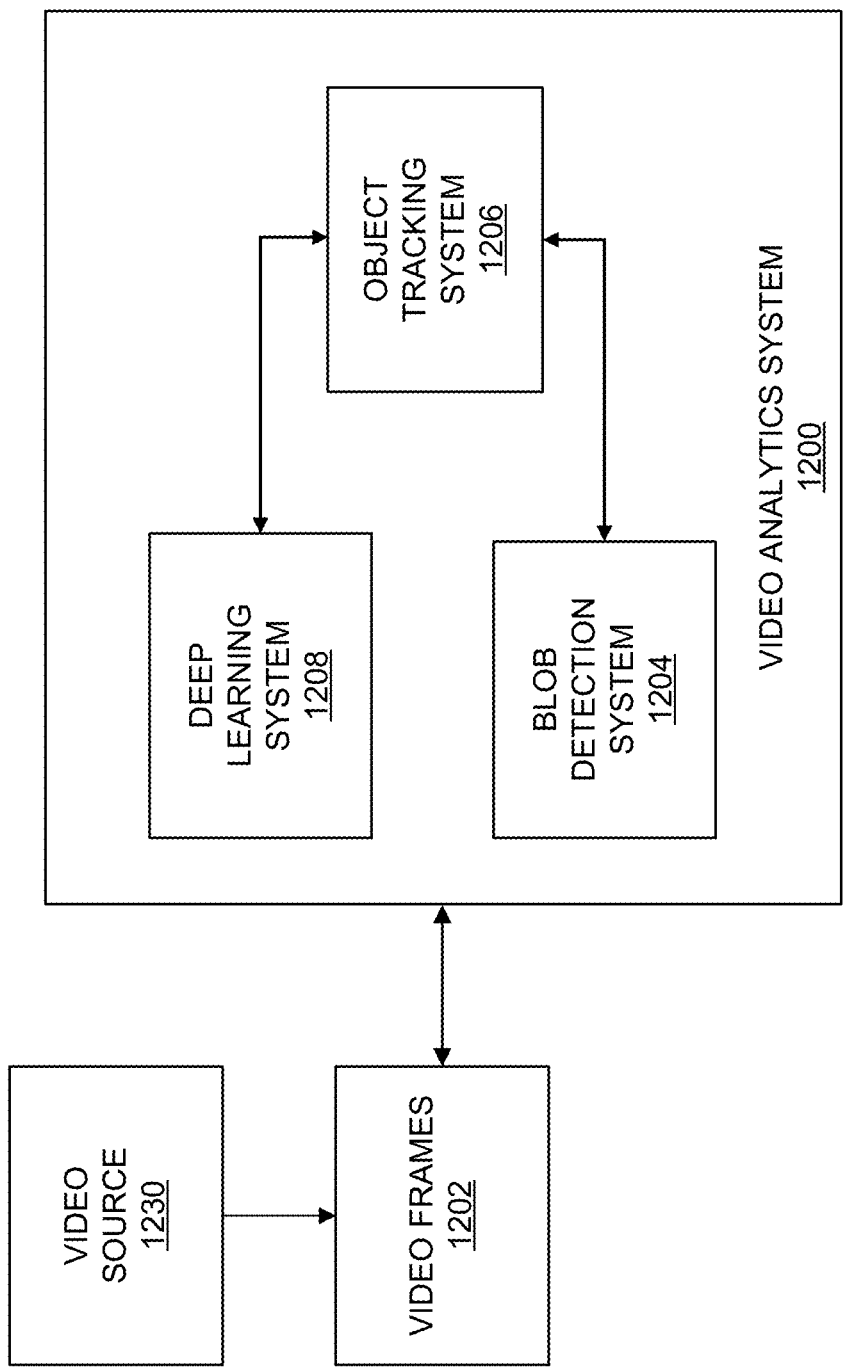
FIG. 12 is a block diagram illustrating an example of a video analytics system including a deep learning system, in accordance with some examples.

FIG. 12 is an example of a video analytics system 1200 that can be used to perform object detection and tracking in real-time using deep learning. The video analytics system 1200 performs multiple source object detection to detect and track objects in images with high-accuracy and in real-time. The multiple source object detection is achieved by combining blob detection and complex object detection (e.g., using a trained classification network). As used herein, the term "real-time" refers to detecting and tracking objects in a video sequence as the video sequence is being captured. The video analytics system 1200 includes a blob detection system 1204, an object tracking system 1206, and a deep learning system 1208.

The blob detection system 1204 is similar to and can perform the same operations as the blob detection system 104 described above with respect to FIG. 1-FIG. 4. For example, the blob detection system 1204 can receive video frames 1202 of a video sequence provided by a video source 1230. The blob detection system 1204 can perform object detection to detect one or more blobs (representing one or more objects) for the video frames 1202. Blob bounding boxes associated with the blobs are generated by the blob detection system 1204. The blob bounding boxes generated using blob detection can also be referred to as foreground bounding boxes. The blobs and/or the blob bounding boxes can be output for further processing by the video analytics system 1200. While examples are described herein using bounding boxes as examples of bounding regions, one of ordinary skill will appreciate that any other suitable bounding region could be used instead of bounding boxes, such as bounding circles, bounding ellipses, or any other suitably-shaped regions representing trackers, blobs, and/or objects.

The deep learning system 1208 can implement a complex object detector. For example, the complex object detector can be implemented using one or more trained neural networks (e.g., a deep learning network) to one or more of the frames 1202 of the received video sequence to locate and classify objects in the one or more frames. An output of the deep learning system 1208 can include a set of detector bounding boxes representing the detected and classified objects. Examples of trained neural networks that can be applied by the deep learning system 1208 can include an SSD detector (described above with respect to FIG. 8A-FIG. 8C), a YOLO detector (described above with respect to FIG. 9A-FIG. 9C), or any other suitable neural network. Various other neural networks that can be applied by the deep learning system 1208 are described below with respect to FIG. 47 and FIG. 48.

A final set of bounding boxes is determined using detector bounding boxes produced by the deep learning system 1208 and blob bounding boxes produced by the blob detection system 1204. For example, the blob bounding boxes (generated by the blob detection system 1204) and the detector bounding boxes (generated by the deep learning system 1208) can be generated for a same video frame, and can be analyzed to determine a final set of bounding boxes for the video frame. A status can also be determined for each of the bounding boxes in the final set of bounding boxes. Each of the bounding boxes in the final set can represent a blob detected for the video frame.

The final set of bounding boxes determined for a video frame (representing blobs in the video frame) can be provided, for example, for blob processing, object tracking, and other video analytics functions. For example, final bounding boxes can be provided to the object tracking system 1206, which can perform object tracking to track the detected blobs and the objects represented by the blobs. The object tracking system 1206 is similar to and can perform the same operations as the object tracking system 106 described above with respect to FIG. 1-FIG. 4. As described above, the object tracking system 1206 can associate trackers and their bounding boxes with the one or more blobs (using the blob bounding boxes) detected by the blob detection system 1204. A tracker bounding box can then be displayed as tracking a tracked object/blob when certain conditions are met (e.g., the blob has been tracked for a certain number of frames, a certain period of time, and/or other suitable conditions).

In some implementations, the video analytics system 1200 can perform object detection and tracking at every video frame of the received video sequence to detect and track objects in the frames (using the techniques described above with respect to FIG. 1-FIG. 4). In some implementations, the background subtraction-based object detection and tracking may not be performed for every video frame of the video sequence. For example, object detection and tracking may be performed for every other video frame or for some other suitable number of video frames.

In some cases, the deep learning system 1208 can apply a deep learning network to only a subset of frames of the received video sequence. For example, the deep learning system 1208 can apply the deep learning network every N frames, with N being determined based on the delay required to process a frame using the deep learning network and the frame rate of the video sequence. Each frame for which both blob detection and a deep learning network is applied is referred to herein as a key frame. For other frames, which are referred to as non-key frames, blob detection is applied without also applying the deep learning network. In one illustrative example, the deep learning system 1208 can apply an SSD detector to a key frame to detect objects in the key frame and to output bounding boxes for the objects detected in the key frame, as discussed above with respect to FIG. 8A-FIG. 8C. A YOLO detector or other suitable deep neural network can also be applied by the deep learning system 1208 to detect objects and output bounding boxes for key frames, as discussed above with respect to FIG. 9A-FIG. 9C.

Figure 13:
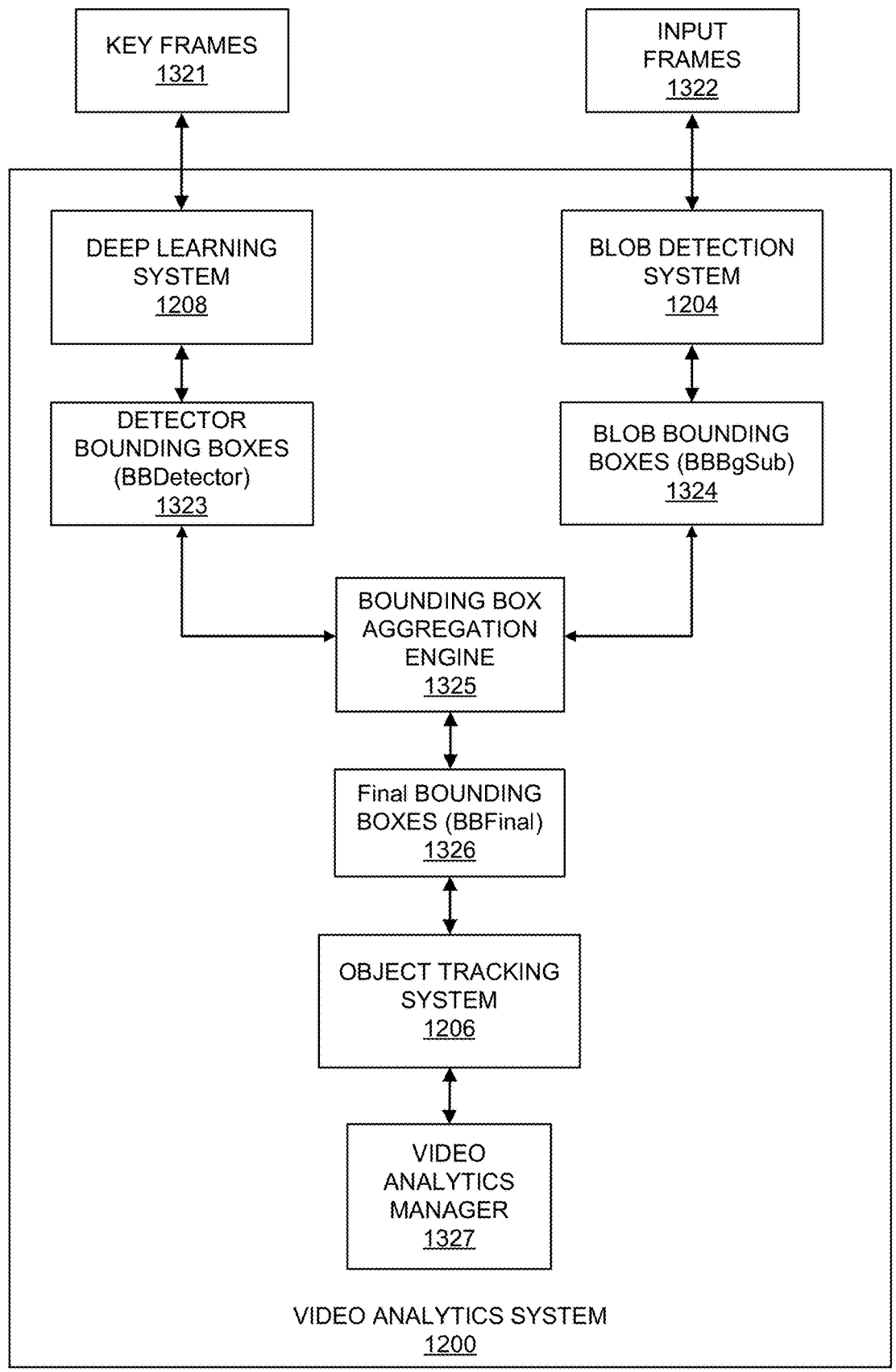
FIG. 13 is another block diagram illustrating the video analytics system including the deep learning system, in accordance with some examples.

FIG. 13 is a diagram illustrating a more detailed example of the video analytics system 1200. As previously noted, the video analytics system 1200 includes a deep learning system 1208 that implements a high complexity detector (e.g., based on deep learning based object detection) as part of a motion-based video analytics system (e.g., based on the detection and tracking of motion blobs, such as, for example, through background subtraction). The high complexity detector is applied by the deep learning system 1208 at a much lower frequency than motion-based blob detection is applied by the blob detection system 1204. For example, as shown in FIG. 13, the input to the deep learning system 1208 is every key frame 1321 of a video sequence, and the input to the blob detection system is every input frame 1322 of the video sequence. A key frame 1321 occurs every N frames, with N being an integer value determined based on the delay required to process a frame using the deep learning network and the frame rate of the video sequence. For example, the processing time for the deep learning system 1208 to apply the deep learning network to a frame is denoted as $T_d$, and assuming the system frame rate is fr, the high complexity detector is applied once every N=ceil($T_d$*fr) frames. Further details regarding application of the high complexity deep learning detector to the key frames is described below with respect to FIG. 17.

Accordingly, when the deep learning system 1208 is used, it can be applied to key frames 1321 only, and not to the remaining frames (referred to as the non-key frames). For example, at each key frame, the deep learning system 1208 applies a trained neural network to detect and classify objects in the frame, and can output detector bounding boxes 1323 for each of the classified objects. Each detector bounding box can be associated with a detected object. In some cases, a list of detector bounding boxes (denoted as BBDetector) can be generated and output by the deep learning system 1208. In some cases, if an object has never been detected or identified by the deep learning system 1208, only background subtraction is used to detect and track the object, and the tracker associated with the object is denoted as a normal confidence tracker. However, in such cases, once the object is detected by the deep learning system 1208 in a key frame, its associated tracker is denoted as a high confidence tracker (or HC tracker). In some implementations, when a bounding box is detected for an object in a key frame using the deep learning system 1208 (through deep learning), such a bounding box is referred to as a high confidence bounding box or a detector bounding box in the key frame and in subsequent non-key frames. As noted above, in some cases, once a tracker has at least one bounding box that is a high confidence bounding box detected in a key frame, the tracker is denoted as a high confidence tracker in the subsequent frames. In such cases, to continue tracking blobs (and associated objects) using a high confidence tracker across video frames, the object tracking system 1206 can perform data association between the bounding box of the high confidence tracker in the previous frame and a bounding box of a detected blob in a current frame (detected using the blob detection system 1204).

Figure 10:
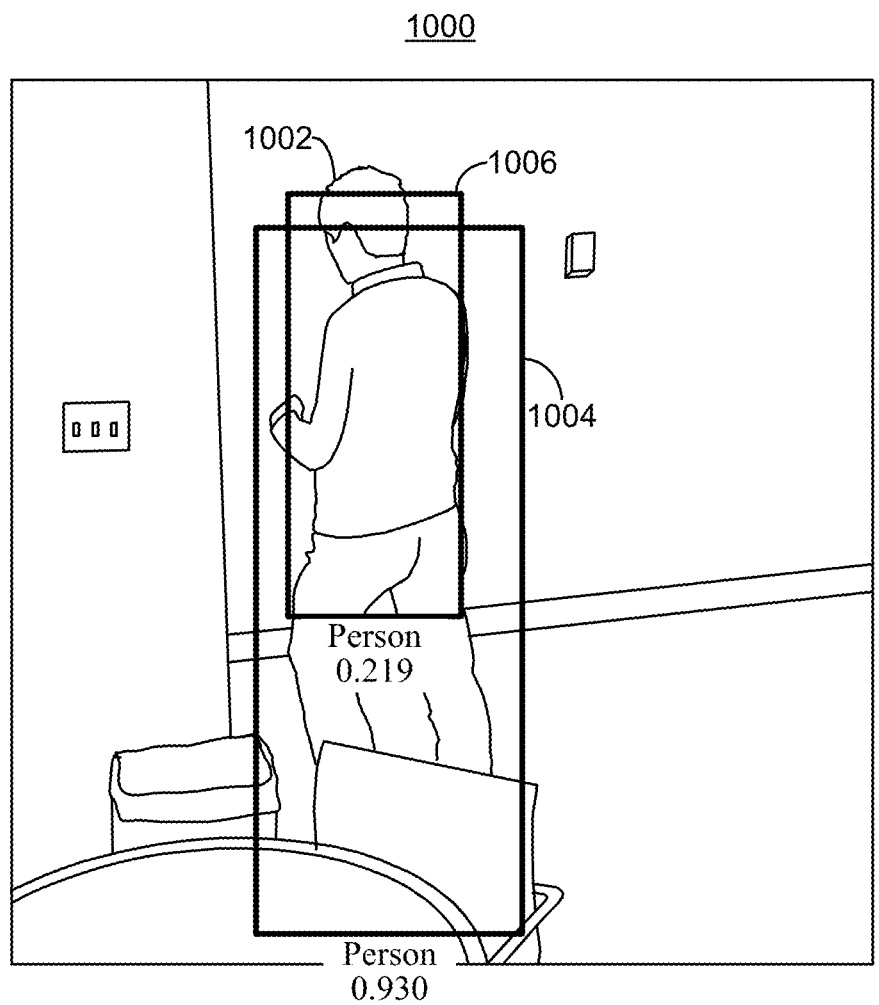
FIG. 10 is a video frame of an environment an object, in accordance with some examples.

By applying the trained neural network, the deep learning system 1208 can generate and output classifications and confidence levels (also referred to as confidence values) for each object detected in a key frame. One illustrative example is shown by the classifications and confidence levels shown in FIG. 10 (the object classified as a person with a 93% confidence using bounding box 1004). A classification and confidence level determined for an object can be associated with the bounding box determined for the object. For instance, the deep learning network applied by the deep learning system 1208 may provide detector bounding boxes 1323 for a key frame, along with a category classification and a confidence level (CL) associated with each detector bounding box. The object classification indicates a category determined for an object detected in a key frame using the deep learning classification network. Any number of classes or categories can be determined for an object, such as a person, a car, or other suitable object class that the deep network is configured to detect and classify. The one or more classes the deep network is configured to identify are application dependent and can be made configurable as part of the video analytics system 1200. The confidence level for an object indicates a likelihood (e.g., as a probability or other suitable representation of likelihood) that the object is of a particular category. For instance, the example shown in FIG. 10 illustrates that the detector applied to the frame 1000 indicated a probability of 93% (0.930) that the object detected using bounding box 1004 in the frame 1000 is a "person" class.

In some examples, object types can be defined for filtering bounding box results for a frame. For example, one object type can be defined and denoted as a Category of Interest (COI) and another object type can be defined and denoted as a Non-category of Interest (NOI). The definition of each category is application dependent and can be made configurable as part of the video analytics system 1200. In one illustrative example, persons, cars, pets, and animals can belong to the COI object type, while tables, desks, and plants can belong to the NOI object type. The deep learning system 1208 can include a pre-processing module (not shown) that can filter out (remove) the bounding boxes from the list of detector bounding boxes (BBDetector) 1323 if the bounding boxes are associated with an NOI object type. In some examples, only a COI object type can be defined for objects that are of interest to the video analytics system 1200, and any detected object that is not part of the COI object type can be filtered out from the detector bounding boxes 1323.

The blob detection system 1204 applies blob detection to the video frames 1322. The blob detection system 1204 is similar to and can perform the same operations as the blob detection system 104 described above with respect to FIG. 1-FIG. 4. As noted previously, blob detection can be performed at every input video frame 1322 of the received video sequence to detect blobs in the frames. In some cases, object detection can be performed for every other video frame or for some other suitable number of video frames. For an input frame currently being processed by the blob detection system 1204 (referred to herein as a current frame or current video frame), blob bounding boxes 1324 (representing detected blobs) are generated for blobs detected using the motion-based object detection techniques described above with respect to FIG. 1-FIG. 4. In some cases, a list of blob bounding boxes (denoted as BBBgSub) can be generated and output from the blob detection system 1204.

For a current key frame, a final set of bounding boxes 1326 can be determined using detector bounding boxes (or "high confidence bounding boxes") produced by the deep learning system 1208 and foreground bounding boxes produced by the blob detection system 1204 for the current key frame. For example, the foreground bounding boxes 1224 generated by the blob detection system 1204 and the detector bounding boxes 1323 generated by the deep learning system 1208 (in some cases, filtered from the pre-processing module) are output to the bounding box aggregation engine 1325. The bounding box aggregation engine 1325 can aggregate the blob bounding boxes 1323 and the blob bounding boxes 1324 (which can include lists of bounding boxes BBDetector and BBBgSub, respectively) to produce the final set of bounding boxes 1326 for a current key frame. The final set of bounding boxes 1326 for a key frame can include a final list of bounding boxes, which can be denoted as BBFinal. In some examples, a status can also be determined for each of the bounding boxes in the final set of bounding boxes 1326. Each of the bounding boxes in the final set 1326 can represent a blob detected for the video frame.

In some examples, for the key frames, the bounding box aggregation engine 1325 can analyze the detector bounding boxes 1323 and the blob bounding boxes 1324 to determine which bounding boxes to include in the final bounding boxes 1326 and to determine a status for the bounding boxes (and the blobs represented by the bounding boxes). Some examples described below are based on an association between bounding boxes from the blob bounding boxes 1324 and bounding boxes from the detector bounding boxes 1323. A first bounding box from the blob bounding boxes 1324 and a second bounding box from the detector bounding boxes 1323 can be determined to be associated with one another when a large portion of the area of the first or second bounding box belongs to an overlapping area of the first and second bounding boxes. The overlapping area can include an intersecting region, which includes a region that includes the overlapping portion of the first bounding box and the second bounding box.

In some examples, for a current non-key frame, a final set of bounding boxes 1226 can be determined using detector bounding boxes generated by the deep learning system 1208 in one or more previous key frames and also using foreground bounding boxes produced by the blob detection system 1204 for the current non-key frame. For example, the bounding box aggregation engine 1225 can aggregate the detector bounding boxes 1323 and the blob bounding boxes 1324 to produce the final set of bounding boxes 1226 for a current non-key frame. Similar to the final set of bounding boxes for a key frame, a status can be determined for each of the bounding boxes in the final set of bounding boxes for a non-key frame, and each of the bounding boxes in the final set can represent a blob detected for the non-key video frame.

Figure 14:
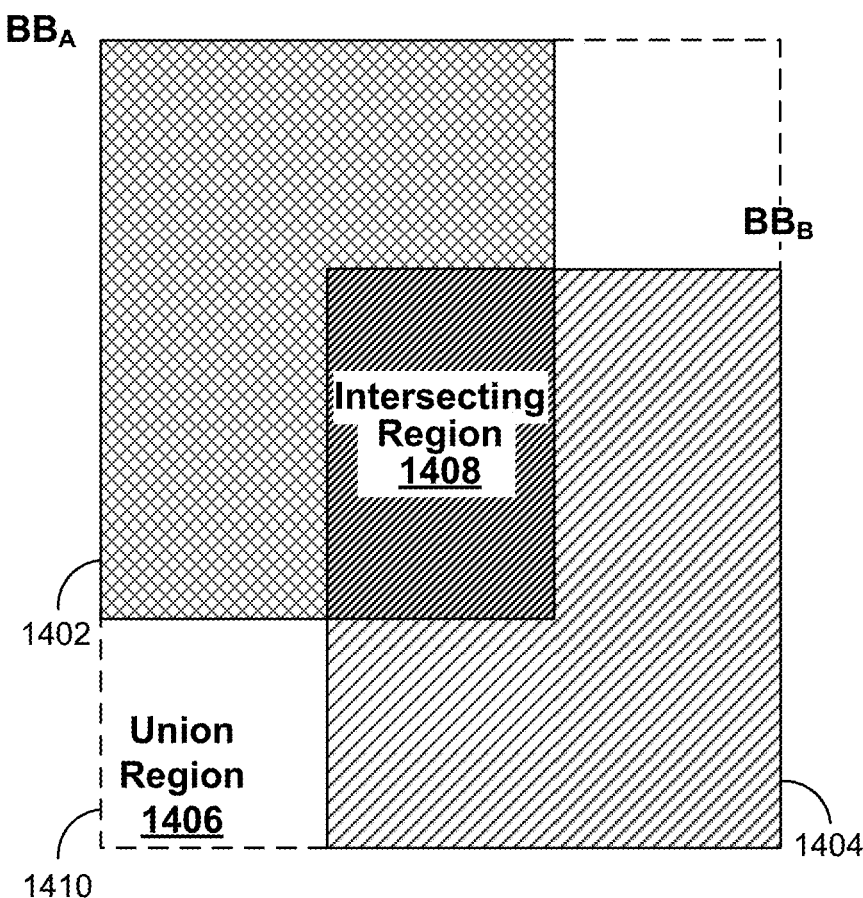
FIG. 14 is a diagram illustrating an example of an intersection and union of two bounding boxes, in accordance with some examples.

FIG. 14 is a diagram showing an example of an intersection I and union U of two bounding boxes, including bounding box $BB_A$ 1402 and bounding box $BB_B$ 1404. The bounding box $BB_A$ 702 can represent a detector bounding box for a current frame and the bounding box $BB_B$ 704 can represent a blob bounding box. The intersecting region 1408 includes the overlapped region between the bounding box $BB_A$ 1402 and the bounding box $BB_B$ 1404.

A union region 1406 of the bounding boxes $BB_A$ 1402 and $BB_B$ 1404 is determined by performing the union of bounding box $BB_A$ 1402 and bounding box $BB_B$ 1404. The union of bounding box $BB_A$ 1402 and bounding box $BB_B$ 1404 is defined to use the far corners of the two bounding boxes to create a new bounding box 1410 (shown as dotted line). More specifically, by representing each bounding box with (x, y, w, h), where (x, y) is the upper-left coordinate of a bounding box, w and h are the width and height of the bounding box, respectively, the union of the bounding boxes (denoted as $BB_1$ and $BB_2$ here) would be represented as follows:

$$Union(BB_1,BB_2)=(\min(x_1,x_2),\min(y_1,y_2),(\max(x_1+w_1-1,x_2+w_2-1)-\min(x_1,x_2)),(\max(y_1+h_1-1,y_2+h_2-1)-\min(y_1,y_2)))$$

Using FIG. 14 as an example, the first bounding box 1402 and the second bounding box 1404 can be determined to be associated with one another based on the intersecting region 1408. In one illustrative example, if the intersecting region 1408 is larger than a first overlapping threshold, the the first bounding box 1402 and the second bounding box 1404 can be determined to be associated with one another. The first overlapping threshold can be set to any suitable amount, such as a percentage of the size of the high confidence bounding box 1402. For example, the first bounding box $BB_A$ 1402 and the second bounding box 1404 can be determined to be associated with one another if $\cap(BB_A, BB_B)$ is larger than a first overlapping threshold defined as T0*BaseSize, where BaseSize is the size of the high confidence bounding box $BB_A$ 1402. The T0 may be set to any suitable value, such as 0.10, 0.125, 0.135, 0.15, or other suitable value. In another example, if an area of the first bounding box $BB_A$ 1402 and/or an area the second bounding box $BB_B$ 1404 within the intersecting region 1408 is greater than a second overlapping threshold, the the first bounding box $BB_A$ 1402 and the second bounding box $BB_B$ 1404 can be determined to be associated with one another. The second overlapping threshold can be set to any suitable amount, such as a such as 50%, 60%, 70%, or other configurable amount. For instance, the first bounding box $BB_A$ 1402 and the second bounding box $BB_B$ 1404 can be determined to be associated when at least 65% of the bounding box $BB_A$ 1402 or the bounding box $BB_B$ 1404 is within the intersecting region 1408.

In some cases, a low confidence scenario and a high confidence scenario can be defined, and different bounding box aggregation techniques or rules can be defined and used based on which scenario is present for a given video sequence. For example, a low confidence scenario can include situations when a deep learning based detector is typically less accurate in detecting objects with high confidence, and a high confidence scenario can include situations when a deep learning based detector is typically more accurate in detecting objects with high confidence. Deep learning based detectors are typically more accurate when objects are larger than a certain percentage of the frame size. For example, deep learning systems can perform poorly when an object is small relative to the height of the video frame, making it difficult to accurately detect and classify objects in the far range (or depth) of the image frame. In one illustrative example, for large objects that are greater than 80% of the video frame height, the true positive detection rate is around 60%; however, for small objects that are less than 30% of the video height, the true positive detection rate is drastically reduced to below 10%. Illustrative examples of high confidence scenarios include indoor scenes, outdoor scenes with close-up views of objects (the distance between the camera and the objects in the scene are typically small), or other scenes that include objects of interest that are larger than a threshold size (e.g., larger than a certain percentage of the video frame height, such as at least 80% of the frame height, or other suitable percentage that can be application dependent). For example, indoor scenario may be considered as high confidence scenario since the COI objects are typically big. Examples of low confidence scenarios can include any scenario that is not a high confidence scenario, such as an outdoor scene or other scene when objects are consistently smaller than the threshold size. For example, outdoor scenes may be considered as low confidence scenarios, especially if the distance between the camera and the objects in the scene are typically large (e.g., the distance is such that objects in the scene are less than 80% of the frame height, or other suitable percentage that can be application dependent).

In a high confidence scenario (e.g., a video sequence being captured of an indoor scene or other suitable high confidence scenario), the detector bounding boxes 1323 resulting from the high-complexity detector applied by the deep learning system 1208 may be considered as a necessary condition to retain blobs (and the corresponding blob bounding boxes 1324) detected by the blob detection system 1204. For example, in some cases, a bounding box from the blob bounding boxes 1324 (e.g., bounding boxes in the list BBBgSub) that is not associated with any bounding box from the detector bounding boxes 1323 (e.g., any bounding box in the list BBDetector) will be considered as a false positive bounding box (and thus a false positive blob and/or object). In such cases, any bounding box from the blob bounding boxes 1324 that is not associated with at least one bounding box from the detector bounding boxes 1323 will not be added to the final bounding boxes 1326 by the bounding box aggregation engine 1325. The status of such blob bounding boxes (that do not have an associated detector bounding box) will be set to indicate the blob and its bounding box as a false positive.

In some examples, regardless of whether a scene being captured by the video sequence is a low confidence scenario or a high confidence scenario, a detector bounding box from the detector bounding boxes 1323 with a high confidence level (e.g., a confidence level (CL) larger than or equal to a threshold confidence level TH) can be used to exclude any associated bounding box from the blob bounding boxes 1324 (BBBgSub) from being added into the final set of bounding boxes 1326 (BBFinal). For example, if a detector bounding box from the detector bounding boxes 1323 has a CL larger than the threshold TH, it can be determined whether the detector bounding box is associated with any blob bounding boxes from the blob bounding boxes 1324. The blob bounding boxes that are determined to be associated with the high confidence detector bounding box (having a CL>TH) can be excluded from the final set of bounding boxes 1326 by the bounding box aggregation engine 1325. The high confidence detector bounding box can be set to have a true positive status, indicating the bounding box represents a true positive object, and can be output immediately by the object tracing system 1206 (e.g., at the current frame or a next frame in the video sequence). A reason for excluding the associated one or more blob bounding boxes is that the high confidence detector bounding box can be considered to represent the object that is also represented by the associated blob bounding boxes, and since the detector bounding box represents the object with a high confidence, the results of the blob detection system 1204 are not needed to represent the object. For instance, the high confidence detector bounding box is accurate enough so that the blob bounding boxes may not be needed in the final set of bounding boxes 1326.

For low confidence scenarios, more deference can be given to the blob detection (background subtraction) results. In some cases, in a low confidence scenario (e.g., a video sequence being captured of an outdoor scene or other suitable low confidence scenario), a detector bounding box from the detector bounding boxes 1323 with a low confidence (e.g., having a CL smaller than TH) may only be included in the final bounding boxes 1326 (BBFinal) if the detector bounding box is determined to have one or more associated bounding boxes in the blob bounding boxes 1324 (BBBgSub). In such cases, if the detector bounding box is not associated with a blob bounding box, the detector bounding box is excluded from the final bounding boxes 1326. The detector bounding box can also be set to have a false positive status. In other cases, in a low confidence scenario, if a detector bounding box from the detector bounding boxes 1323 with a low confidence (e.g., having a CL smaller than TH) is not determined to have one or more associated bounding boxes in the blob bounding boxes 1324 (BBBgSub), the detector bounding box may be added to the final bounding boxes 1326 (BBFinal), but may not be output immediately (e.g., the status for the blob is not set to true positive or normal).

In some cases, in a low confidence scenario, results from the deep learning system 1208 may be considered as a sufficient condition to keep a blob bounding box (and the corresponding blob) detected by the blob detection system 1204. For example, a blob bounding box from the blob bounding boxes 1324 (BBBgSub) that is associated with one detector bounding box from detector bounding boxes 1323 (BBDetector) will be considered as a true positive object (bounding box with a true positive status) and can be refined by (replaced with) the associated detector bounding box from detector bounding boxes 1323. For instance, the associated detector bounding box can be added to the final bounding boxes 1326 instead of its associated blob bounding box, since the detector bounding box provides a more accurate localization for the detected object (represented by the blob and detector bounding box). In some cases, a bounding box in blob bounding boxes 1324 (BBBgSub) that is not associated with one item in detector bounding boxes 1323 (BBDetector) may still be kept in the final bounding boxes 1326 (BBFinal). Such cases can be beneficial in low confidence scenarios, since a blob detected by a blob bounding box may represent an object that the deep network detector 1208 was unable to detect (e.g., due to the object being small, or other reason).

In some cases, in both high and low confidence scenarios, if a bounding box from the blob bounding boxes 1324 (BBBgSub) corresponds to multiple bounding boxes from detector bounding boxes 1323 (BBDetector), any of the related bounding boxes from the detector bounding boxes 1323 can be added to the final bounding boxes 1326 (BBFinal) and may all be considered as true positive objects. For instance, when two or more detector bounding boxes from the detector bounding boxes 1323 (BBDetector) are associated with one blob from the blob bounding boxes 1324 (BBBgSub), regardless the status (whether it is outputted or not) of the blob from the blob bounding boxes 1324, the two or more bounding boxes from detector bounding boxes 1323 (BBDetector) will lead to two or more corresponding final bounding boxes in the final bounding boxes 1326 (BBFinal). In some examples, all of the corresponding final bounding boxes are set to be true positive objects (thus will be immediately output in the current frame video or a next frame). One illustrative example of when two detector bounding boxes can be associated with one blob bounding box is in a merge situation, in which case blob detection detected a single blob for two objects. The deep learning system bounding boxes can be added in the final set of bounding boxes in order to represent the individual objects, instead of including the merged blob bounding box in the final set of bounding boxes.

In some implementations, when a bounding box is identified as a true positive object through one of the above processes, it will be output immediately (e.g., in the current frame or at a next frame). For example, the object tracking system 1206 may output a tracker associated with the true positive bounding box as an alert (e.g., including a visual display of the tracker, an audible alert, or other alert) at the current frame or at a next frame in the video sequence. In some implementations, when a bounding box is identified as a false positive object through one of the above processes, it will be killed immediately. For example, a tracker associated with the false positive bounding box may be removed from a list of maintained trackers for the video sequence.

In some examples, in both high and low confidence scenarios (e.g., even under a high confidence scenario), if the size or height or width of a blob bounding box in the blob bounding boxes 1324 (BBBgSub) is smaller than a given threshold minN and the bounding box does not have any associated bounding box in the detector bounding boxes 1323 (BBDetector), the tracking status of the blob bounding box is not impacted by the results of the detector, similar to the case in the low confidence scenario.

In some examples, in both high and low confidence scenarios (e.g., even under a high confidence scenario), if a bounding box's confidence value of being a true positive derived through analyzing, for instance, the history of the bounding box (as determined by other video analytics processes), is very high (greater than a first confidence threshold TC1), a blob represented by the bounding box and its tracker may be output even if it is never associated with a bounding box in the detector bounding boxes 1323 (BBDetector). A confidence value for a tracker may fall into different confidence ranges, such as a very high confidence range (higher than a first confidence threshold TC1), a high confidence range (between a first confidence threshold TC1 and a second confidence threshold TC2), a low confidence range (between a second confidence threshold TC2 and a third confidence threshold TC3), and a very low confidence range (less than a third confidence threshold TC3), with the several thresholds TC1, TC2, and TC3 being between the different ranges. Details of determining confidence values for trackers are described in U.S. Provisional Application No. 62/510, 562, filed May 24, 2017, which is hereby incorporated by reference in its entirety, for all purposes.

If the confidence value is not very high (not greater than the first confidence threshold TC1), instead of checking other conditions, if the blob bounding box is never associated with any bounding box in the detector bounding boxes 1323 (BBDetector), the blob bounding box will not be output even though it passes a pixel level analysis (as determined by other video analytics processes). A pixel level analysis is described in U.S. Provisional Application No. 62/510,949, filed May 25, 2017, which is hereby incorporated by reference in its entirety, for all purposes.

FIG. 15A is a diagram illustrating an example of blob bounding boxes (BBBgSub) and detector bounding boxes (BBDetector) detected in a high confidence scenario. FIG. 15B is a diagram illustrating an example of a final set of bounding boxes (BBFinal) determined for the high confidence scenario. As illustrated by the key 1500, the detector bounding boxes are shown with diagonal line filling, the blob bounding boxes are shown with no fill, and the final bounding boxes are shown with dotted filling. The bounding boxes with dashed outlines are bounding boxes that are not output yet (they do not have a normal status or a true positive status).

As shown in FIG. 15A and FIG. 15B, the bounding boxes from the detector bounding boxes (BBDetector) make up the majority of the final bounding boxes (BBFinal). For example, only the blob bounding box 1504A out of the blob bounding boxes (BBBgSub) shown in FIG. 15A is used in the final bounding boxes (shown as final bounding box 1504B), while the remaining final bounding boxes include the detector bounding boxes. Such a situation occurs due to application of the various techniques described above. For example, blob bounding box 1506A is not included in the final set of bounding boxes (BBFinal) because there is no associated detector bounding box (from the detector bounding boxes BBDetector) for the blob bounding box 1506A. Such a blob bounding box fails the requirement that the detector bounding boxes are a necessary condition to retain the blob bounding boxes in the final set of bounding boxes. In another example, the blob bounding box 1508A is not included in the final set of bounding boxes because it is replaced by the detector bounding box 1510A (as shown by the final bounding box 1510B).

Since the example shown in FIG. 15A and FIG. 15B depicts a high confidence scenario, any bounding boxes from the detector bounding boxes (BBDetector) lead to a bounding box being output to the system even if the trackers associated with the detector bounding boxes (e.g., by data association engine 414) were previously not outputted. Such a scenario is illustrated by the blob-detector bounding box association 1502A in FIG. 15A and the final bounding box 1502B in FIG. 15B. For example, even though the blob bounding box in the association 1502A is not yet set to have an output status (e.g., a normal status), the detector bounding box in the association 1502A is added the final list of bounding boxes as the final bounding box 1502B. As shown, the blob bounding box from association 1502A is replaced by the detector bounding box from the association 1502A, and is included in the final bounding boxes as final bounding box 1502B.

Further, as shown in FIG. 15A and FIG. 15B, if an object is detected as a blob bounding box using blob detection and is being tracked using object tracking, but has not yet been output, the blob bounding box and object will be killed immediately if there is no associated bounding box in the detector bounding boxes (BBDetector) for the blob bounding box. For example, blob bounding box 1506A is not included in the final set of bounding boxes (BBFinal) because there is no associated bounding box in the detector bounding boxes for the blob bounding box 1506A.

In some cases, as shown in FIG. 15A and FIG. 15B, if a blob bounding box tracking an object has been output, the blob bounding box can be included in the final set of bounding boxes even if there is no associated detector bounding box from the detector bounding boxes (BBDetector). For example, the blob bounding box 1504A is shown in FIG. 15A as being output, but does not have an associated detector bounding box. In such a scenario, the blob bounding box 1504A can still be included in the final set of bounding boxes as final bounding box 1504B. In some cases, however, even if a blob bounding box and object has been outputted, if there is not an associated bounding box in the detector bounding boxes (BBDetector) for the blob bounding box for that object, the object (and the blob bounding box) can be killed. In such cases, the final bounding box 1504B may not be included in the final bounding boxes since the blob bounding box 1504A does not have an associated detector bounding box (as shown in FIG. 15A).

FIG. 16A is a diagram illustrating an example of blob bounding boxes (BBBgSub) and detector bounding boxes (BBDetector) detected in a low confidence scenario. FIG. 16B is a diagram illustrating an example of a final set of bounding boxes (BBFinal) determined for the low confidence scenario. As illustrated by the key 1600, the detector bounding boxes are shown with diagonal line filling, the blob bounding boxes are shown with no fill, and the final bounding boxes are shown with dotted filling. The bounding boxes with dashed outlines are bounding boxes that are not output yet (they do not have a normal status or a true positive status). The detector bounding boxes (BBDetector) are shown with rectangle lines having different weights, with the thicker lines representing detector bounding boxes with high confidence (e.g., above the threshold confidence level TH) and the less thick lines representing bounding boxes with low confidence (e.g., below the threshold confidence level TH).

As shown in FIG. 16A and FIG. 16B, any high confidence detector bounding boxes (with thick outlines) from the detector bounding boxes (BBDetector) will lead to a final bounding box being output at the system level even if the tracker (and associated blob bounding box) associated to it was previously not output. For example, the high confidence detector bounding box 1602A is included as a final bounding box 1602B that is output to the system, even though the blob bounding box 1604A (and its associated tracker) is not yet output at the system level (the tracker associated with blob bounding box 1604A does not have a normal status).

As also shown in FIG. 16A and FIG. 16B, a low confidence bounding box will not lead a tracker (and its associated blob bounding box) to be output immediately, but if there is a one-to-one association between the blob bounding box and a low confidence detector bounding box, the status of the blob bounding box will not be changed. For example, the low confidence detector bounding box 1606A is associated with the blob bounding box 1608A. As shown, the blob bounding box 1608A and its tracker and tracked object is not yet output. Because there is a one-to-one association between the low confidence detector bounding box 1606A and the blob bounding box 1608A, the status of the final bounding box 1606B is kept as not yet output (e.g., the status can be kept as "new"). As shown, the final bounding box 1606B is the detector bounding box 1606A that inherits the status of the blob bounding box 1608A.

As further shown in FIG. 16A and FIG. 16B, if a low confidence detector bounding box (e.g., bounding box detected for an object classified with a confidence level below TH) does not match any bounding box in the blob bounding boxes (BBBgSub), the low confidence detector bounding box will be part of the final bounding boxes (BBFinal), but the tracker associated with the low confidence detector bounding box will not be output immediately. For example, the low confidence detector bounding box 1610A does not have an associated blob bounding box (as shown in FIG. 16A), but is still added to the final list of bounding boxes (BBFinal) as final bounding box 1610B. As shown, the final bounding box 1610B has a dashed outline, indicating the tracker associated with the final bounding box 1610B is not yet output at the system level. As noted above, in some cases, a low confidence detector bounding box from the detector bounding boxes 1323 will not be included in the final bounding boxes (BBFinal) if the low confidence detector bounding box is not determined to be associated with any bounding boxes from the blob bounding boxes (BBBgSub). In such cases, the detector bounding box 1610A would be excluded from the final bounding boxes, and final bounding box 1610B would not be present.

As further shown in FIG. 16A and FIG. 16B, if a blob bounding box from the blob bounding boxes (BBBgSub) is determined to be associated with multiple bounding boxes from the detector bounding boxes (BBDetector), any of the associated detector bounding boxes from the detector bounding boxes (BBDetector) will be added to the final bounding boxes (BBFinal) and will be outputted immediately. For example, the blob bounding box 1616A is determined to be associated with detector bounding boxes 1612A and 1614A. The detector bounding boxes 1612A and 1614A are included in the final bounding boxes as final bounding boxes 1612B and 1614B, respectively, which are both output immediately to the system.

Returning to FIG. 13, the final bounding boxes 1326 can be output to the object tracking system 1206. The object tracking system 1206 can then use the final bounding boxes 1326 to perform object tracking. Object tracking can be performed using the techniques described above with respect to FIG. 1-FIG. 4. The final bounding boxes 1326 can be used as the blob bounding boxes for a current frame when performing cost determination (by the cost determination engine 412) and data association (by the data association engine 414). For example, with the final set of bounding boxes 1326, the object tracking system 1206 can track the objects in a frame similarly as that described above and using multi-to-multi tracking, with the exception that some objects may be determined to be true positive or false positive objects in the current frame based on the results from the bonding box aggregation engine 1325. Further details of multi-to-multi tracking techniques are described in U.S. application Ser. No. 15/384,911, filed Dec. 20, 2016, which is hereby incorporated by reference in its entirety, for all purposes.

The video analytics manager 1327 can record object detection and tracking events based on information from the object tracking system 1206. For example, a state machine ran by the object tracking system 1206 can update the states (or statuses) of the various trackers, and can provide the states to the video analytics manager 1327. The video analytics manager 1327 can maintain metadata for each of the trackers (and bounding boxes). The object tracking system 1206 can also predict the tracker positions for a next frame based on the positions of the blob for which the trackers are associated, as described above with respect to FIG. 1-FIG. 4. In one illustrative example, the object tracking system 1206 can implement a Kalman filter to predict the tracker positions. However, other tracking methods can also be performed, including optical flow, template matching, meanshift, camshift, and/or other suitable tracking methods.

Other techniques can be applied for non-key frames based on a final set of bounding boxes determined for a key frame, as described in more detail below. For example, a tracker associated with a detector bounding box from detector bounding boxes (BBDetector) can be tagged as a high priority tracker. In addition to the normal tracking operations described above with respect to FIG. 1-FIG. 4, various other methods can apply for a high priority tracker in a non-key frame that does not have deep learning results (due to detector bounding boxes (BBDetector) not being available for non-key frames).

In some examples, if a high priority tracker is lost in a non-key frame as the result of tracking, the high priority tracker is kept unchanged and will still be output for the current frame. In some examples, if a current blob bounding box (from BBBgSub) is associated with multiple high priority trackers, the current blob bounding box can be forced to be split into the multiple high priority tracker bounding boxes before the bounding boxes are output to the tracking engine. Such a situation can occur in a merge scenario, such as when two persons are standing close to each other.

In some examples, if a high priority tracker is split into multiple objects as a result of the tracking system, the objects (or bounding boxes) with a size significantly smaller than that of the high priority tracker can be merged into one object (or bounding box).

In some examples, if a high priority tracker has a one-on-one association with a detected bounding box and their sizes are comparable, normal tracking can be applied. In some cases, if a high priority tracker has a one-on-one association with a detected bounding box and its size is much larger than that of the associated bounding box from BBBgSub, its size is kept unchanged. In some cases, if the high priority tracker bounding box fully contains the detected bounding box, its position is not moved. In some cases, if the high priority tracker bounding box does not fully contain the detected bounding box, the tracker is shifted in a way that it covers all pixels of the detected bounding box but with a minimum center shift distance. Here, keeping the size means that the width and height of the bounding box are both unchanged.

In some examples, if a high priority tracker has a one-on-one association with a detected bounding box and its size is much smaller, the high priority tracker can be shifted to the center of the detected bounding box and its size is not changed.

For any current frame that contains both background subtraction bounding boxes and deep network detector bounding boxes, all trackers will be set to normal (i.e., not high priority) for the current frame before other processes apply.

The proposed method may introduce delay in video analytics, due to application of a deep learning detector to certain video frames. However, the whole end-to-end delay is not bounded by video analytics itself, and is typically determined by other components of the video system (e.g., determined by the video encoder). As noted previously, the high complexity detector is applied by the deep learning system 1208 at a lower frequency than motion-based blob detection is applied by the blob detection system 1204. Assuming the total allowed system delay is $D_s$, the delay for processing each frame using conventional video analytics (motion based blob detection and tracking as discussed with respect to FIG. 1-FIG. 4) is $D_c$, and the processing time for each high complexity (deep learning based) detector is $T_d$, the whole system delay is bounded by $T_d$ and it is required that $T_d$ is smaller than $D_s$ to avoid incurring additional delays. To make the whole system run smoothly, assuming the system frame rate is fr, it is proposed to apply the high complexity detector to key input frames—that is, once every $N=\text{ceil}(T_d*\text{fr})$ frames. The ceiling function (ceil(x)) returns the least integer that is greater than or equal to x.

Assuming the motion-based video analytics processes (e.g., those described with respect to FIG. 1-FIG. 4) can already be processed in real-time (i.e., $D_c*fr<T_d*fr$ and both are less than 1), in order to sync-up between the high complexity deep learning based detector results and the motion-based video analytics results, the system 1200 can buffer N+1 frames in memory. In other words, the system should be able to afford at least an initial system delay of $T_d$ and an extra memory of N frames. Note that although the input frames can be 1080p resolution or some other suitable resolution, background subtraction may apply to a much lower resolution (e.g., 640×360 or 320×180 resolution, such as for an indoor case). Therefore, in one illustrative example, if the high complexity detector (e.g., applied by deep learning system 1208) can be finished within 400 ms (at 30 frames per second), N is equal to 12 frames, requiring less than 5 MB additional memory consumption. For instance, using the equation above (i.e., N=ceil($T_d*fr$)), N=ceil(400 milliseconds*(30 frames/second))=12 frames.

Note that the overall system delay $D_s$ is max ($T_d$, $T_o$), wherein $T_o$ is the original delay of a motion-based video analytics system (without a high complexity detector). Only if $T_d$ is larger than $T_o$, additional delay is introduced. For example, a video encoder may require a 0.5 second delay, and if $T_d$ is 0.4 second, no additional delay is incurred. On the other hand, if $T_d$ is as large as 0.6 second, a 0.1 second delay is additionally introduced to the whole video analytics system.

Figure 17:
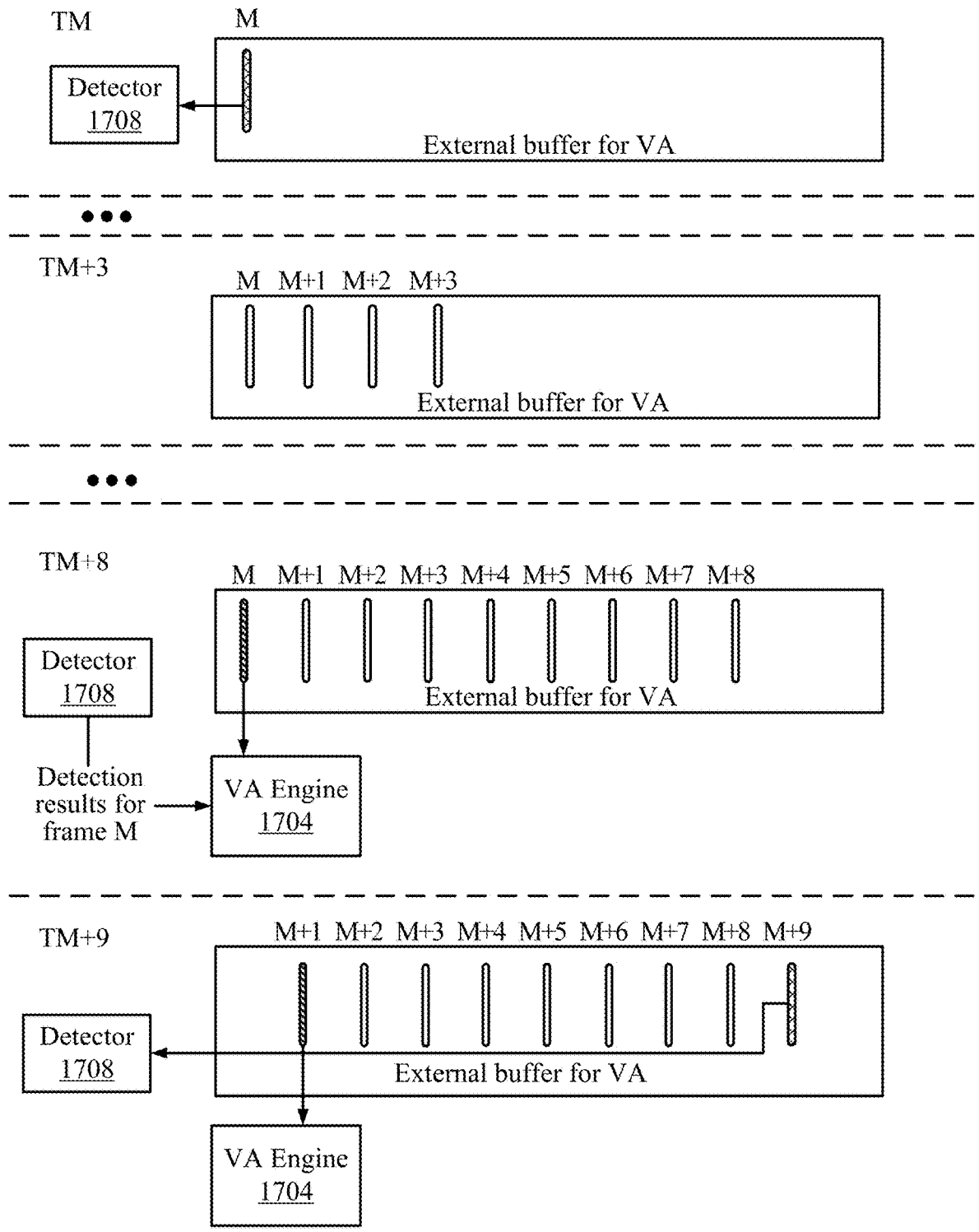
FIG. 17 is a diagram illustrating an example of a video sequence for application of a deep learning system and a blob detection system, in accordance with some examples.

FIG. 17 is a diagram illustrating an example framework of applying the various components of the video analytics system 1200. For simplicity, it is assumed frames are fed into the video analytics system 1200 with constant speed, thus the timestamps are represented by frame numbers. Here, frames are denoted by numbers M, M+1, M+2, and so on, while the time instances are denoted by $T_M$, $T_{M-1}$, $T_{M+2}$, and so on. For illustrative purposes, it is assumed that the video analytics system 1200 obtained the first frame of a video sequence at time $T_M$, and that the system 1200 can start the high complexity detector 1708 (using the deep learning system 1208) from frame M immediately. However, the motion-based video analytics components (blob detection and tracking, denoted as the VA Engine 1704 in FIG. 17) have to wait for the deep learning detection results and is thus delayed. An external buffer for blob detection is needed to store N frames. In the example shown in FIG. 17, the number of frames N is equal to 8. With N=8, no frames are fed into the VA Engine 1704 until time $T_{M+8}$. At time $T_{M+8}$, since detection results from frame M are ready, the detector bounding boxes (BBDetector) are fed into the VA engine 1704 together with frame M. At time $T_{M+9}$, frame M+9 is fed into the high complexity detector and meanwhile frame M+1 is fed into the VA engine 1704 (without corresponding detector results from the detector 1708 for frame M+9). Note that it is possible to feed frame M+8 to the detector 1708 at time $T_{M+8}$ as well.

In some examples, instead of feeding the frames once every N or N+1 frames, the high complexity detector 1708 may be used at an even lower frequency. For example, the frames can be fed into the detector 1708 once a second (every 30 frames in a 30 fps system, every 60 frames in a 60 fps system, or other corresponding set of frames for other suitable frame rates), once every second and a half, or at another suitable period of time.

In some cases, if the deep learning based detector 1704 finishes faster than expected (faster than N frames), the resulting detector bounding boxes can buffered until the same frame is fed into the VA engine 1704. For example, if the detector 1704 generates detected bounding boxes for frame M at time TM+3, the frame M can be fed into the VA engine 1704 along with the results for frame M from detector 1708.

In some cases, if the detector 1704 finishes slower than expected (e.g., when results of frame M+X are ready), in which case the VA engine 1704 would already be dealing with frame M+X+D (wherein M, X, and D are all positive integers), backward tracking similar to that described above for non-key frames may apply. For instance, the detector 1704 results can first be used to refine or replace the object trackers information in frame M+X+D−1, and then the tracking proposed above for non-key frames can be applied.

In some cases, if a detector finishes slower than expected (e.g., when results of frame M+X are ready), the video analytics system 1200 can monitor the delay and can adjust the input parameter N to achieve better synchronization. However, this may be bounded by the amount of extra memory that the system 1200 would allow for buffering the frames. In some cases, to help with memory amount, the buffered frames can be downsampled versions of the video frames of the supported camera stream. If the memory used for buffering the frames cannot be expanded and the system is still running with an underestimated N, the detector can process a later frame (in this case, frame M+X+N). In such cases, the system 1200 can compare the delay D with N/2. If D is larger than N/2, instead of applying the detector 1708 for detecting frame M+X+N, the next frame to be processed by detector 1708 will be frame M+X+2N. In this case, the availability of frame M+X+2N in the current time instance of $T_{M+x+D}$ needs to be checked, and if it is available, frame M+X+2N is fed into the detector 1708. Otherwise, the latest frame is fed into the detector 1708. Alternatively, whenever a delay is found, the latest frame is fed into the detector. As used herein, the "latest frame" is defined to be the frame available in the video analytics framework (the blob detection system 1204) with a largest frame number. For example, it is expected that, once every 1/fr second, a latest (newest) frame is fed into the video analytics framework.

FIG. 18 is a flowchart illustrating an example of a process 1400 of tracking objects in one or more video frames using the techniques described herein. At block 1802, the process 1800 includes determining a first set of one or more bounding regions for a video frame based on a trained classification network applied to the video frame. The first set of one or more bounding regions are associated with one or more objects in the video frame. In one illustrative example, the first set of one or more bounding regions can be generated by the deep learning system 1208. For instance, the first set of one or more bounding regions can include detector bounding regions. In some examples, a bounding region of the first set of one or more bounding regions is associated with an object classification, the object classification indicating a category of an object associated with the bounding region. In some cases, the bounding region of the first set of one or more bounding regions is associated with a confidence level. The confidence level indicates a likelihood that the object associated with the bounding region includes the category.

At block 1804, the process 1800 includes detecting one or more blobs for the video frame. As noted previously, a blob includes pixels of at least a portion of an object in the video frame. For example, as described above, the blob detection system 1204 can be used to detect or generate the one or more blobs for the video frame.

At block 1806, the process 1800 includes determining a second set of one or more bounding regions for the video frame. The second set of one or more bounding regions are associated with the one or more blobs. For example, the second set of one or more bounding regions can include the blob bounding regions generated by the blob detection system. The one or more bounding regions in the first set and the second set can include bounding boxes, bounding circles, bounding polygons, or any other suitable shape.

At block 1808, the process 1800 includes determining a final set of one or more bounding regions for the video frame using the first set of one or more bounding regions and the second set of one or more bounding regions. Several examples of determining the final set of one or more bounding regions for the video frame are described below.

At block 1810, the process 1800 includes performing object tracking for the video frame using the final set of one or more bounding regions. For example, the object tracking can be performed by the object tracking system 1206 described above.

In some examples, the video frame is part of a sequence of video frames capturing images of a scene. As described above, the blob detection can be performed for each video frame of the sequence to detect one or more blobs in each video frame, and the trained classification network can be applied to less than all video frames of the sequence of video frames. For example, the trained classification network can be applied every N frames, with N being an integer value determined based on the delay required to process a frame using the deep learning network and the frame rate of the video sequence.

In some examples, the process 1800 includes identifying an object classification associated with a bounding region of the first set of one or more bounding regions. The object classification indicates a category of an object associated with the bounding region. The process 1800 further includes determining the category of the object is not a category of interest, and removing the bounding region from the first set of one or more bounding regions in response to determining the category of the object is not a category of interest.

In some examples, the process 1800 includes determining an overlapping region between a first bounding region of the first set of one or more bounding regions and a second bounding region of the second set of one or more bounding regions. The process 1800 further includes determining an area of the first bounding region or the second bounding region within the overlapping region is greater than an overlapping threshold. The overlapping threshold can include the first overlapping threshold or the second overlapping threshold described above. The process 1800 further includes determining the first bounding region is associated with the second bounding region in response to determining the area of the first bounding region or the second bounding region within the overlapping region is greater than the overlapping threshold.

In some examples, the process 1800 includes determining a bounding region of the second set of one or more bounding regions is not associated with any bounding regions of the first set of one or more bounding regions. The process 1800 further includes excluding the bounding region from the final set of one or more bounding regions in response to determining the bounding region is not associated with any bounding regions of the first set of one or more bounding regions. In some cases, the bounding region is removed from the second set of one or more bounding regions only when a high confidence scenario is determined to be present. In some examples, a high confidence scenario is determined to be present when an indoor scene is captured by the video frame or when objects of interest in the scene are larger than a threshold size.

In some examples, the process 1800 includes determining a confidence value associated with a bounding region of the first set of one or more bounding regions is above a confidence threshold. The process 1800 further includes determining that, during object tracking for the video frame, a tracker associated with the bounding region will be output in response to determining the confidence value associated with the bounding region is above the confidence threshold.

In some cases, determining the final set of one or more bounding regions can includes determining a confidence value associated with a first bounding region of the first set of one or more bounding regions is above a confidence threshold, and determining a second bounding region of the second set of one or more bounding regions that is associated with the first bounding region of the first set of one or more bounding regions. The process 1800 can exclude the second bounding region from the final set of one or more bounding regions in response to determining the confidence value associated with the first bounding region is above the confidence threshold.

In some cases, determining the final set of one or more bounding regions includes determining a confidence value associated with a bounding region of the first set of one or more bounding regions is below a confidence threshold, and determining the bounding region is associated with at least one bounding region of the second set of one or more bounding regions. The process 1800 can add the bounding region to the final set of one or more bounding regions in response to determining the bounding region is associated with at least one bounding region of the second set of one or more bounding regions.

In some examples, determining the final set of one or more bounding regions includes determining a confidence value associated with a bounding region of the first set of one or more bounding regions is below a confidence threshold, and determining the bounding region is not associated with any bounding regions of the second set of one or more bounding regions. The process 1800 can exclude the bounding region from the final set of one or more bounding regions in response to determining the bounding region is not associated with any bounding regions of the second set of one or more bounding regions. In some cases, the bounding region is excluded from the final set of one or more bounding regions only when a low confidence scenario is determined to be present. In some examples, a low confidence scenario is determined to be present when an outdoor scene is captured by the video frame or when objects of interest in the scene are smaller than a threshold size.

In some cases, determining the final set of one or more bounding regions includes determining a confidence value associated with a bounding region of the first set of one or more bounding regions is below a confidence threshold, and determining the bounding region is not associated with any bounding regions of the second set of one or more bounding regions. The process 1800 can add the bounding region to the final set of one or more bounding regions based on the bounding region not being associated with any bounding regions of the second set of one or more bounding regions. In some examples, the process 1800 can determine that, during object tracking for the video frame, a tracker associated with the first bounding region will not be immediately output in response to determining the bounding region is not associated with any bounding regions of the second set of one or more bounding regions.

In some cases, determining the final set of one or more bounding regions includes determining a bounding region of the second set of one or more bounding regions is associated with at least two bounding regions of the first set of one or more bounding regions. The process 1800 can add the at least two bounding regions to the final set of one or more bounding regions in response to determining the bounding region is associated with at least two bounding regions of the first set of one or more bounding regions. In some examples, the process 1800 can determine that, during object tracking for the video frame, trackers associated with the at least two bounding regions will be output.

In some examples, determining the final set of one or more bounding regions includes determining a bounding region of the second set of one or more bounding regions is associated with at least one bounding region of the first set of one or more bounding regions, and determining first bounding region is associated with a true positive object in response to determining the bounding region is associated with at least one bounding region of the first set of one or more bounding regions. In some cases, the process 1800 can replace the bounding region with the at least one bounding region of the first set of one or more bounding regions.

In some cases, determining the final set of one or more bounding regions includes determining a bounding region of the second set of one or more bounding regions is not associated with any bounding regions of the first set of one or more bounding regions. The process 1800 can add the bounding region to the final set of one or more bounding regions based on the bounding region of the second set of one or more bounding regions not being associated with any bounding regions of the first set of one or more bounding regions. In some examples, the bounding region is added to the final set of one or more bounding regions only when a low confidence scenario is determined to be present. For example, a low confidence scenario can be determined to be present when an outdoor scene is captured by the video frame or when objects of interest in the scene are smaller than a threshold size.

In some examples, the process 1800 includes obtaining a subsequent video frame that is obtained later in time than the video frame. The subsequent video frame can be a non-key frame, in which case the trained classification network is not applied to the subsequent video frame. In such examples, the process 1800 includes determining, for the subsequent video frame, an associated bounding region is not detected for a bounding region of the first set of one or more bounding regions determined for the video frame. The process 1800 can maintain, for the subsequent video frame, the bounding region of the first set of one or more bounding region determined for the video frame based on an associated bounding region not being detected for a bounding region of the first set of one or more bounding regions determined for the video frame.

In some examples, the process 1800 can include obtaining a subsequent video frame that is obtained later in time than the video frame. The subsequent video frame can be a non-key frame, in which case the trained classification network is not applied to the subsequent video frame. In such examples, the process 1800 includes determining a bounding region determined for the subsequent video frame is associated with at least two bounding regions of the first set of one or more bounding regions determined for the video frame. The process 1800 can split the bounding region into the at two bounding regions for the subsequent video frame based on the bounding region determined for the subsequent video frame being associated with at least two bounding regions of the first set of one or more bounding regions determined for the video frame.

In some examples, the process 1800 can aggregate blob bounding boxes (e.g., the blob bounding boxes 1324) and detector bounding boxes (e.g., the detector bounding boxes 1323) for key frames and for non-key frames, as described in more detail below with respect to FIG. 19-FIG. 31. In some examples, the process 1800 can perform a crowd-based object detection and/or tracking, as described in more detail below with respect to FIG. 32-FIG. 46.

For example, the process 1800 can group the first set of one or more bounding regions into at least a first group of bounding regions and a second group of bounding regions. For instance, as noted above, the first set of one or more bounding regions can include detector bounding regions. The detector bounding regions can be grouped into at least the first group of bounding regions and the second group of bounding regions. In some examples, grouping the first set of one or more bounding regions into at least the first group and the second group includes determining a spatial relationship between at least two bounding regions from the first set of one or more bounding regions, and grouping the at least two bounding regions into the first group of bounding regions based on the spatial relationship. In some cases, the spatial relationship can include an amount of overlap between the at least two bounding regions. For example, the at least two bounding regions can be grouped into the first group of bounding regions when the at least two bounding regions overlap. In some examples, two or more groups of bounding regions are merged when at least one bounding region in a group from the two or more groups overlaps with a union of bounding regions in another group from the two or more groups.

The process 1800 can add at least one bounding region from the second set of one or more bounding regions to the first group. For example, as noted above, the second set of one or more bounding regions can include the blob bounding regions (also referred to as foreground bounding regions) generated by the blob detection system. At least one of the blob bounding regions can be added to the first group of bounding regions. In some cases, the at least one bounding region from the second set of bounding regions (e.g., a blob or foreground bounding region) can be added to the first group instead of the second group based on a spatial relationship (e.g., an overlap or the like) of the at least one bounding region with the first group and with the second group. For example, the at least one bounding region can be added to the first group based on an overlap between the one or more bounding regions from the second set and the first group and/or the second group of bounding regions (e.g., which can include detector bounding regions). In some cases, the group (e.g., the union of all detector bounding regions within the group) that has the largest overlap with the at least one bounding region (e.g., at least one blob or foreground bounding region) can be selected as the group to which the at least one bounding region is added.

The process 1800 can modify a first bounding region from the first group based on a second bounding region from the first group, where the second bounding region is from the added at least one bounding region (e.g., a blob bounding region) from the second set of one or more bounding regions. For example, the first bounding region can include a detector bounding region, and the detector bounding region can be modified based on the second bounding region (e.g., a blob bounding region). In some cases, modifying the first bounding region from the first group based on the second bounding region from the first group includes shifting a location of the first bounding region to align with a location of the second bounding region.

In some cases, the process 1800 can determine that the first group is a crowd group. Once the first group is determined to be a crowd group, the first bounding region (e.g., a detector bounding region) can be modified based on the second bounding region (e.g., a blob or foreground bounding region). Determining whether the first group is a crowd group can be based on one or more factors, which can be considered individually or in combination.

For example, in some cases, determining whether the first group is a crowd group can include determining that a number of detector bounding regions in the first group is greater than a threshold number of detector bounding regions. In such cases, the process 1800 can determine that the first group is a crowd group based on the number of detector bounding regions in the first group being greater than the threshold number of detector bounding regions. In some cases, determining whether the first group is a crowd group can include determining that a number of blob bounding regions in the first group is greater than a threshold number of blob bounding regions. In such cases, the process 1800 can determine that the first group is a crowd group based on the number of detector bounding regions in the first group being greater than the threshold number of detector bounding regions and also based on the number of blob bounding regions in the first group being greater than the threshold number of blob bounding regions.

In some cases, determining whether the first group is a crowd group can include determining a sum of sizes of one or more blob bounding regions in the first group is less than a sum of sizes of one or more detector bounding regions in the first group. In such cases, the process 1800 can determine that the first group is a crowd group based on the sum of sizes of the one or more blob bounding regions in the first group being less than the sum of sizes of the one or more detector bounding regions in the first group. In some examples, the process 1800 can determine that the first group is a crowd group based on the number of detector bounding regions in the first group being greater than the threshold number of detector bounding regions, based on the number of blob bounding regions in the first group being greater than the threshold number of blob bounding regions, and based on the sum of sizes of the one or more blob bounding regions in the first group being less than the sum of sizes of the one or more detector bounding regions in the first group. Other factors can also be considered when determining whether a group is a crowd group.

In some cases, the process 1800 can include obtaining a plurality of blob bounding regions that are in the first group, and selecting the first blob bounding region from the first group to use for modifying the first detector bounding region. In some examples, the first blob bounding region can be selected based on its size. For example, the process 1800 can determine that the first blob bounding region is a largest blob bounding region in the first group, and can select the first blob bounding region based on the first blob bounding region being the largest blob bounding region in the first group. In some examples, a threshold size can be considered when selecting the first blob bounding region to use for modifying the first detector bounding region. For example, the process 1800 can determine the first blob bounding region is larger than a threshold size, and can select the first blob bounding region based on the first blob bounding region being the largest blob bounding region in the first group and based on the first blob bounding region being larger than the threshold size.

In some cases, the process 1800 can include determining that multiple detector bounding regions in the first group are associated with the first blob bounding region in the first group. The process 1800 can determine costs associated with the multiple detector bounding regions. As described above, a cost associated with a detector bounding region is based on an amount the detector bounding region needs to be modified to be aligned with the first blob bounding region. The process 1800 can determine, based on a cost associated with the first detector bounding region being a lowest cost among the determined costs, to modify the first detector bounding region based on the first blob bounding region. For example, in such cases, the lowest cost detector bounding region can be modified to be align with a portion of the first blob bounding region.

In some aspects, the process 1800 can include determining one or more detector bounding regions from a boundary region of the first group. For example, the one or more detector bounding regions can be determined from the boundary region of the first group once the first detector bounding region has been modified and removed from a he list of high confidence trackers maintained for the group. The process 1800 can determine an amount of overlap between each of the one or more detector bounding regions and one or more remaining blob bounding regions in the first group. The process 1800 can then determine a second detector bounding region from the one or more detector bounding regions. The second detector bounding region can be determined based on the second detector bounding region having a largest amount of overlap with the one or more remaining blob bounding regions in the first group. The process 1800 can also determine a second blob bounding region from the one or more remaining blob bounding regions that has a largest spatial relationship with the second detector bounding region. The second detector bounding region can then be modified based on the second blob bounding region from the first group.

In some examples, the process 1800 can refine the first group of bounding regions. For example, the region refinement process described above can be used to refine the first group of bounding regions. In such examples, refining the first group of bounding regions can include checking a detector bounding region by removing the detector bounding region from the first group of bounding regions, and determining whether blob bounding regions from the group still overlap with the detector bounding regions that remain in the group. For example, the process 1800 can determine a union region of a set of remaining bounding regions in the first group after the detector bounding region has been removed, and can determine whether all blob bounding regions in the first group are overlapping with the union region. If all blob bounding regions in the first group are overlapping with the union region, the process 1800 can update the first group of detector bounding regions by excluding the detector bounding region from the first group.

The process 1800 can perform object tracking for an object in the video frame using the modified first bounding region. In some cases, the object tracking can be performed by the object tracking system 1206 described above. For instance, the modified first detector bounding region can be used by the object tracking system 1206 when performing cost determination (by the cost determination engine 412) and data association (by the data association engine 414).

In some examples, the process 1800 may be performed by a computing device or an apparatus, such as the video analytics system 100. In one illustrative example, the process 1800 can be performed by the video analytics system

1200 shown in FIG. 12 and FIG. 13. In some cases, the computing device or apparatus may include a processor, microprocessor, microcomputer, or other component of a device that is configured to carry out the steps of process 1800. In some examples, the computing device or apparatus may include a camera configured to capture video data (e.g., a video sequence) including video frames. For example, the computing device may include a camera device (e.g., an IP camera or other type of camera device) that may include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 1800 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

In some implementations, additional techniques are described herein for aggregating blob bounding boxes (e.g., the blob bounding boxes 1324) and detector bounding boxes (e.g., the detector bounding boxes 1323) for key frames and for non-key frames. As noted previously, blob bounding boxes can also be referred to herein as foreground bounding boxes, and detector bounding boxes can be referred to herein as high confidence bounding boxes. The following discussion will refer to blob bounding boxes 1324 as foreground bounding boxes 1324, and detector bounding boxes 1323 as high confidence bounding boxes 1323. The additional techniques can lead to advancements in various situations. For example, among other benefits, such techniques can accurately establish the association between multiple blob bounding boxes (foreground bounding boxes) and multiple detector bounding boxes (high confidence bounding boxes) in certain situations.

For example, for key frames and non-key frames, the bounding box aggregation engine 1325 can determine which bounding boxes to include in the final set of bounding boxes (e.g., final bounding boxes 1326) based on an association or mapping between the foreground bounding boxes 1324 and the high confidence bounding boxes 1323. In some cases, problems can arise when trying to associate the high confidence bounding boxes for a frame with the foreground bounding boxes for the frame. For example, there can be N-to-M matching between the high confidence bounding boxes and the foreground bounding boxes if only a certain ratio of overlap between the bounding boxes is used to determine the association. For example, a first bounding box from the foreground bounding boxes 1324 and a second bounding box from the high confidence bounding boxes 1323 could be determined to be associated with one another when a large portion of the area of the first or second bounding box belongs to an overlapping area of the first and second bounding boxes. Using such a technique, one foreground bounding box may be associated with multiple high confidence bounding boxes, and one of the high confidence bounding boxes may also be associated with another foreground bounding box.

Furthermore, when objects are merged together in a scene, as previously described, and not all of the objects are detected by the deep learning system 1208 (as high confidence bounding boxes), it can be difficult, and in some cases not possible, to preserve the bounding box of an undetected object. Also, when two objects are merged into one blob in a non-key frame that is subsequent to the last key frame to which the deep learning system 1208 was invoked, it can be difficult and in some cases impossible, by checking the foreground bounding boxes, to identify the individual bounding boxes of the two objects. Even further, when a high confidence bounding box is mapped to one or more foreground bounding boxes, it is not clear how such a high confidence bounding box and its associated foreground bounding boxes should be adjusted to reflect possible motion of the object corresponding to the high confidence bounding box.

A bounding box aggregation process is described herein for aggregating the foreground bounding boxes 1324 and the high confidence bounding boxes 1323 for key frames and for non-key frames. For example, a full solution is described herein that allows the bounding box aggregation engine 1325 to associate the high confidence bounding boxes 1323 with the foreground bounding boxes 1324, and based on an association type assigned to each association, produce a final set of bounding boxes. The final set of bounding boxes can then be used as the input to the object tracking system 1206, similarly as to how the foreground bounding boxes are used as input to object tracking described above with respect to FIG. 3 and FIG. 4. For instance, once the bounding box aggregation process generates the final set of bounding boxes from the foreground bounding boxes and the high confidence bounding boxes, instead of using the original foreground bounding boxes (of the detected blobs) to track the objects in the current frame, the final set of bounding boxes are used to track the objects in the current frame. For example, the cost determination engine 412, the data association engine 414, and the blob tracker update engine 416 can process the final set of bounding boxes for tracking the objects in the current frame. In addition, information obtained during the bounding box aggregation process is used in the tracking process so as to improve and/or modify various functions of the object tracking system 1206.

As described above, for a key frame, the high confidence bounding boxes are from the relevant bounding boxes generated by the detector/classifier applied by the deep learning system 1208. However, for the other frames (the non-key frames), the high confidence bounding boxes are the bounding boxes predicted from the high confidence trackers of the previous frame. For example, a high confidence bounding box that is to be used for a current non-key frame can be predicted from a high confidence bounding box of the high confidence tracker in the previous frame, by using, for example, a Kalman filter to predict the tracker bounding box positions. Other tracking methods can also be performed, including optical flow, template matching, mean-shift, camshift, and/or other suitable tracking methods to predict the high confidence tracker bounding box positions. In some cases, a high confidence bounding box of the current non-key frame can be set to be equal to the high confidence bounding box of the high confidence tracker in the previous frame.

The bounding box aggregation process is performed differently for key frames and non-key frames. For a key frame, any association with high confidence bounding boxes can be used to keep the associated high confidence bounding boxes as final bounding boxes. In some cases, for a key frame, the associated foreground bounding boxes can be removed such that they are excluded from the final set of bounding boxes. In some cases, for a key frame, at least a portion of a foreground bounding box can be kept in the final set of bounding boxes. For a non-key frame, associations of high confidence bounding boxes and foreground bounding boxes may lead to different outcomes, including one or more foreground bounding boxes being added to the final set of bounding boxes, one or more high confidence bounding boxes being added to the final set, and/or modifying one or more high confidence bounding boxes and adding the modified high confidence bounding boxes to the final set.

Regardless of whether current frame is a key frame or non-key frame, the bounding box aggregation process includes identifying various types of associations between the high confidence bounding boxes and the foreground bounding boxes. For example, in some examples, the bounding box aggregation process can sequentially perform the following five steps: 1) identify the associations with two or more high confidence bounding boxes corresponding to a single foreground bounding box; 2) for the remaining high confidence bounding boxes and remaining foreground bounding boxes, identify the associations with one single high confidence bounding box corresponding to two or more foreground bounding boxes; 3) for the remaining high confidence bounding boxes and remaining foreground bounding boxes, identify the association with a single high confidence bounding box and a single foreground bounding box; 4) for the remaining high confidence bounding boxes and remaining foreground bounding boxes, identify the association with a single high confidence bounding box and no corresponding foreground bounding box; and 5) for the remaining foreground bounding boxes, each belongs to an association with just a single foreground bounding box but no corresponding high confidence bounding box. One of ordinary skill will appreciate that, in some cases, instead of being performed sequentially, the five steps noted above may be performed in parallel, or in some other suitable sequence or order. Each of the five associations are denoted as a 1) merge association, 2) a split association, 3) a normal association, 4) an absorbed association (meaning the object has been absorbed into the background model), and 5) an N/D association (meaning not, never detected or non-detected for this foreground blob), respectively. For simplicity, such associations can also be denoted as a "merge", a "split", "normal", "absorbed," and "N/D".

In general, an association between a high confidence bounding box a foreground bounding box can be determined based on an overlap or intersection between the high confidence bounding box the foreground bounding box. A union of two or more bounding boxes can also be used by the bounding box aggregation process to determine a final set of bounding boxes. Using FIG. 14 as an example, the first bounding box 1402 and the second bounding box 1404 can be determined to be associated with one another based on the intersecting region 1408. In one illustrative example, if the intersecting region 1408 is larger than a first overlapping threshold, the the first bounding box 1402 and the second bounding box 1404 can be determined to be associated with one another. The first overlapping threshold can be set to any suitable amount, such as a percentage of the size of the high confidence bounding box 1402. For example, the first bounding box $BB_A$ 1402 and the second bounding box 1404 can be determined to be associated with one another if $\cap(BB_A, BB_B)$ is larger than a first overlapping threshold defined as T0*BaseSize, where BaseSize is the size of the the high confidence bounding box $BB_A$ 1402. The T0 may be set to any suitable value, such as 0.10, 0.125, 0.135, 0.15, or other suitable value. In another example, if an area of the first bounding box $BB_A$ 1402 and/or an area the second bounding box $BB_B$ 1404 within the intersecting region 1408 is greater than an intersection threshold, the the first bounding box $BB_A$ 1402 and the second bounding box $BB_B$ 1404 can be determined to be associated with one another. The intersection threshold can be set to any suitable amount, such as a such as 50%, 60%, 70%, or other configurable amount. For instance, the first bounding box $BB_A$ 1402 and the second bounding box $BB_B$ 1404 can be determined to be associated when at least 25% of the bounding box $BB_A$ 1402 or the bounding box $BB_B$ 1404 is within the intersecting region 1408.

Figure 19:
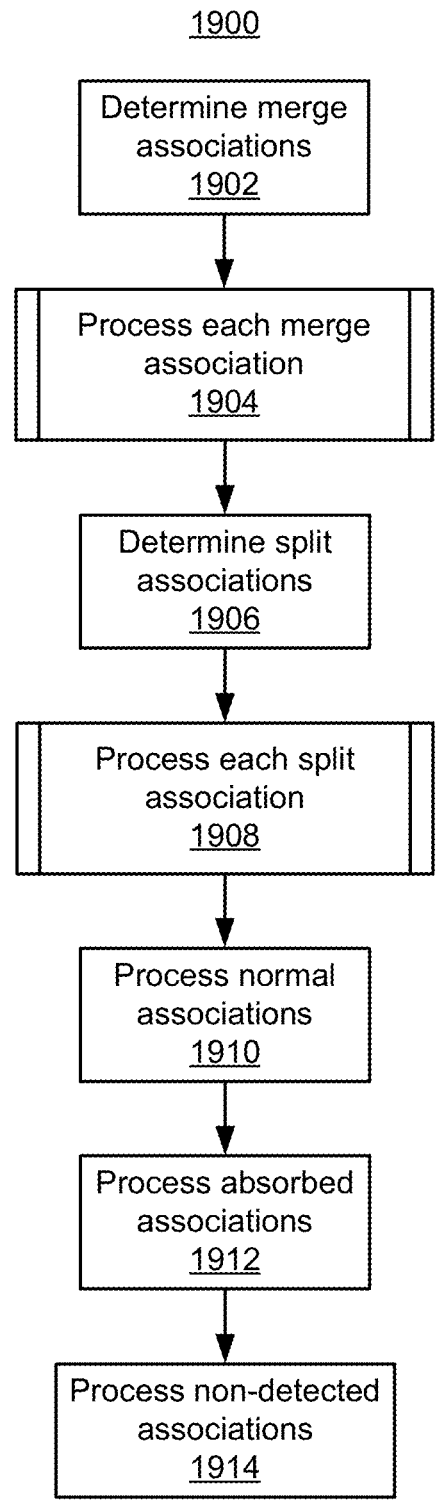
FIG. 19 is a flowchart illustrating an example of a bounding box aggregation process, in accordance with some examples.
Figure 28:
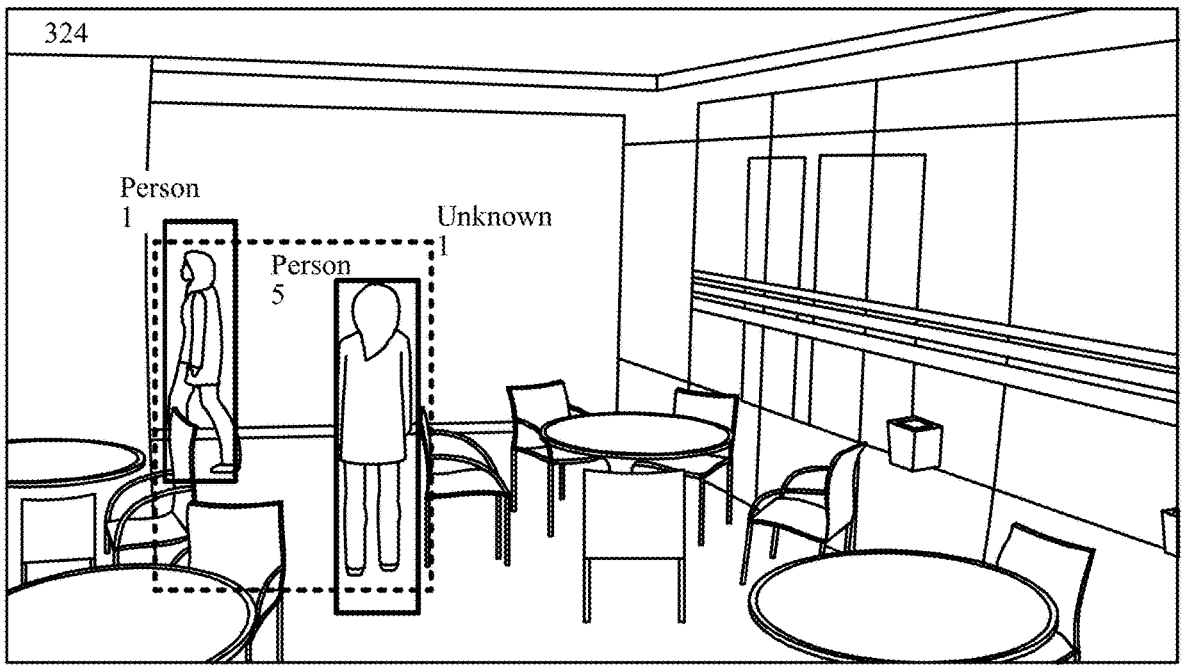
FIG. 28 is a video frame of a scene with objects being tracked, in accordance with some examples.

FIG. 19 is a flowchart illustrating an example of a bounding box aggregation process 1900 for determining and processing different types of associations between high confidence bounding boxes and foreground bounding boxes. At block 1902, the process 1900 determines any merge associations between the high confidence bounding boxes and the foreground bounding boxes for a current frame (for a key frame or for a non-key frame). As noted above, a merge association includes two or more high confidence bounding boxes associated with a single foreground bounding box. Such a scenario is considered a merge association because the two or more high confidence bounding boxes indicate that there are two or more objects (one object per high confidence bounding box) and the single associated foreground bounding box indicates that the two or more objects were merged into a single blob. An example of such a merge is shown in FIG. 28 (discussed further below), where a single foreground bounding box (corresponding to a merged blob) with tracker ID equal to "Unknown 1" is associated with two high confidence bounding boxes with tracker IDs equal to "Person 1" and "Person 5."

A merge association can be determined based on an overlap between two or more high confidence bounding boxes (or detector bounding boxes) and a foreground bounding box. For example, for each high confidence bounding box (denoted as hcBb[i]) in a set of high confidence bounding boxes for a current frame (either a key frame or a non-key frame), the process 1900 can identify the most overlapped foreground bounding box from a set of foreground bounding boxes for the current frame. The foreground bounding boxes detected for the current frame can be denoted as fgBb. For example, the most overlapped foreground bounding box can be identified by minimizing the overlap between hcBb[i] and each candidate fgBb (each candidate fgBb is denoted as fgBb[j]). The overlap can be minimized by selected the highest overlap amount (or intersection amount) according to the function n (fgBb[j], hcBb[i]), where ∩ is the intersection function. In some implementations, a candidate fgBb can be considered to be associated with hcBb[i] only if ∩ (fgBb[j], hcBb[i]) is larger than a first overlapping threshold T0*BaseSize, where BaseSize is the size of the hcBb[i]. The result can be a list of valid bounding box pairs (with each pair being denoted as (hcBb[i], fgBb[j])), and for each high confidence bounding box hcBb[i], the high confidence bounding box presents at most once in each list of valid bounding box pairs (hcBb[i], fgBb[j]). The T0 may be set to any suitable value, such as 0.10, 0.125, 0.135, 0.15, or other suitable value.

For each candidate foreground bounding box fgBb[j], if there are two or more pairs present in the list of valid bounding box pairs, a "merge" association is determined at block 1902. For example, if the list includes a single foreground bounding box (fgBb[j]) and multiple high confidence bounding boxes (e.g., hcBb[i0] and hcBb[i1]), the association is considered a merge association. An example list of bounding box pairs for a merge association includes {(hcBb[i0], fgBb[j]), (hcBb[i1], fgBb[j]), . . . }.

In one illustrative example, determination of a merge association can include the following steps:
 (a) For each high confidence bounding box, hcBb[i], identify the most overlapped fgBb by minimizing the overlap between hcBb[i] and each candidate fgBb, denoted as ∩(fgBb[j], hcBb[i]). In this example, a candidate fgBb is considered to be associated with hcBb[i] only if n (fgBb[j], hcBb[i]) is larger than T0*BaseSize, with BaseSize being the size of the hcBb[i]; this way, there is a list of valid bounding box pairs (hcBb[i], fgBb[j]) and for each hcBb[i], it presents at most once in the list. In this example, T0 may be set to 0.125;
 (b) For each of fgBb[j], if there are two or more pairs present in the list of valid bounding box pairs, a "merge" association is created as {(hcBb[i0], fgBb[j]), (hcBb[i1], fgBb[j]),}.

At block 1904, the process 1900 processes each of the merge associations determined at block 1902. The merge associations can be processed differently based on whether the current frame is a key frame or a non-key frame. For a merge association in a key frame, the at least two high confidence bounding boxes in the merge association are added to the final set of bounding boxes. In some cases, for split associations, normal associations, and absorbed associations, only the high confidence bounding boxes of the associations are added into the final set of bounding boxes, as described in more detail below. In some cases, a remain bounding box generation process can be performed for a merge association. For example, a portion of the associated foreground bounding box (of the merge association) remaining after the high confidence bounding boxes are removed can also be added into the final set of bounding boxes. Such a remaining portion of the foreground bounding box is referred to herein as a "remain bounding box." For example, a remain bounding box can be created when the at least two high confidence bounding boxes within the foreground bounding box are excluded, and a remaining portion of the foreground bounding box still contains a significant amount of foreground area even after the high confidence bounding boxes are excluded. Otherwise, such a remain bounding box is not created. In some cases, a remain bounding box can be created and added to the final set of bounding boxes only for key frames. In some cases, a remain bounding box can also be created and added to the final set for non-key frames.

Figure 20B:
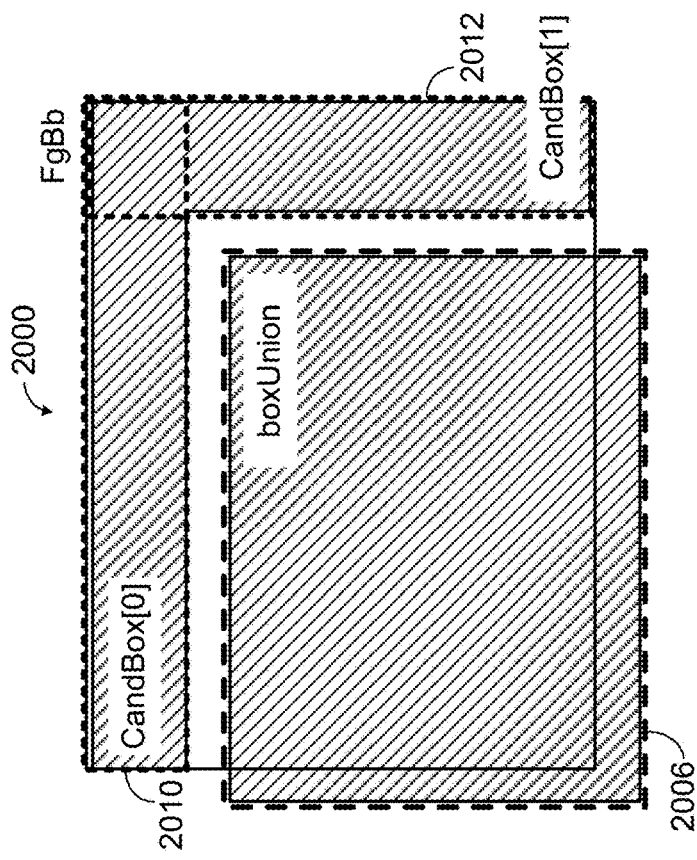
FIG. 20A and FIG. 20B are diagrams illustrating an example of a remain bounding box generation process, in accordance with some examples.
Figure 20A:
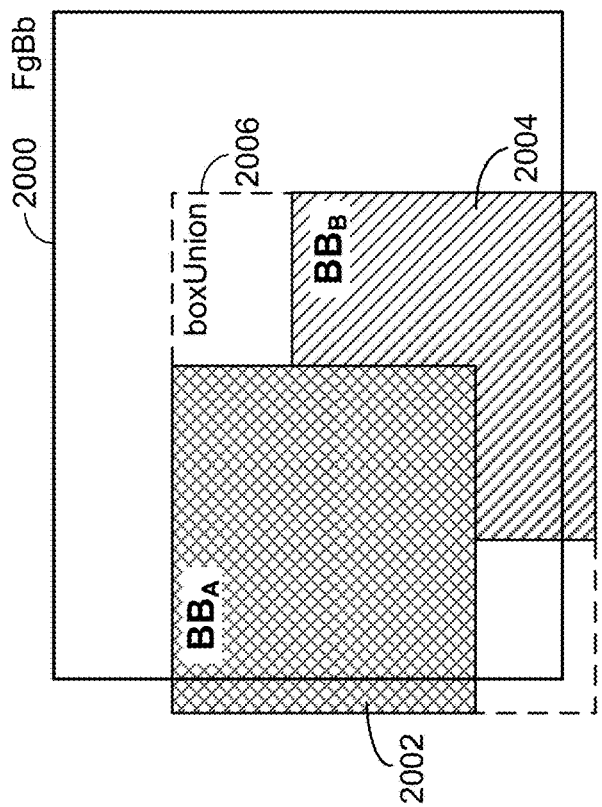

FIG. 20A and FIG. 20B are diagrams illustrating application of the remain bounding box generation process. As noted above, the remain bounding box generation process can be applied for a merge association to identify a "remain bounding box" belonging to the area of an associated foreground bounding box (of the merge association) where no high confidence bounding boxes are present. The input to the remain bounding box generation process can include a union region of all the relevant high confidence bounding box in the merge association, the foreground bounding box of the merge association, and the portion of the foreground mask corresponding to the foreground bounding box (e.g., the portion of the foreground mask that is encompassed by the foreground bounding box). The output of the remain bounding box generation process is a remain bounding box, which can be empty in some cases.

As shown in FIG. 20A, a merge association includes a foreground bounding box 2000 and two high confidence bounding boxes $BB_A$ 2002 and $BB_B$ 2004. The input to the remain bounding box generation process can include the union region 2006 of the two high confidence bounding boxes $BB_A$ 2002 and $BB_B$ 2004, the foreground bounding box 2000, and the foreground mask of the foreground bounding box. The union region 2006 is denoted as boxUnion. The remain bounding box generation process can first generate one or more candidate remain bounding boxes. Each of the candidate remain bounding boxes resides in the boundary of the foreground bounding box. For example, the candidate remain bounding boxes can be determined by taking the top, right, bottom, and left regions of the foreground bounding box that remain after excluding the boxUnion from the foreground bounding box. As shown in FIG. 20B, the candidate remain bounding boxes that remain after the union region 2006 (boxUnion) is removed include a first candidate remain bounding box 2010 (denoted as CandBox[0]) and a second candidate remain bounding box 2012 (denoted as CandBox[1]). In such an example, only the top and left remaining regions are present due to the union region 2006 taking up the entire bottom and right regions of the foreground bounding box 2000.

In some cases, a candidate remain bounding box can have a distance to the boxUnion. For instance, a distance between a candidate remain bounding box and the boxUnion can be due to there being two independent objects. If the candidate remain bounding box and the boxUnion are overlapped, they might be parts of the same object. In the example shown in FIG. 20B, the first candidate remain bounding box 2010 has a bottom boundary with a 4-pixel distance to the union region 2006 (boxUnion), and the second candidate remain bounding box 2012 has a left boundary with a 4-pixel distance to the union region 2006 (boxUnion). A top remain bounding box and a bottom remain bounding box have the same width as that of the foreground bounding box. A right remain bounding box and a left remain bounding box have the same height as that of the foreground bounding box. For example, as can be seen from FIG. 20B, the first candidate remain bounding box 2010 (CandBox[0]) is the same width as the foreground bounding box 2000, and the second candidate remain bounding box 2012 (CandBox[1]) is the same height as the foreground bounding box 2000.

Once all the candidate remain bounding boxes are generated for a merge association, the candidate remain bounding box that contains a maximum number of foreground pixels is selected as the final candidate remain bounding box. The final candidate remain bounding box is denoted as boxFinalCand. The foreground pixel fullness (numFgPixels), the size, the width, and the height of the final candidate remain bounding box (boxFinalCand) is inspected to further determine if the final candidate remain bounding box (boxFinalCand) should be used to produce a final remain bounding box. For example, whether to produce the final remain bounding box can be based on whether the final candidate remain bounding box (boxFinalCand) is greater than a candidate threshold. The candidate threshold can be based on the foreground pixel fullness (numFgPixels) of the final candidate remain bounding box (boxFinalCand). In some examples, the foreground pixel fullness can include the number of foreground pixels in the bounding box. In some examples, the foreground pixel fullness of a bounding box can include the ratio of number of foreground pixels (denoted as nFgPixl) within the bounding box as compared to the total number of pixels (both foreground and background pixels) of the bounding box (denoted as nPixl), which can be denoted as FPF=nFgPixl/nPixl. If the foreground pixel fullness (e.g., the number of foreground pixels (numFgPixels)) of the final candidate remain bounding box (boxFinalCand) is larger than a threshold percentage of the size of the final candidate remain bounding box (boxFinalCand), the final candidate remain bounding box (boxFinalCand) can be determined as the final remain bounding box. The size of the final candidate remain bounding box (boxFinalCand) can include the number of pixels in the bounding box, the width of the bounding box times the height of the bounding box, or other suitable measure of size. The final remain bounding box can then be analyzed for possible inclusion in the final set of bounding boxes. The threshold percentage can be set to any suitable value, such as 20%, 25%, 30%, or other suitable value.

Other factors can also be considered (alone or in combination with the candidate threshold) when determining whether to produce the final remain bounding box (boxFinalCand). In one example, the size of the final candidate remain bounding box (boxFinalCand) can be compared to a minimum size from the sizes of all of the high confidence bounding boxes in the current frame (denoted as minSize). For instance, the high confidence bounding box in the current frame that has the smallest size can be used to set the minSize threshold. The size of a high confidence bounding box can include the number of pixels in the bounding box, the width of the bounding box times the height of the bounding box, or other suitable measure of size. In such an example, if the size of boxFinalCand is larger than a threshold percentage of minSize, the final candidate remain bounding box (boxFinalCand) can be determined as the final remain bounding box. The threshold percentage can be set to any suitable value, such as 20%, 25%, 30%, or other suitable value.

In other examples, the width and/or the height of the final candidate remain bounding box (boxFinalCand) can be compared to the minSize to determine whether to produce the final remain bounding box. For example, if the width of the boxFinalCand is larger than a width threshold, the final candidate remain bounding box (boxFinalCand) can be determined as the final remain bounding box. The width threshold is based on the minSize, and can be set to any suitable value, such as sqrt(minSize/2). In another example, if the height of the boxFinalCand is larger than a height threshold, the final candidate remain bounding box (boxFinalCand) can be determined as the final remain bounding box. The height threshold is based on the minSize, and can be set to any suitable value, such as sqrt(minSize*2).

If one or more of the above-described conditions are not met, the final remain bounding box is considered empty, in which case no final remain box is produced for the foreground bounding box of the merge association.

In some cases, all of the above-described conditions can be required to be met in order to produce a final remain bounding box from a final candidate remain bounding box (boxFinalCand). In one illustrative example, only when all of the following conditions are met, a final remain bounding box is produced:

(a) numFgPixels is larger than 25% of the size of boxFinalCand;
(b) The size of boxFinalCand is larger than 25% of the minimum of the sizes of the all high confidence bounding boxes in the current frame (denoted as minSize);
(c) The width of the boxFinalCand is larger than sqrt(minSize/2); and
(d) The height of the boxFinalCand is larger than sqrt(minSize*2).

In such an example, at least one of the conditions is not met, the final remain bounding box is empty and no final remain bounding box is produced for the foreground bounding box.

Once a final remain bounding box is produced, the process 1900 can add the final remain bounding box to the final set of bounding boxes. In some cases, the final remain bounding box is added into the final set of bounding boxes without being marked as a high confidence bounding box. For example, in a subsequent frame, the final remain bounding box can be included in the list of foreground boxes and not in the list of high confidence bounding boxes.

For a merge association in a non-key frame, a merged objects location adjustment process can be performed to modify the multiple high confidence bounding boxes in the merge association. For example, the at least two high confidence bounding boxes in the merge association can be modified in a way that the shape (e.g., width and height) of each high confidence bounding box is kept the same, while the location of each high confidence bounding box may be adjusted. The merged objects location adjustment process can include identifying the relevant objects (with each object being represented by a high confidence bounding box) for the foreground bounding box of the merge association (where the irrelevant objects will be removed from the merge association), and adjusting the position of each of the relevant objects (and thus each relevant high confidence bounding box) one-by-one or at the same time.

The merged objects location adjustment process can identify the objects that are relevant to the foreground bounding box of the merge association by performing a set of iterative steps when certain conditions are met. The conditions can include that an overlap ratio between the foreground bounding box and the union of all of the relevant high confidence bounding boxes is increasing, and that the overlap ratio is smaller than an overlap ratio threshold. The overlap ratio threshold can be set to any suitable value, such as 0.60, 0.70, 0.75, 0.80, or other suitable value. For example, the iterative steps described below can be performed as long as the overlap ratio is increasing and the overlap ratio is smaller than an overlap ratio threshold.

To begin, the merged objects location adjustment process can define the overlap ratio as the overlap ratio between the foreground bounding box (denoted as curFgbb) of the merge association and the union of all the relevant high confidence bounding boxes from the association (detnoed as curTempUnionbb). For example, the overlap ratio can be defined as size(∩ (curFgbb, curTempUnionbb))/size(curTempUnionbb), which is the size of the intersection between curFgbb and curTempUnionbb divided by the size of the curTempUnionbb. The list containing all the relevant high confidence bounding boxes is denoted as RelevantList. The RelevantList is initially set to be empty; high confidence bounding boxes can iteratively be added to the RelevantList. The current overlap ratio is denoted as currOverlapRatio.

The merged objects location adjustment process can then determine if currOverlapRatio is larger than the overlap ratio threshold (e.g., 0.8). If so, the process is terminated. If currOverlapRatio is not larger than the overlap ratio threshold, the process continues. For example, the merged objects location adjustment process can find a high confidence bounding box from the current merge association that has not yet been added into the RelevantList. In some cases, the high confidence bounding box is selected so that the IoU of the high confidence bounding boxes in the RelevantList is maximized when the new high confidence bounding box is added. An IoU of two bounding boxes can include an overlapping area between a first bounding box and a second bounding box (e.g., the intersecting region 1408) divided by the union region (e.g., union region 1410) of the two bounding boxes $$\left( \text{denoted as } IoU = \frac{\text{Area of Intersecting Region 708}}{\text{Area of Union 710}} \right).$$

In such cases, the high confidence bounding box that most maximizes the IoU will be selected. The selected high confidence bounding box can be referred to as an optimal high confidence bounding box, and can be denoted as oHcBb. The maximized overlap ratio based on addition of the optimal high confidence bounding box is denoted as nextOveralpRatio.

The nextOveralpRatio can then be compared to the currOverlapRatio to determine whether the optimal high confidence bounding box (oHcBb) should be added to the RelevantList. For example, if nextOveralpRatio is smaller than currOverlapRatio, the process can be terminated and the optimal high confidence bounding box (oHcBb) is not added to the RelevantList. Oterhwise, if nextOveralpRatio is not smaller than currOverlapRatio, the optimal high confidence bounding box (oHcBb) is added to the RelevantList, and currOverlapRatio can be set to nextOveralpRatio. The process can then go to the next iteration to determine whether to add any further high confidence bounding boxes to the RelevantList.

The merged objects location adjustment process can then adjust the position of each of the relevant objects (and thus each relevant high confidence bounding box) in the relevant list of high confidence bounding boxes (RelevantList). For example, the relevant high confidence bounding boxes (in RelevantList) can be processed one-by-one so that the positions of the bounding boxes may be modified. Iteratively, the a relevant high confidence bounding box can be processed according to its overlap with the associated foreground bounding box. For example, the high confidence bounding box from RelevantList that has the most overlap with the foreground bounding box can be selected next. Once a high confidence bounding box is identified, its position is changed so that it covers a maximum number of foreground pixels within the foreground bounding box.

The merged objects location adjustment process can begin the position adjustment by selecting (from RelevantList) the high confidence bounding box that has the maximum overlap size with the foreground bounding box. The selected high confidence bounding box can be denoted as current high confidence bounding box (curHcBb). Once selected, the current high confidence bounding box (curHcBb) is removed from the relevant list of high confidence bounding boxes (RelevantList). The position of the current high confidence bounding box (curHcBb) is then adjusted. For example, the position of the current high confidence bounding box (curHcBb) can be moved by a step in each direction (left, right, up, and down) to determine which direction causes the curHcBb to cover the most additional foreground pixels than were covered before the move. For instance, the top left corner position (TLX, TLY) of the current high confidence bounding box (curHcBb) can be moved to (TLX−1, TLY), (TLX+1, TLY), (TLX, TLY−1), and (TLX, TLY+1) respectively. The direction that leads to the most foreground pixels being included in the curHcBb is selected as the new candidate position of the curHcBb. The number of foreground pixels covered by the curHcBb in the new candidate position can then be compared to the number of foreground pixels that were covered by the curHcBb before the move. If the number of foreground pixels covered by the curHcBb in the new candidate position is larger than the number of foreground pixels that were covered by the curHcBb before the move, the current high confidence bounding box (curHcBb) is moved to the new candidate position. New candidate positions can be checked in an iterative manner until a new candidate position does not result in more foreground pixels being covered by the current high confidence bounding box (curHcBb).

A specific illustrative example of the merged objects location adjustment process can include:
  (a) Initialize the number of steps (NStep) as zero; denote the number of pixels covered by curHcBb as currFgAreaSize;
  (a) Apply the following steps while NStep is smaller than a threshold TStep, horizontally moved distance xShift is smaller than a threshold Thor, and vertically moved distance yShift is small than a threshold TVer:
    (i) Try to move to the left, right, top and bottom of the current bounding box curHcBb (top left corner position (TLX, TLY) being changed to (TLX−1, TLY), (TLX+1, TLY), (TLX, TLY−1), and (TLX, TLY+1), respectively). For each move, calculate the number of foreground pixels covered by the moved bounding box (with height and width kept unchanged), and denote those numbers as nextFgAreaSize[i] (i from 0 through 3, for each move). Select an index idx such that nextFgAreaSize[idx] is largest.
    (ii) If nextFgAreaSize[idx] is larger than currFgAreaSize, move the bounding box accordingly: idx being equal to 0, 1, 2, or 3, corresponding to a move of (TLX−1, TLY), (TLX+1, TLY), (TLX, TLY−1), and (TLX, TLY+1) respectively.
    (iii) Else, terminate the process and finishe the position adjustment.

Figure 25:
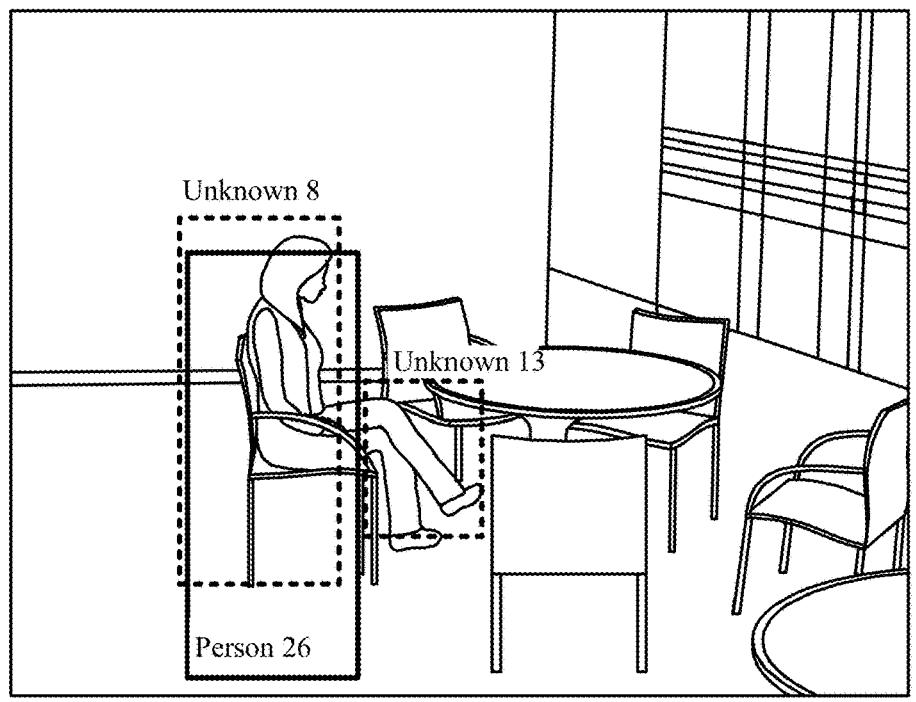
FIG. 25 is another video frame of a scene with an object being tracked, in accordance with some examples.

Returning to FIG. 19, the process 1900 determines, at block 1906, any split associations between the remaining high confidence bounding boxes and the remaining foreground bounding boxes for the current frame (for a key frame or for a non-key frame) that remain after the merge associations are determined and processed. As previously described, a split association includes one single high confidence bounding box associated with two or more foreground bounding boxes. Such a scenario is considered a split association because the high confidence bounding box indicates that there is one single object (as detected in a key frame with the high confidence bounding box) and the multiple associated foreground bounding boxes indicate that two or more blobs are now detected for the single object. An example of such a split is shown in FIG. 25 (discussed further below), where a single high confidence bounding box with tracker ID equal to "Person 26" is associated with two foreground bounding boxes with tracker IDs equal to "Unknown 8" and "Unknown 13."

A split association can be determined based on an overlap between a high confidence bounding box (or detector bounding box) and two or more foreground bounding boxes. For example, for each foreground bounding box (denoted as fgBb[j]) of the remaining foreground bounding boxes for a current frame (either a key frame or a non-key frame), the process 1900 can identify the most overlapped high confidence bounding box from the remaining high confidence bounding boxes for the current frame. For example, the most overlapped high confidence bounding box can be identified by minimizing the overlap between fgBb[j] and each candidate high confidence bounding box. Each candidate high confidence bounding box is denoted as hcBb[i]. The overlap can be minimized by selected the highest overlap amount (or intersection amount) according to the function n (fgBb[j], hcBb[i]), where n is the intersection function. In some implementations, a candidate hcBb[i] can be considered to be associated with a fgBb only if n (fgBb[j], hcBb[i]) is larger than a first overlapping threshold T1*BaseSizeFg, where BaseSizeFg is the size of the fgBb[i]. The result can be a list of valid bounding box pairs (with each pair being denoted as (hcBb[i], fgBb[j])), and for each foreground bounding box (fgBb[i]), the foreground bounding box presents at most once in each list of valid bounding box pairs (hcBb[i], fgBb[j]). The term T1 is larger than T0, and can be set to any suitable value, such as 0.20, 0.25, 0.30, or other suitable value.

For each candidate high confidence bounding box (hcBb [i]), if there are two or more pairs present in the list of valid bounding box pairs, a "split" association is determined at block 1906. For example, if the list includes a single high confidence bounding box (hcBb[i]) and multiple foreground bounding boxes (e.g., fgBb[j0], fgBb[j1]), the association is considered a merge association. An example list of bounding box pairs for a split association includes {(hcBb[i0], fgBb [j0]), (hcBb[i1], fgBb[j1]), . . . }.

In one illustrative example, determination of a split association can include the following steps:
  (a) For each foreground bounding box, fgBb[j], identify the most overlapped high confidence bounding box by minimizing the overlap between fgBb[j] and each candidate high confidence bounding box (hcBb[i]), denoted as ∩ (fgBb[j], hcBb[i]). In this example, a fgBb is considered to be associated with a candidate hcBb[i], only if ∩ (fgBb[j], hcBb[i]) is larger than T1*BaseSizeFg, wherein BaseSizeFg is the size of the fgBb[i]; this way, there is a list of valid bounding box pairs (hcBb[i], fgBb[j]) and for each fgBb[i], it presents at most once in the list. In this example, T1 may be set to 0.25, which is larger than T0.
  (a) For each of hcBb[i], if there are two or more pairs present in the list of valid bounding box pairs, a "split" association is created as {(hcBb[i], fgBb[j0]), (hcBb[i], fgBb[j1])}.

At block 1908, the process 1900 processes each of the split associations determined at block 1906. The split associations can also be processed differently based on whether the current frame is a key frame or a non-key frame. For a split association in a key frame, the at least two high confidence bounding boxes in the merge association are added to the final set of bounding boxes. As described above, for split associations, the high confidence bounding boxes are added into the final set of bounding boxes for the current frame.

For a split association in a non-key frame, the multiple foreground bounding boxes can be unified to present a single unified foreground bounding box. In addition, as described in more detail below, for both split and normal associations, the high confidence bounding box and the single foreground bounding box (either the one foreground bounding box directly from a normal association or the unified foreground bounding box from a split association) are considered together using a bounding box pair aggregation process to produce one single bounding box for inclusion in the final set of bounding boxes.

As noted above, for a split association in a non-key frame, the two or more foreground bounding boxes of the split association will be used to generate a unified bounding box to be considered for insertion into the final set of bounding boxes (based on the bounding box pair aggregation process described below). For example, for a given high confidence bounding box (denoted as hcBb), the list of associated foreground bounding boxes is created. The list of associated foreground bounding boxes is defined as {fgbb[i], i through 0 to n, inclusive and n>0}. The list of associated foreground bounding boxes is denoted as initFgList, and each entry in initFgList is denoted as fgbb[i]. An iterative process can then be applied so that, for each iteration, an optimal foreground bounding box is selected. In some cases, the optimal foreground bounding box that is chosen at a given iteration can be the foreground bounding box that maximizes the number of pixels in the high confidence bounding box (hcBb) while minimizing the number of pixels outside of the high confidence bounding box (hcBb). For example, the size of each entry fgbb[i] in the initFgList can be denoted as curFgbb-Size. The amount of overlap (denoted as overlapSize) between each entry fgbb[i] and the high confidence bounding box (hcBb) can be determined as size (hcBb n fgbb[i]). An amount of increase (denoted as increasedSize) attributable to each entry fgbb[i] can then be calculated as overlapSize*2−curFgbb Size. The foreground bounding box entry fgbb[i] with the maximum number of increasedSize is selected as the optimal foreground bounding box for the given iteration. The selected optimal foreground bounding box can be denoted as fgbb[k], the increasedSize of the selected optimal foreground bounding box can be denoted as addSize. The selected optimal foreground bounding box gets removed from the initFgList {fgbb[i]}.

The currently chosen optimal foreground bounding box can be used to create a unified bounding box (denoted as boxU). Once the number of chosen foreground bounding boxes (which can be included in a list denoted as listofChosenFgBb) is larger than a threshold number (e.g., 1, 2, 3, or other suitable number), a unified bounding box generation process (as described in the bullet (d) below) can be used to prevent the unified bounding box from becoming significantly bigger than the high confidence bounding box (hcBb) in the split association. For example, if the number of entries in listofChosenFgBb is larger than 1, the process can define a temporary unified bounding box tBoxU that is equal to boxU ∪ fgbb[k], where ∪ is the union operation and fgbb[k]

is the selected optimal foreground bounding box for the current iteration. If one bounding box is empty in the union operation, the results of the union is set to be the other bounding box in the union operation. For example, at the first iteration, the boxU may be empty, in which case the initial tBoxU can be set equal to fgbb[k].

The unified bounding box generation process can then define an overlapping bounding box (denoted as tempBoxOverlap) that is the overlapping region (or intersecting region) between the temporary unified bounding box (tBoxU) and the high confidence bounding box (hcBb). For example, the overlapping bounding box can be defined as tempBoxOverlap=(tBoxU ∩ hcBb). The unified bounding box generation process can determine an amount (denoted as unifyIncreasedSize) by which the unified bounding box (boxU) increases based on the tBoxU by subtracting the size of the tBoxU by the size of the tempBoxOverlap. For example, unifyIncreasedSize can be defined as size (tBoxU)—size (tempBoxOverlap). If either or both unifyIncreasedSize and the size of the chosen optimal foreground bounding box (fgbb[k]) are significantly large compared to the size of the high confidence bounding box (hcBb), the whole process can be terminated. For example, the significance of the size (of unifyIncreasedSize and fgbb[k]) can be defined as a threshold percentage of the size of the high confidence bounding box (hcBb) of the split association. The threshold percentage can be set to any suitable value, such as 15%, 20%, 25%, 30%, or other suitable value. Further, if either or both addSize is small enough and the size of the chosen optimal foreground bounding box (fgbb[k]) is small enough, the whole process can be terminated. In one example, the two conditions are addSize<minGlobalSize and size(fgbb[k]*25%)<minGlobalSize. Other suitable thresholds can be used to determine if addSize and thesize of fgbb[k] are small enough. The minGlobalSize may be set globally, after merge associations have been determined. For instance, can may be set to the minimum size of all the high confidence bounding boxes that do not belong to merge associations. The unified bounding box (boxU) can then be set to be equal to tBoxU.

An illustrative example of generating a unified bounding box (boxU) from two or more foreground bounding boxes of the split association is as follows (with boxU being the final output):
  (a) Create a listofChosenFgBb and set it to empty; Create a bounding box of boxU and set to empty;
  (b) Find the optimal bounding box in the initFgList which maximize the number of pixels in the hcBb while minimizing the number of pixels outside the hcBb. For each entry fgbb[i] in the initFgList, denote its size as curFgbbSize; and the overlapSize as size (hcBb ∩ fgbb[i]), the increasedSize is calculated as overlapSize*2−curFgbbSize. The one with the maximum number of increasedSize is chosen. Denote such a Fg BB as fgbb[k]; Denote addSize as the increasedSize of the chosen Fg BB.
  (c) Remove fgbb[k] from initFgList and add fgbb[k] into the listofChosenFgBb.
  (d) If the number of entries in listofChosenFgBb is larger than 1, the following applies:
    (i) Define a bounding box tBoxU=(boxU u fgbb[k]); Note that if one bounding box is empty in the ∪ operation, the results of that operation is set to be the other bounding box in the ∪ operation.
    (ii) Define a bounding box tempBoxOverlap= (tBoxU∩hcBb);
    (iii) Define a unifyIncreasedSize as size (tBoxU)—size (tempBoxOverlap);
    (iv) If both unifyIncreasedSize and the size of the chosen Fg bb are significant large compared to the size of hcBb, the whole process is terminated. For example, the significance may be defined as 25% of the size of hcBb.
    (v) If both addSize is small enough and the size of the chosen Fg bb is small enough, whole process is terminated. In one example the two conditions are addSize<minGlobal Size and size(fgbb [k]*25%) <minGlobal Size
      (1) Here minGlobalSize may be set globally, after merge associations have been determined. In other words, it is set to the minimum size of all the High Confidence BBs which do not belong to merge associations.
  (e) Set boxU to be equal to tBoxU.

Returning to FIG. 19, the process 1900, at block 1910, processes normal associations between the remaining high confidence bounding boxes and the remaining foreground bounding boxes for the current frame (for a key frame or for a non-key frame) that remain after the merge associations and split associations are determined and processed. As previously described, a normal association includes a single high confidence bounding box associated with a single foreground bounding box. The association between a single high confidence bounding box associated with a single foreground bounding box can be determined based on the amount of overlap between the bounding boxes, as described previously.

In some cases, for normal associations in a key frame, the high confidence bounding box of the normal association is added into the final set of bounding boxes. In some cases, as noted previously, a bounding box pair aggregation process can be applied to split associations and also to normal associations in non-key frames to determine a single bounding box for inclusion in the final set of bounding boxes. The bounding box pair aggregation process can take one high confidence bounding box (hcBb) and one foreground bounding box (fgBb) as inputs, and can produce one final bounding box (finalBb) as an output. For a split association, the one input foreground bounding box (fgBb) is set to be the unified bounding box tBoxU or BoxU. For a normal association, the one input foreground bounding box (fgBb) is set to be the one foreground bounding box that is associated with the one high confidence bounding box.

The bounding box pair aggregation process utilizes a key bounding box (key BB) of the tracker associated with the high confidence bounding box in the split association or in the normal association. For example, for a high confidence tracker, the high confidence bounding box that was detected in the latest (most recent) key frame is denoted as the key BB. As noted above, the bounding box pair aggregation process may only be performed for a non-key frame.

The high confidence bounding box (hcBb) in the current frame and the key BB (from the last key frame) are inspected to determine whether the foreground bounding box of the split association or the normal association (fgBb) completely belongs to or largely resides in each of the hcBb and key BB bounding boxes. If the inspection result is positive (or true), the finalBb will be set to hcBb. Otherwise, if the inspection result is negative (or not true), the finalBb will be set to the fgBb. The determination of whether the foreground bounding box completely belongs to or largely resides in the hcBb can be based on the size of an overlapping region (or intersecting region) between the foreground bounding box (fgBb) and the high confidence bounding box (hcBb). If the size of the overlapping region is equal to the size of the foreground bounding box (fgBb), the process can return a true result, in which case the finalBb will be set to hcBb. The size of the overlapping region (between the fgBb and hcBb) being equal to the size of the foreground bounding box (fgBb) indicates that the foreground bounding box (fgBb) is fully inside of the high confidence bounding box (hbBb). The determination of whether the foreground bounding box completely belongs to or largely resides in the key BB can be based on a similar test. For example, the size of an overlapping region (or intersecting region) between the foreground bounding box (fgBb) and the key bounding box (key BB) can be determined. If the size of the overlapping region is equal to the size of the foreground bounding box (fgBb), the process can return a true result, in which case the finalBb will be set to hcBb. The size of the overlapping region (between the fgBb and key BB) being equal to the size of the foreground bounding box (fgBb) indicates that the foreground bounding box (fgBb) is fully included within the key bounding box (key BB). If either or both tests do not return a true result, the finalBb will be set to the fgBb.

In one illustrative example, the process for determining whether the foreground bounding box of the split association or the normal association (fgBb) completely belongs to or largely resides in each of the hcBb and key BB bounding boxes More details on the inspection is as follows:
  (a) For each bounding box curBb being hcBb or key Bb, the following applies:
    (i) overlapSize=size (curBb ∩ fgBb);
    (ii) If overlapSize is equal to size (fgBb), return true;
  (b) Return false;

Returning to FIG. 19, the process 1900, at block 1912, processes absorbed associations between the remaining high confidence bounding boxes and the remaining foreground bounding boxes after the merge associations, split associations, and normal associations are processed. An absorbed association includes a single high confidence bounding box and no corresponding foreground bounding box. Such a scenario is considered an absorbed association because the high confidence bounding box indicates that there is an object (as detected in a key frame with the high confidence bounding box) and the fact that there is no corresponding foreground bounding box indicate that the blob detection has detected the object as background instead of a foreground blob. For example, an object can be detected as background and absorbed into the background model when the object becomes still enough that no movement is detected by the background subtraction engine 312.

In some cases, for absorbed associations in key frames and in non-key frames, the high confidence bounding box of the absorbed association is added into the final set of bounding boxes. For example, there is no foreground bounding box in an absorbed association, so the only bounding box to add to the final set of bounding boxes is the high confidence bounding box.

At block 1914, the process 1900 processes the non-detected (N/D) associations for the remaining foreground bounding boxes that remain after the merge associations, split associations, normal associations, and absorbed associations are processed. For an N/D association, only the foreground bounding box is available. The foreground bounding box is added into the list of final bounding boxes. In some cases, without being marked as a high confidence bounding box. For example, in a subsequent frame, the final remain bounding box can be included in the list of foreground boxes and not in the list of high confidence bounding boxes. For other types of associations described herein, the entry added into the final set of bounding boxes can be marked as a high confidence bounding box. One exception can be the remain bounding box described above, which may not be marked as high confidence when added to the final set of bounding boxes.

Using the above-described bounding box association techniques, a hybrid video analytics system can accurately and reliably determine a final set of bounding boxes to use for performing object tracking.

FIG. 21A-FIG. 30 are video frames illustrating several subjective examples comparing the bounding box association techniques described herein (using a hybrid video analytics system) and a conventional video analytics system that does not use a deep learning based detector. In the examples show in FIG. 21A-FIG. 30, the hybrid video analytics solution is based on an SSD detector, and only "person", "cat", "dog", "horse", and "sheep" are kept; bounding boxes with other classes have been filtered out. In the following subjective examples, the anchor version (shown with dashed bounding boxes) only used background subtraction based detection and tracking. The bounding box association techniques described herein (shown with solid bounding boxes) were performed using a hybrid video analytics system.

Figure 21A:
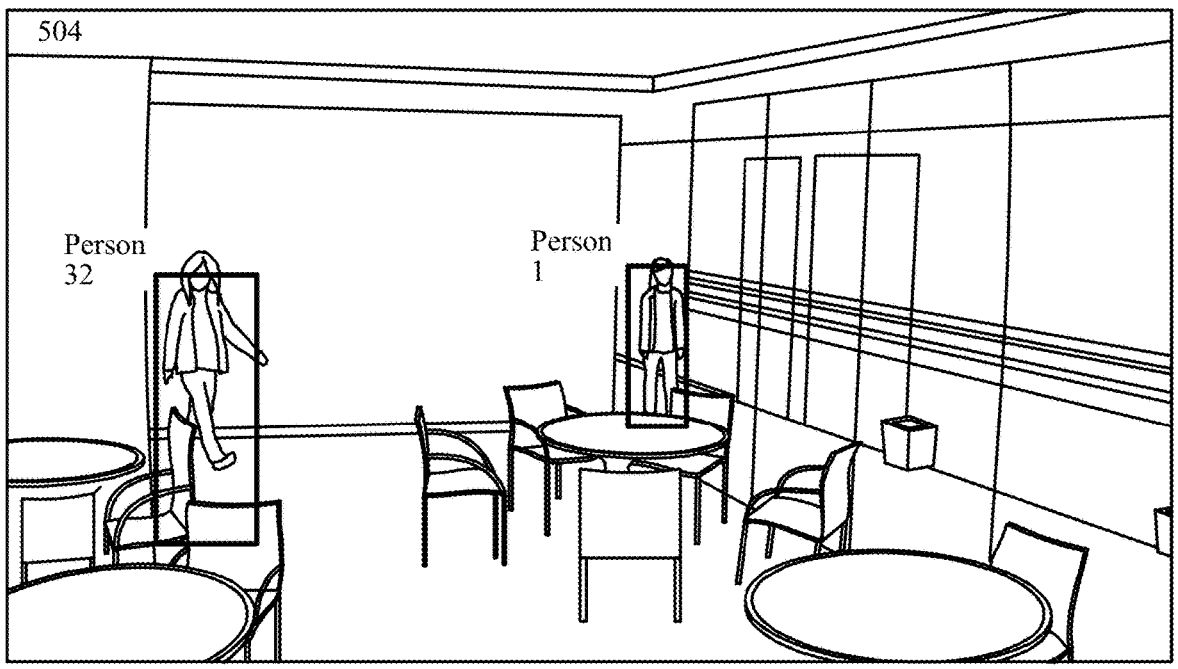
FIG. 21A and FIG. 21B are video frames of a scene with objects being tracked, in accordance with some examples.
Figure 21B:
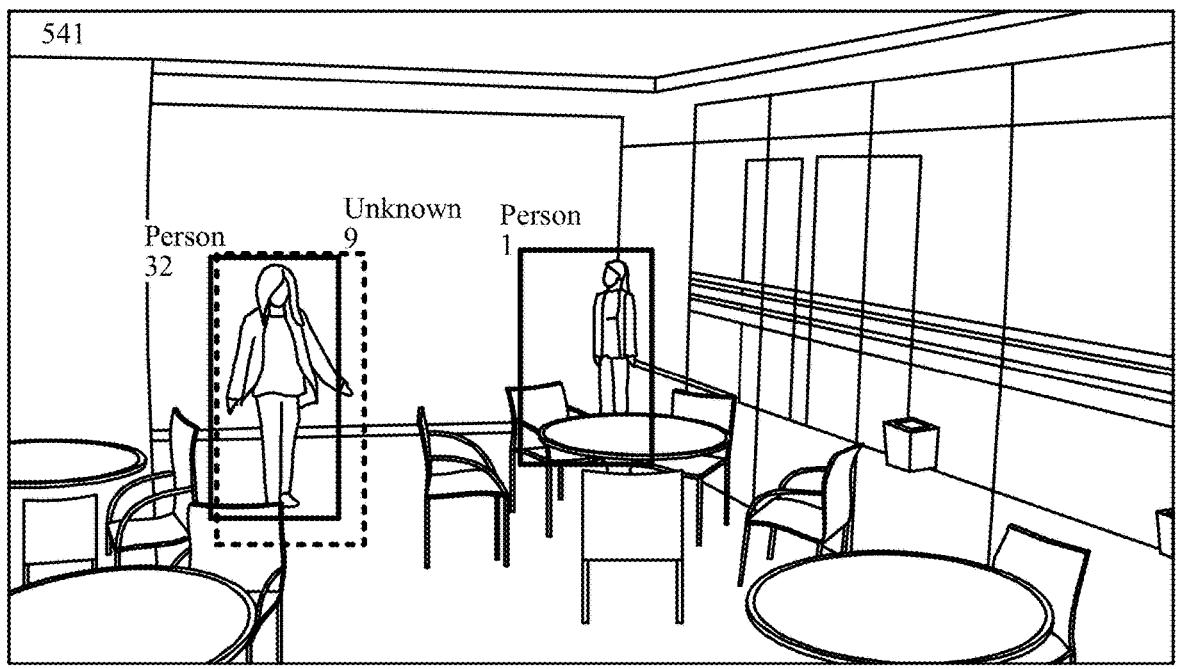

FIG. 21A and FIG. 21B are video frames of a scene with two people. The hybrid solution using the bounding box association techniques described herein detects the person with tracker ID 32 immediately when she appears in the scene (at frame number 504), while the anchor version detects the same person around 1 second later (at frame 541). The other person with tracker ID 1 is not detected by the anchor version even at frame 541.

Figure 22:
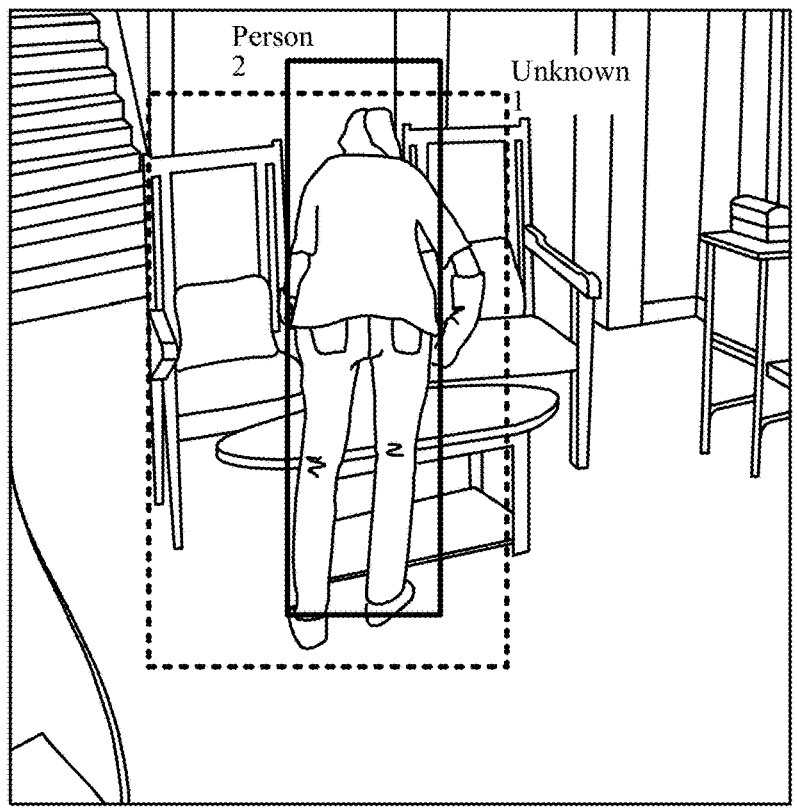
FIG. 22 is a video frame of a scene with an object being tracked, in accordance with some examples.

FIG. 22 is a video frame of a scene with one person. The hybrid solution using the bounding box association techniques described herein detects the person with a more accurate bounding box size, as shown by bounding box of the tracker with ID 2. As shown, the bounding box of the tracker with ID 1 generated using the anchor system is offset from the person.

Figure 23:
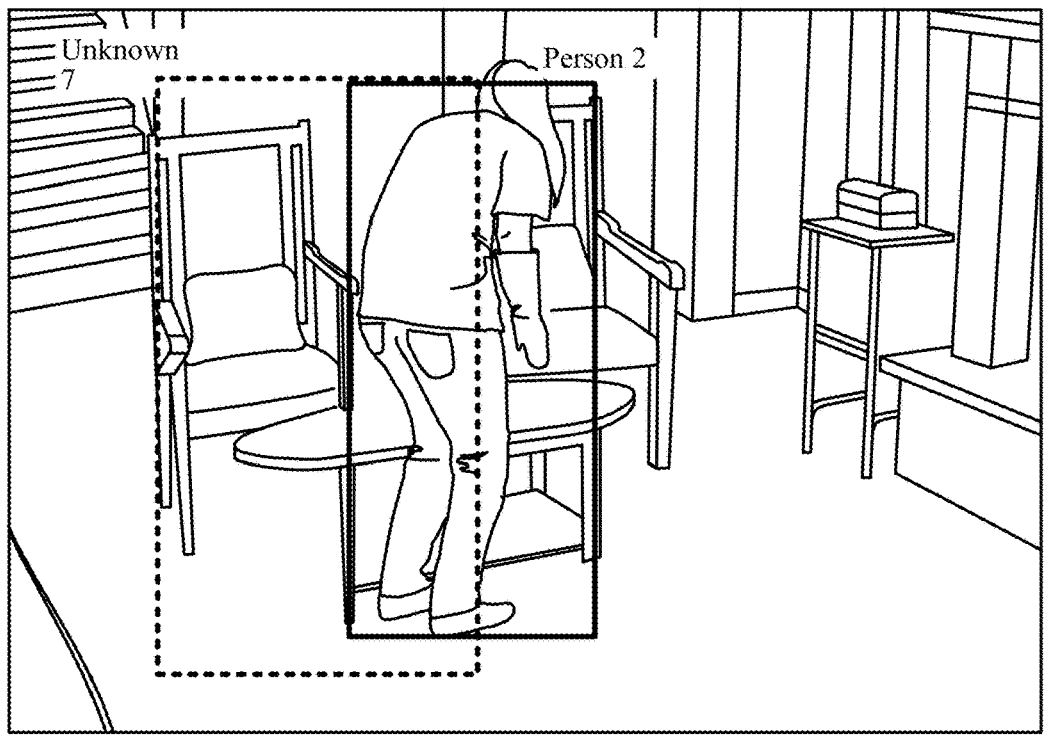
FIG. 23 is another video frame of a scene with an object being tracked, in accordance with some examples.

FIG. 23 is another video frame of a scene with a person. Similar to the example of FIG. 22, the hybrid solution using the bounding box association techniques described herein detects the person with a more accurate bounding box size, as shown by bounding box of the tracker with ID 2. As shown, the bounding box of the tracker with ID 7 generated using the anchor system does not accurately track the person.

Figure 24:
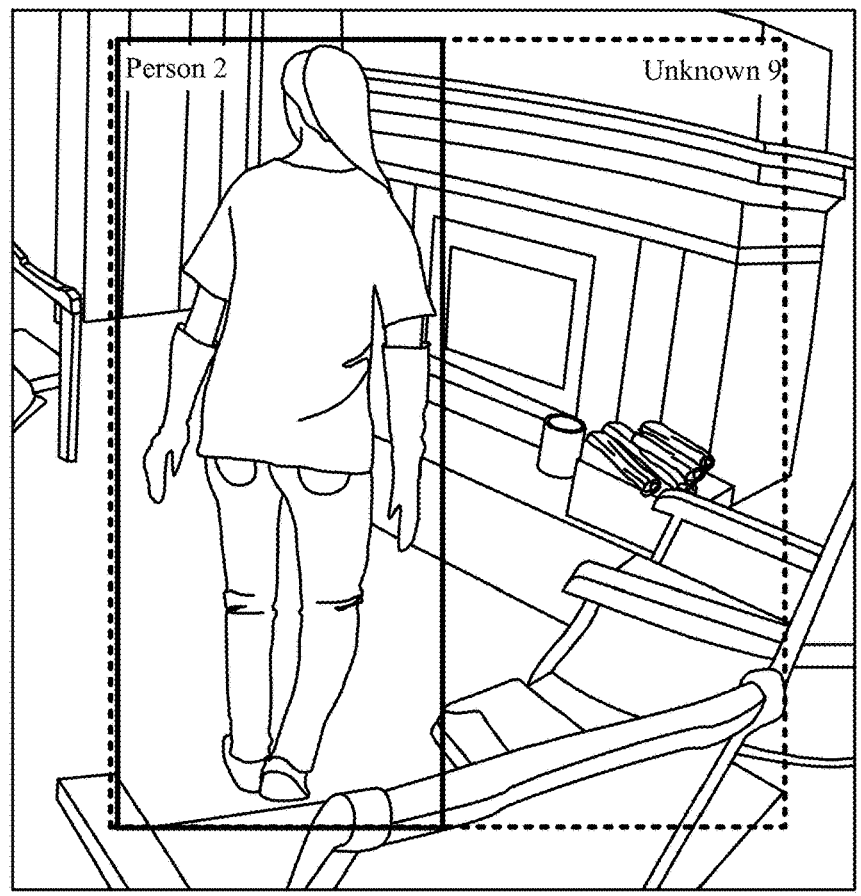
FIG. 24 is another video frame of a scene with an object being tracked, in accordance with some examples.

FIG. 24 is another video frame of a scene with a person. The hybrid solution using the bounding box association techniques described herein detects the person with a more accurate bounding box size, as shown by bounding box of the tracker with ID 2. As shown, the bounding box of the tracker with ID 9 generated using the anchor system is much larger and encompasses much more than the person.

FIG. 25 is a video frame of a scene with a person sitting in a chair. The anchor system detects the false positive object with tracker ID 13 as well as the person with tracker ID 8, while the hybrid solution using the bounding box association techniques described herein detects and tracks the person with tracker ID 26.

Figure 26A:
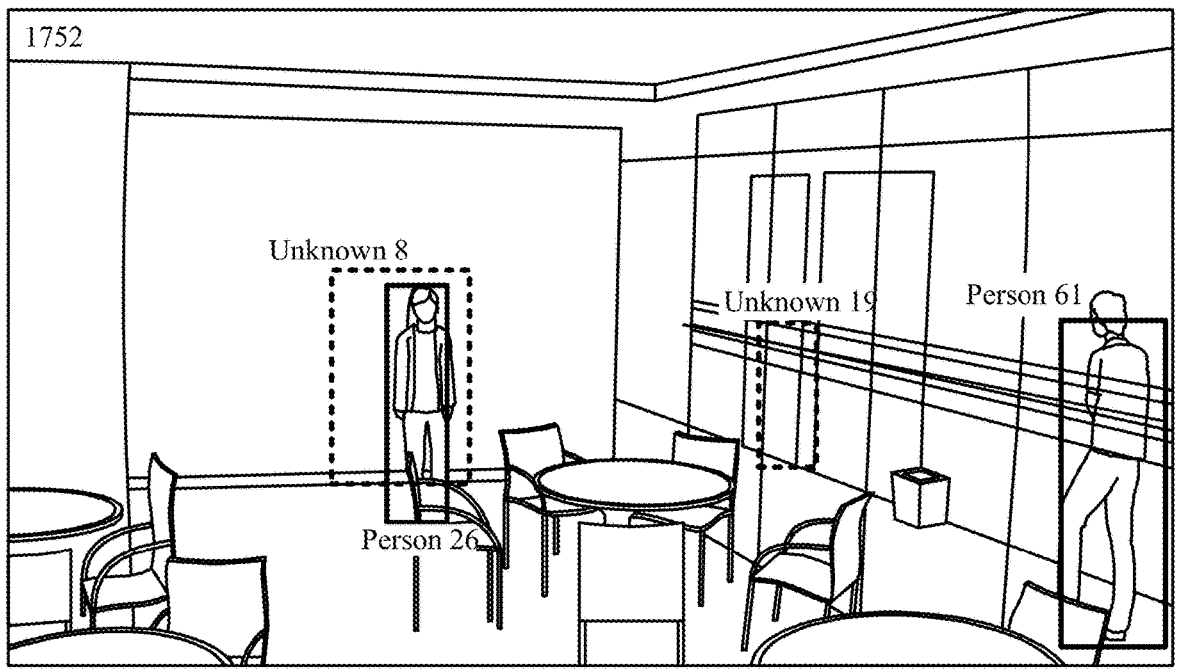
FIG. 26A and FIG. 26B are video frames of a scene with objects being tracked, in accordance with some examples.
Figure 26B:
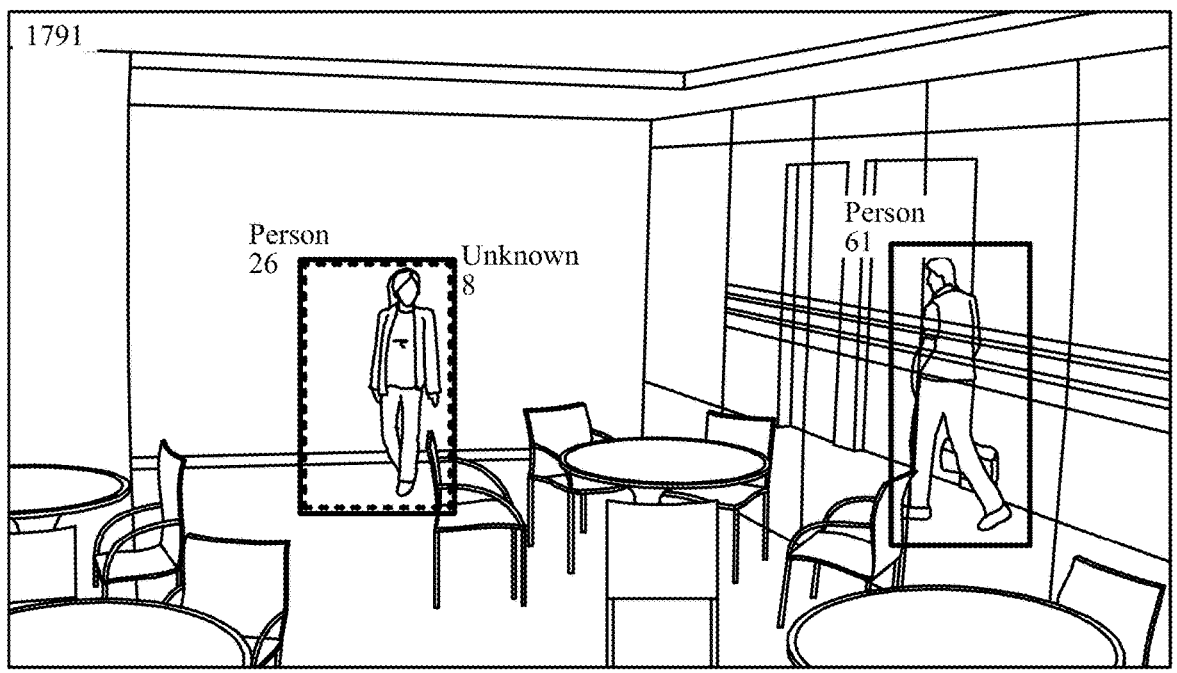

FIG. 26A and FIG. 26B are video frames of a scene with two people. The hybrid solution using the bounding box association techniques described herein reduces the tracking delay from frame 1752 to 1791.

Figure 27A:
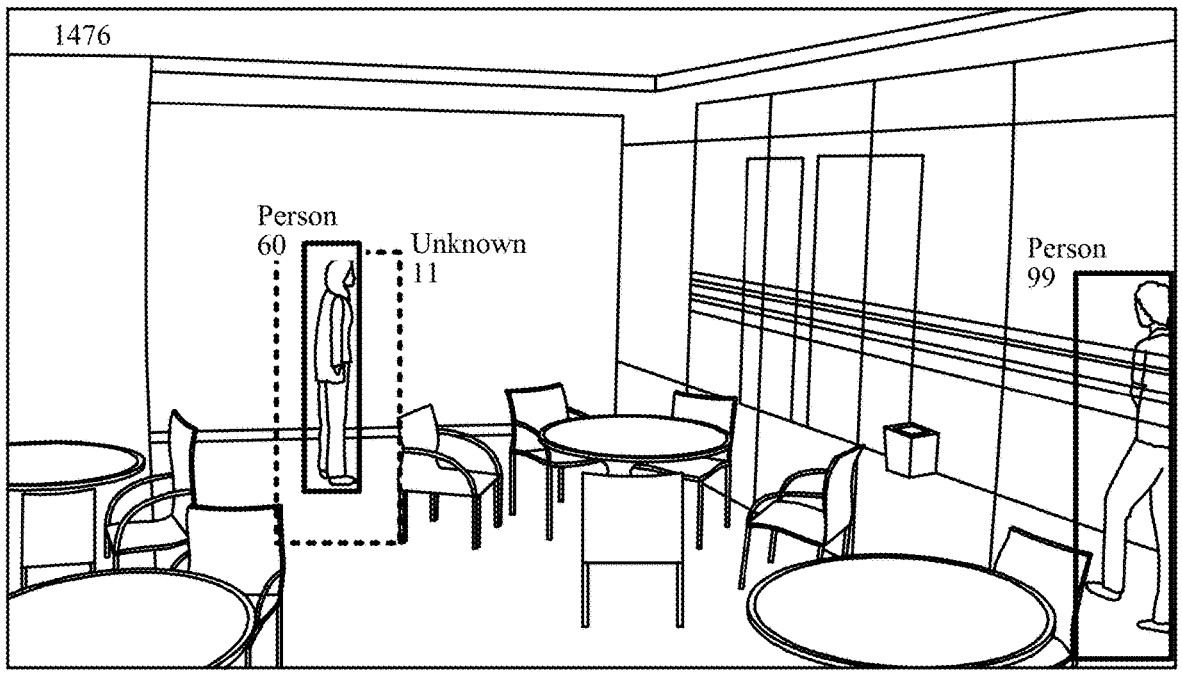
FIG. 27A and FIG. 27B are video frames of a scene with objects being tracked, in accordance with some examples.
Figure 27B:
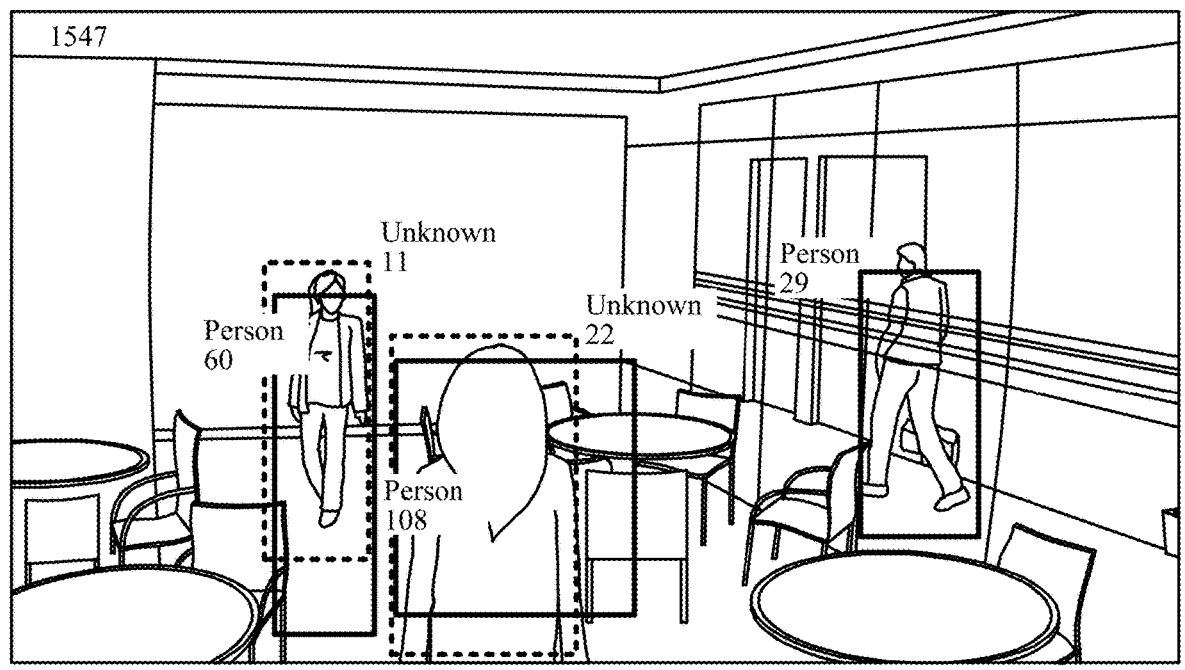

FIG. 27A and FIG. 27B are video frames of a scene with two people. The hybrid solution using the bounding box association techniques described herein reduces the tracking delay from frame 1476 to 1547.

FIG. 28 is another video frame of a scene with two people. The hybrid solution using the bounding box association techniques described herein can split the two persons if they are close to each other (as shown by the high confidence bounding boxes with tracker IDs 1 and 5). However, the two persons can be easily merged together in the anchor version, as shown by the merged bounding box with tracker ID 1.

Figure 29:
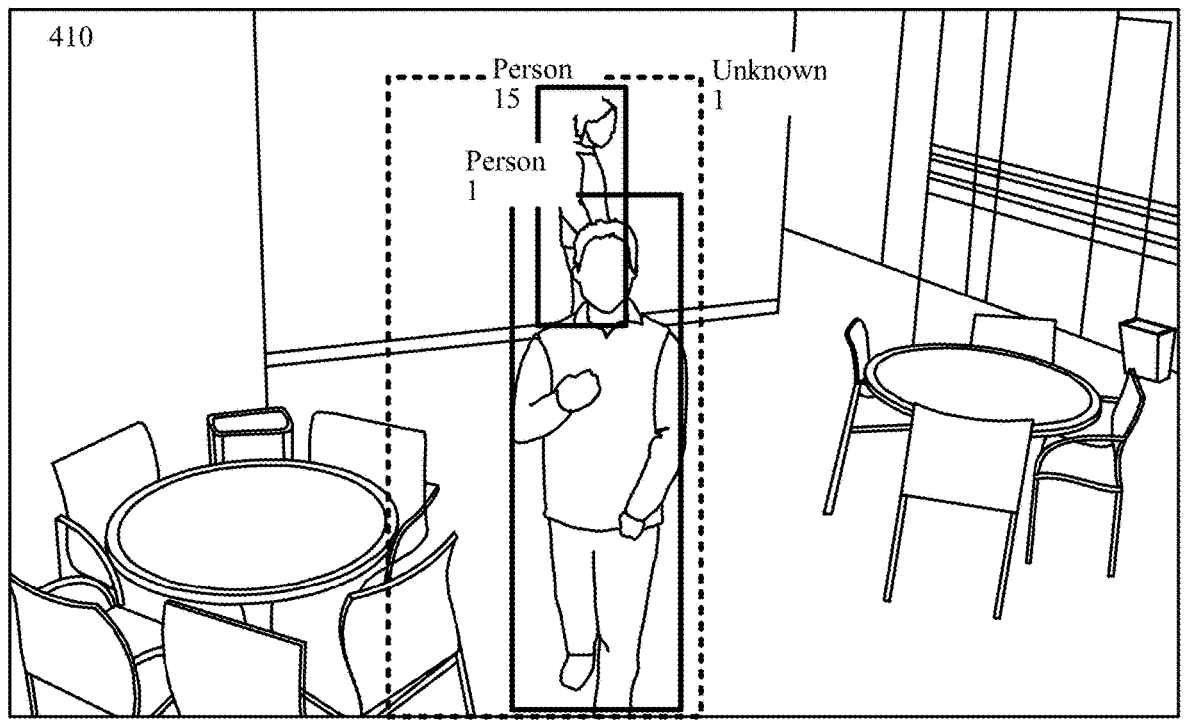
FIG. 29 is another video frame of a scene with objects being tracked, in accordance with some examples.

FIG. 29 is another video frame of a scene with two people. Similar to the example shown in FIG. 28, the hybrid solution using the bounding box association techniques described herein can split the two persons if they are close to each other (as shown by the high confidence bounding boxes with tracker IDs 1 and 15). However, the two persons can be easily merged together in the anchor version, as shown by the merged bounding box with tracker ID 1.

Figure 30:
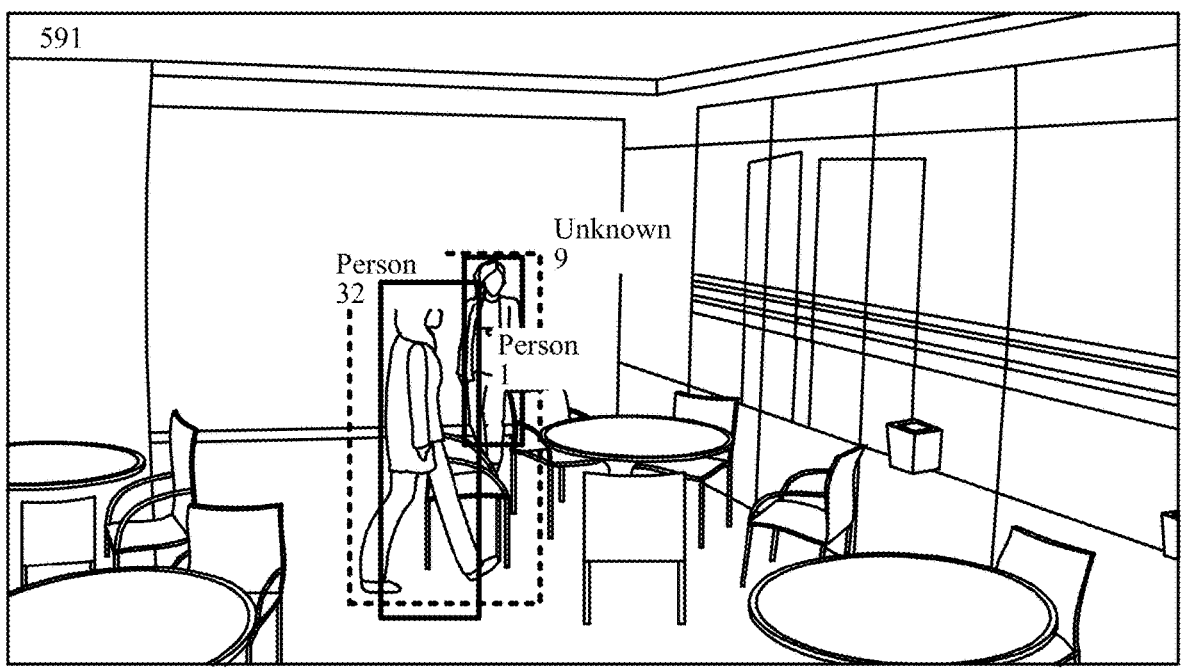
FIG. 30 is another video frame of a scene with objects being tracked, in accordance with some examples.

FIG. 30 is another video frame of a scene with two people. The hybrid solution using the bounding box association techniques described herein can split the two persons if they are close to each other (as shown by the high confidence bounding boxes with tracker IDs 1 and 32). However, the two persons can be easily merged together in the anchor version, as shown by the merged bounding box with tracker ID 9.

FIG. 31 is a flowchart illustrating an example of a process 3100 of tracking objects in a sequence of video frames using the techniques described herein. At block 3102, the process 3100 includes obtaining a set of one or more detector bounding regions for a video frame. The set of one or more detector bounding regions are based on application of an object detector to one or more video frames. The set of one or more detector bounding regions are associated with one or more objects in the video frame. In some cases, the object detector is a complex object detector. In some cases, the object detector (e.g., a complex object detector) can be based on a trained classification network. The object detector can be applied to key frames of the video sequence. As noted above, a key frame is a frame from the sequence of video frames to which the object detector is applied.

At block 3104, the process 3100 includes detecting one or more blobs for the video frame. A blob includes pixels of at least a portion of an object in the video frame. For example, as described above, the blob detection system 1204 can be used to detect or generate the one or more blobs for the video frame. In some cases, blob detection is performed for each video frame of the sequence of video frames to detect one or more blobs in each video frame, and the object detector is applied only to key frames of the sequence of video frames. The frames that the object detector (e.g., the complex object detector) are not applied to are referred to as non-key frames.

At block 3106, the process 3100 includes determining a set of one or more foreground bounding regions for the video frame. The set of one or more foreground bounding regions are associated with the one or more blobs.

At block 3108, the process 3100 includes determining one or more associations between the set of one or more detector bounding regions and the set of one or more foreground bounding regions. In some aspects, an association between a first detector bounding region (also referred to as a "high confidence bounding region") of the set of one or more detector bounding regions and a first foreground bounding region of the set of one or more foreground bounding regions is determined based on an overlap between the first detector bounding region and the first foreground bounding region. In some cases, the one or more associations between the set of one or more detector bounding regions and the set of one or more foreground bounding regions can be determined by determining an overlapping region between a first detector bounding region of the set of one or more detector bounding regions and a first foreground bounding region of the set of one or more foreground bounding regions. The process 3100 can then determine an area of the first detector bounding region or the first foreground bounding region within the overlapping region is greater than a first overlapping threshold. The first detector bounding region can be determined to be associated with the first foreground bounding region in response to determining the area of the first detector bounding region or the first foreground bounding region within the overlapping region is greater than the first overlapping threshold.

At block 3110, the process 3100 includes determining one or more states of the one or more associations. At block 3112, the process 3100 includes determining, based on the determined one or more states, a final set of one or more bounding regions for the video frame using the set of one or more detector bounding regions and the set of one or more foreground bounding regions.

In some examples, as described above, the one or more states can include a merge state. For example, determining the one or more states of the one or more associations can include determining an association between at least two detector bounding regions of the set of one or more detector bounding regions and a first foreground bounding region of the set of one or more foreground bounding regions. The association can be based on an overlap between the at least two detector bounding regions and the first foreground bounding region. Based on the association between the at least two detector bounding regions and the first foreground bounding region, the association is determined to be a merge association.

In some examples when a merge association is determined, the final set of one or more bounding regions can be determined (based on the determined one or more states) for the video frame by adding the at least two detector bounding regions to the final set of one or more bounding regions based on the association being a merge association.

In some examples when a merge association is determined, the final set of one or more bounding regions can be determined (based on the determined one or more states) for the video frame by determining one or more regions of the first foreground bounding region that are not overlapped with a region corresponding to the at least two detector bounding regions, and selecting a candidate region of the one or more regions. It can then be determined whether the candidate region is greater than a candidate threshold. If the candidate region is greater than the candidate threshold, the candidate region can be added to the final set of one or more bounding regions based on the candidate region being greater than the candidate threshold. In some cases, the region corresponding to the at least two detector bounding regions includes a union region between the at least two detector bounding regions. In some examples, the candidate threshold can be based on the foreground pixel fullness of the candidate region (referred to above as a final candidate remain bounding box (boxFinalCand)). The foreground pixel fullness of a bounding region can include the number of foreground pixels in the bounding region, the ratio of number of foreground pixels within the bounding region as compared to the total number of pixels (both foreground and background pixels) of the bounding region, or other suitable measure of foreground fullness. Other factors can also be considered, alone or in combination with the candidate threshold, when determining whether to add the candidate region to the final set of one or more bounding regions. For example, as described above, the size of the candidate region can be compared to a minimum size from the sizes of all of the detector (or "high confidence") bounding boxes in the current frame (denoted as minSize) to determine whether to add the candidate region to the final set of one or more bounding regions. In another example, as described above, the width and/or the height of the candidate region can be compared to the minSize to determine whether to add the candidate region to the final set of one or more bounding regions.

In some examples when a merge association is determined, the process 3100 can include determining the video frame is a non-key frame. The object detector is not applied to non-key frames of the sequence of video frames. For example, as described above, complex object detection (e.g., using a trained classification network) may only be applied to key frames. Based on the video frame being a non-key frame, the process 3100 can modify one or more detector bounding regions from the at least two detector bounding regions. In some examples, the one or more detector bounding regions can be modified using the merged objects location adjustment process described above. For instance, modifying the one or more detector bounding regions can include modifying one or more locations of the one or more detector bounding regions so that the one or more detector bounding regions cover additional foreground pixels of the first foreground bounding region. Once the one or more detector bounding regions are modified, the process 3100 can determine the final set of one or more bounding regions for the video frame by adding the modified one or more detector bounding regions to the final set of one or more bounding regions.

In some examples, as described above, the one or more states can include a split state. For example, determining the one or more states of the one or more associations can include determining a first detector bounding region of the set of one or more detector bounding regions is associated with at least two foreground bounding regions of the set of one or more foreground bounding regions. The association can be based on an overlap between the first detector bounding region and the at least two foreground bounding regions. Based on the association between the first detector bounding region and the at least two foreground bounding regions, the association is determined to be a split association.

In some examples, when a split association is determined, the process 3100 can determine whether the video frame is a key frame or a non-key frame. For example, the process 3100 can determine that the video frame is a key frame, in which case the object detector is applied to the key frame. When the video frame is a key frame, the final set of one or more bounding regions can be determined (based on the determined one or more states) for the video frame by adding the first detector bounding region to the final set of one or more bounding regions based on the association being a split association and based on the video frame being a key frame.

As another example, the process 3100 can determine that the video frame is a non-key frame, in which case the object detector is not applied to the non-key frame. When the video frame is a non-key frame, the final set of one or more bounding regions can be determined (based on the determined one or more states) for the video frame by combining, based on the video frame being a non-key frame, the at least two foreground bounding regions into a combined foreground bounding region, and determining whether an overlapping region between the combined foreground bounding region and the first detector bounding region is greater than a second overlapping threshold. The combined bounding region is referred to above as a unified bounding box. The process 3100 can then add the first detector bounding region or the combined foreground bounding region to the final set of one or more bounding regions based on whether the overlapping region is greater than the second overlapping threshold. In some cases, the first detector bounding region is added to the final set of one or more bounding regions when the overlapping region is greater than the second overlapping threshold. In some cases, the combined foreground bounding region is added to the final set of one or more bounding regions when the overlapping region is less than the second overlapping threshold.

In some examples, as described above, the one or more states can include a normal state. For example, determining the one or more states of the one or more associations can include determining a first detector bounding region of the set of one or more detector bounding regions is associated with only a first foreground bounding region of the set of one or more foreground bounding regions. The association can be based on an overlap between the first detector bounding region and the first foreground bounding region. Based on the association between the first detector bounding region and the first foreground bounding region, the association is determined to be a normal association.

In some examples when a normal association is determined, the process 3100 can determine whether the video frame is a key frame or a non-key frame. For example, the process 3100 can determine that the video frame is a key frame, in which case the object detector is applied to the key frame. When the video frame is a key frame, the final set of one or more bounding regions can be determined (based on the determined one or more states) for the video frame by adding the first detector bounding region to the final set of one or more bounding regions based on the association being a normal association and based on the video frame being a key frame.

As another example, the process 3100 can determine that the video frame is a non-key frame, in which case the object detector is not applied to the non-key frame. When the video frame is a non-key frame, the final set of one or more bounding regions can be determined (based on the determined one or more states) for the video frame by determining whether an overlapping region between the first detector bounding region and the first foreground bounding region is greater than a second overlapping threshold, and adding the first detector bounding region or the first foreground bounding region to the final set of one or more bounding regions based on whether the overlapping region is greater than the second overlapping threshold. In some cases, the first detector bounding region is added to the final set of one or more bounding regions when the overlapping region is greater than the second overlapping threshold. In some cases, the first foreground bounding region is added to the final set of one or more bounding regions when the overlapping region is less than the second overlapping threshold.

In some examples, as described above, the one or more states can include an absorbed state. For example, determining the one or more states of the one or more associations can include determining a first detector bounding region of the set of one or more detector bounding regions is not associated with any foreground bounding regions from the set of one or more foreground bounding regions. Based on the first detector bounding region not being associated with any foreground bounding regions from the set of one or more foreground bounding regions, the association is determined to be an absorbed association. As described above, an absorbed association is associated with an object that has been detected as background. For example, the blob detection engine 604 may not detect any foreground blobs for the object, causing the object to be absorbed into the background model.

In some examples, when an absorbed association is determined, the final set of one or more bounding regions can be determined (based on the determined one or more states) for the video frame by adding the first detector bounding region to the final set of one or more bounding regions based on the association being an absorbed association.

In some examples, as described above, the one or more states can include a non-detected state. For example, determining the one or more states of the one or more associations can include determining a first foreground bounding region of the set of one or more foreground bounding regions is not associated with any detector bounding regions from the set of one or more detector bounding regions. Based on the first foreground bounding region not being associated with any detector bounding regions from the set of one or more detector bounding regions, the association is determined to be a non-detected association.

In some examples, when a non-detected association is determined, the final set of one or more bounding regions can be determined (based on the determined one or more states) for the video frame by adding the first foreground bounding region to the final set of one or more bounding regions based on the association being a non-detected association.

At block 3114, the process 3100 includes performing object tracking for the video frame using the final set of one or more bounding regions. In some cases, the object tracking can be performed by the object tracking system 1316 described above. For instance, the final set of bounding boxes can be used by the object tracking system 1316 as the blob bounding boxes for a current frame when performing cost determination (by the cost determination engine 412) and data association (by the data association engine 414).

In some examples, the process 3100 may be performed by a computing device or an apparatus. In one illustrative example, the process 3100 can be performed by the hybrid video analytics system 1200 shown in FIG. 12 and FIG. 13. In some cases, the computing device or apparatus may include a processor, microprocessor, microcomputer, or other component of a device that is configured to carry out the steps of process 3100. In some examples, the computing device or apparatus may include a camera configured to capture video data (e.g., a video sequence) including video frames. For example, the computing device may include a camera device (e.g., an IP camera or other type of camera device) that may include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 3100 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 3100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

In some implementations, additional techniques are described herein for performing a crowd-based object detection and/or tracking. The additional techniques can lead to advancements in various situations. For example, among other benefits, such techniques can accurately establish the association between foreground bounding boxes and detector bounding boxes in scenes where many objects are crowded together.

In some cases, a hybrid video analytics system can encounter problems when analyzing video frames of a scene that is crowded with many objects. For example, when objects in a crowded scene start to merge into each other (e.g., people, cars, and/or other objects moving close together and/or overlapping in the scene), the background subtraction results may be very inconsistent such that the detected and tracked blobs may not accurately represent the real objects in the scene. Such inconsistencies can occur in indoor and outdoor scenes. In some cases, the problems associated with a crowded scene can occur even more frequently for indoor scenes (e.g., in a home security scenario and/or other suitable indoor application), where distances from the one or more cameras are typically shorter than in outdoor scenes.

Figure 32A:
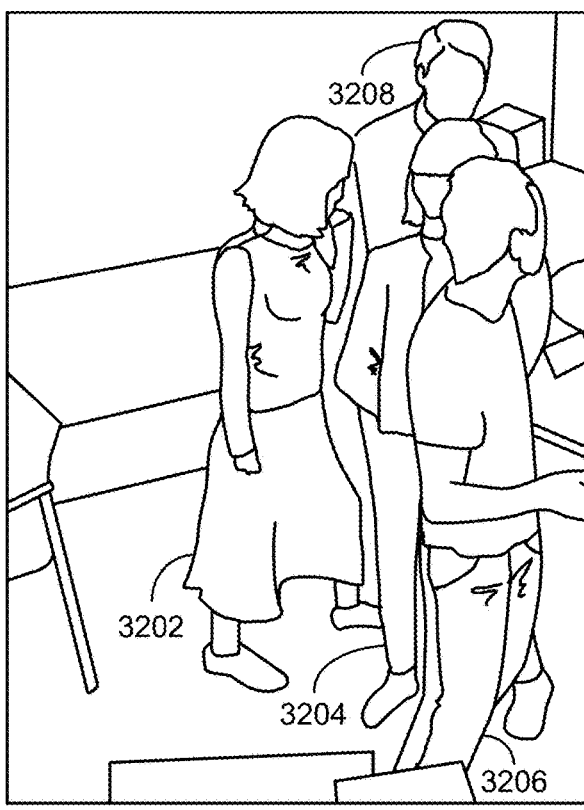
FIG. 32A is a video frame of a crowd scene, in accordance with some examples.
Figure 32B:
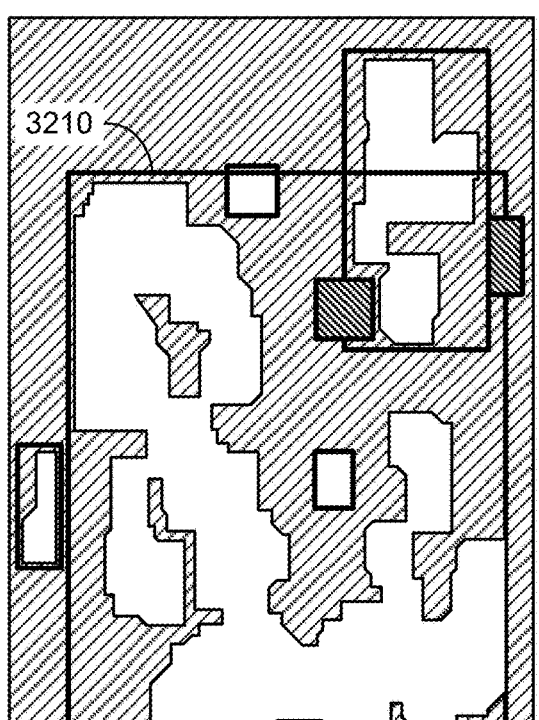
FIG. 32B is a foreground mask binary image of the crowd scene shown in FIG. 7A, in accordance with some examples.

Such inconsistencies can be caused by various situations that are common in crowded scenes. For example, blobs of multiple objects may already be connected to one another and thus can be merged into one blob. FIG. 32A is a video frame 3200A with multiple people (person 3202, person 3204, person 3206, and person 3208) that are crowded together. FIG. 32B is a foreground mask binary image 3200B showing that the person 3202, the person 3204, and the person 3206 are detected as a merged blob (represented by bounding box 3210).

In another example, an object can be static or have relatively slow motion in a crowded scene, in which case, after blob detection, there may be multiple separated blobs corresponding to the object due to background subtraction detecting part of the object as background. For example, once the object stops or slows down, the background subtraction engine of the blob detection system 1204 will transition the pixels of the object from foreground pixels to background pixels due to the nature of background subtraction adapting to local changes quickly. For instance, a background subtraction process based on GMM or other statistical learning model adapts to the local changes for each pixel. Once a moving object stops or slows down, for each pixel location making up the object, the same pixel value (due to the pixel value for that location not changing) continues contributing to the associated background model, causing the region associated with the object to become background. FIG. 33A is a video frame 3300A with a person (represented by bounding box 3302) that is standing still. FIG. 33B is a portion of the foreground mask binary image 3300B corresponding to the bounding box 3302. As shown in the portion of the foreground mask binary image 3300B, multiple separated blobs are detected for the same person, due to background subtraction absorbing portions of the person into the background portion of the foreground mask binary image.

Methods and systems are described herein for consistently and accurately tracking objects in a crowd scene using a crowd-based tracking mode. For example, the hybrid video analytics system 1200 can separate a current frame of a video sequence into groups or regions, with each group or region including a group of objects (each with a high confidence bounding box) and relevant foreground blobs (represented as foreground bounding boxes) for the current frame. For example, the hybrid video analytics system 1200 can group the high confidence bounding boxes (or detector bounding boxes) of the high confidence trackers and the foreground bounding boxes of the blobs (detected by the blob detection system) of the current frame into groups or regions. For the groups or regions that are determined to be "crowd groups" (determined as discussed further below), crowd-based tracking can be performed by performing a conservative tracking process, as described below with respect to FIG. 34. Crowd groups can also be referred to herein as "crowd regions."

Figure 34:
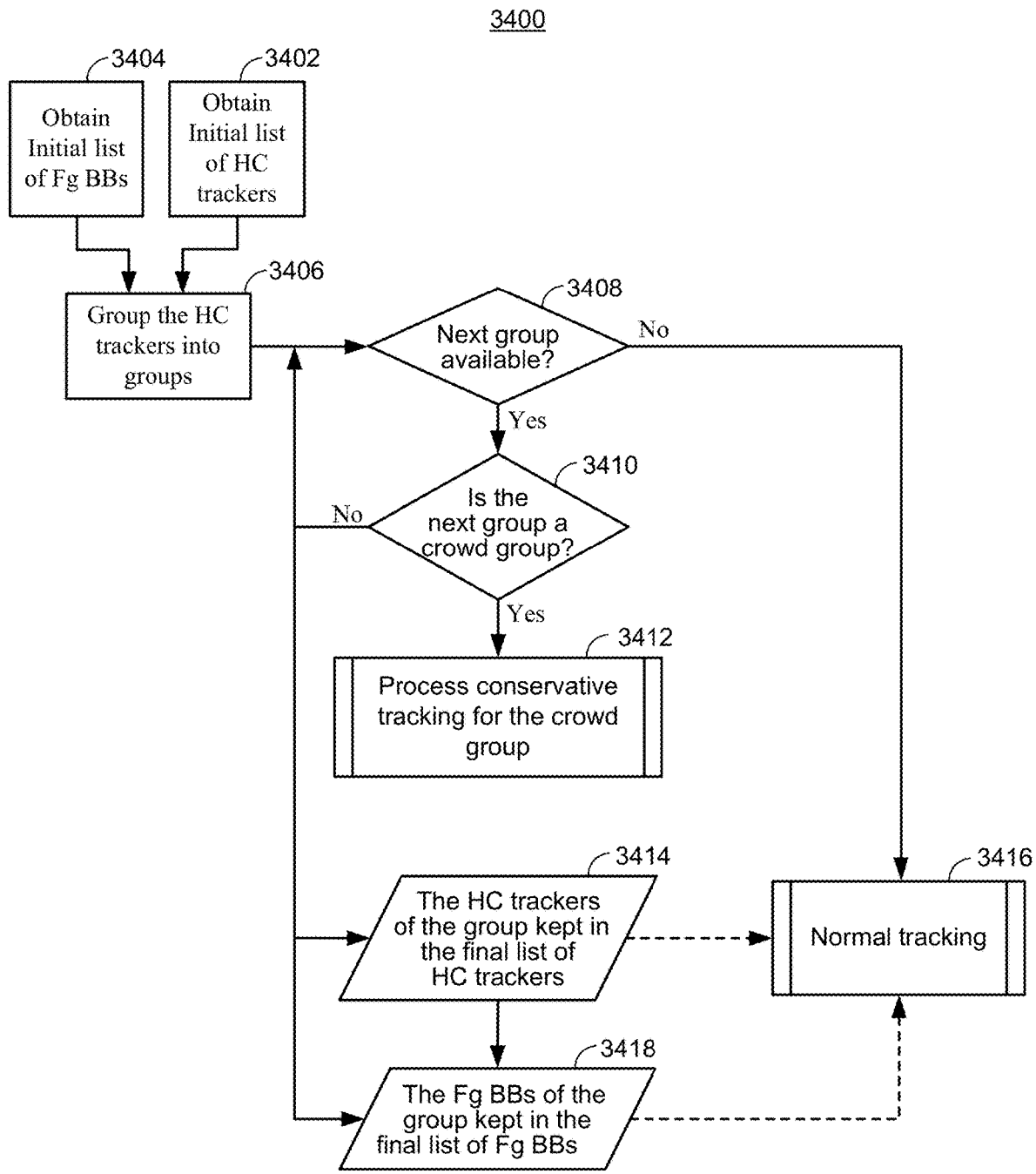
FIG. 34 is a flowchart illustrating an example of a process for processing groups or regions of bounding boxes in frames of a sequence of video frames, in accordance with some examples.

As described in more detail below, and as shown in FIG. 34, instead of using the initial list of high confidence trackers and the initial list of foreground bounding boxes directly for normal tracking, the crowd regions (or crowd groups) are firstly identified, and high confidence bounding boxes of relevant high confidence trackers are processed. For example, once a crowd group is identified, the bounding boxes in the crowd group can be analyzed to determine whether to modify or bypass one or more of the high confidence bounding boxes in the group. In some cases, one or more of the high confidence bounding boxes in the group can be modified based on one or more associated foreground bounding boxes in the group. The remaining high confidence trackers and foreground bounding boxes (in normal, non-crowd regions) that were not processed using the crowd-based tracking can be processed using normal tracking. As used herein, "normal tracking" refers to associating tracker bounding boxes with blob bounding boxes using, for example, the techniques described above with respect to the object tracking system 106 shown in FIG. 4 (e.g., cost determination, data association, and tracker updates). In some cases, normal tracking can include associating foreground bounding boxes in a final list of foreground bounding boxes with high confidence bounding boxes in a final list of high confidence trackers using a bounding box aggregation engine (not shown). For example, the bounding box aggregation engine can determine which of the high confidence bounding boxes and which of the foreground bounding boxes to include in the final set of bounding boxes that can be used for tracking based on the determined associations. As described above, various factors are described for determining final sets of bounding boxes for key frames and non-key frames.

FIG. 34 is a flowchart illustrating an example of a process 3400 for processing groups or regions of bounding boxes in one or more frames of the sequence of video frames. The process 3400 is performed for each video frame of a sequence of video frames. In some cases, the crowd-based tracking described herein is performed only for non-key frames. However, the crowd-based tracking can also be applied to key frames in some instances. In some cases, the process 3400 can be performed during the tracking process (e.g., before the cost determination and data association are performed). For example, the process 3400 can be performed by the object tracking system 1206 or other suitable component of the video analytics system 1200. A video frame currently being processed by the process 3400 is referred to herein as a current frame. Similarly, a tracker currently being processed by the process 3400 is referred to herein as a current tracker, and a group or region currently being processed by the process 3400 is referred to herein as a current group or current region.

At block 3402, the process 3400 obtains an initial list of high confidence (HC) trackers for the current frame. As noted above, the high confidence trackers are the trackers maintained for the sequence of video frames that have previously had at least one bounding box that is a high confidence bounding box detected in a key frame. For example, once an object is detected by the deep learning system 1208 in a key frame, its associated tracker is denoted as a high confidence tracker in subsequent frames. Other trackers (normal confidence trackers) can also be maintained for the sequence of video frames, which track objects that have never been detected in a key frame by the deep learning system 1208. Each high confidence tracker has an assigned tracker identifier (ID). Each high confidence tracker is also associated with a high confidence bounding box that is at a predicted location in the current frame based on the location of the tracker in a previous frame. For example, as described above, the location of the blob or object associated with a tracker in a previous frame can be used as the predicted location of the tracker in a current frame, and the location in the current frame of a blob or object associated with the tracker is used as the actual location of the tracker in the current frame. Some examples described herein refer to a high confidence tracker and its high confidence bounding box interchangeably. For example, modifying a high confidence tracker is the same as modifying a high confidence bounding box of the high confidence tracker.

At block 3404, the process 3400 obtains an initial list of foreground bounding boxes (BBs). The initial list of foreground bounding boxes can include the foreground bounding boxes of the foreground blobs detected in the current frame by the blob detection system 1204. The normal tracking process would typically associate the foreground bounding boxes with the high confidence trackers (and other normal confidence trackers, if present). However, before applying normal tracking at block 3416, the process 3400 performs a grouping process and, in some cases, the crowd-based tracking to some groups.

At block 3406, the process 3400 groups the high confidence trackers into one or more groups. For example, the predicted high confidence bounding boxes (at the predicted locations in the current frame, as described above) of the high confidence trackers can be grouped into different groups based on spatial relationships among the high confidence bounding boxes. In some cases, the high confidence bounding boxes can be grouped in a greedy mode. For example, a first high confidence bounding box can be grouped with one or more other high confidence bounding boxes that overlap with the first high confidence bounding box. If a high confidence bounding box overlaps with at least one of the high confidence bounding boxes in an existing group, the bounding box is assigned to that existing group. However, if the bounding box is not overlapping with any high confidence bounding box of an existing group (or if no group currently exists), a new group is created and the new group will contain the high confidence tracker.

Groups can also be merged with other groups. For example, when a new high confidence bounding box is added into a group, the group may be further merged with another group based on certain factors. In one illustrative example, a union of all predicted high confidence bounding boxes (including the newly added high confidence bounding box entry) of a current group can be determined. The union can be denoted as unionCurGroup. Using FIG. 14 as an example, if the bounding box 1402 and the bounding box 1404 make up a current group, the unionCurGroup would be the union bounding box 1410. The process 3400 can then check other groups one-by-one or collectively to determine whether any high confidence bounding boxes from the other group or groups overlap with the union of the current group. For example, any other groups can be checked until at least one group is identified to have at least one high confidence bounding box entry that is overlapped with the unionCurGroup. If such a group is found, the group is merged into the current group.

The process 3400 can then add one or more of the foreground bounding boxes to the one or more groups. For example, once the groups have been created and confirmed according to the high confidence trackers, the foreground bounding boxes can be analyzed to determine whether they should be added to any of the groups. The process 3400 can determine the best group for each detected foreground bounding box based on spatial relationships between the foreground bounding boxes and the groups. For example, a group that has the largest overlap with a foreground bounding box can be selected as the group that the foreground bounding box will be added to. In other words, a foreground bounding box can be added to the group that it most overlaps with. The overlap between a foreground bounding box and a given group can be defined as the overlap between the foreground bounding box and the union bounding box of the group (unionCurGroup). Referring again to FIG. 14, the unionCurGroup of a current group can be the union bounding box 1410, and if a foreground bounding box overlaps with the union bounding box 1410 of the current group more so than with one or more other groups' union bounding boxes, the foreground bounding box can be added to the current group.

The object tracking system 1206 and/or the video analytics manager can maintain a list of high confidence trackers in each group. In some cases, the list can also include the foreground bounding boxes in each group. In some cases, a separate list of the foreground bounding boxes in each group cam be maintained.

When a high confidence tracker is being processed, its predicted high confidence bounding box (from the previous frame) is used for possible association with a foreground bounding box (e.g., a significant bounding box, as described below). In some cases, a detector bounding box generated from a deep learning-based detector (e.g., from an SSD detector) may be relatively smaller than a foreground bounding box generated using blob detection. Such a property of having smaller bounding boxes may be propagated to the subsequent non-key frames. In some implementations, in order to alleviate the effect of the smaller bounding boxes, the predicted bounding boxes of the high confidence trackers are enlarged while the high confidence trackers are being grouped into the groups. The predicted bounding boxes of the high confidence trackers can be enlarged by any suitable amount. In one illustrative example, one or more of the predicted bounding boxes can be increased by 25% of the width and 25% of the height, with the center position being kept unchanged. Enlarging the bounding boxes can increase the amount of overlap between bounding boxes, allowing more objects (bounding boxes) to be included in the groups. In some cases, in order to still possibly distinguish the trackers from each other, the predicted high confidence bounding boxes can be converted back to their original size after the group identification. The high confidence bounding boxes can thus be kept as their original sizes when tracking (normal or crowd-base) is performed.

In some examples, a region refinement process can be performed to remove some high confidence trackers and/or some foreground bounding boxes from the one or more groups. For example, if there is at least one high confidence tracker within a group that is determined to be a static tracker (also referred to as a still tracker), the at least one static high confidence tracker, as well as any associated foreground bounding boxes, may be excluded or removed from the group. Examples of techniques for identifying still trackers is described in U.S. Provisional Application No. 62/578,926, filed Oct. 30, 2017, which is hereby incorporated by reference in its entirety and for all purposes.

In some cases, the region refinement process can analyze an effect of potentially removing a high confidence bounding box from a group to determine whether the high confidence bounding box should be removed from the group. Each high confidence tracker bounding box in a current group can be checked to determine whether to remove one or more of the high confidence bounding boxes in the current group. For example, a current high confidence bounding box in a current group can be checked by removing the high confidence tracker from the list of high confidence trackers of the current group. A new union region of the predicted high confidence bounding boxes of the remaining high confidence trackers in the current group (after removal of the current high confidence bounding box) can then be determined. If all of the foreground bounding boxes of the current group still overlap with the new union region, the high confidence tracker (and its bounding box) is to be removed from the group (e.g., removed from the group's list). For example, the current group of high confidence bounding boxes can be updated to exclude the current bounding box from the current group. Otherwise, if at least one of the foreground bounding boxes of the current group does not overlap with the new union region, the high confidence tracker (and its bounding box) is kept in the group.

Returning to FIG. 34, the process 3400 determines, at block 3408, whether a next group is available. For example, the process 3400 can determine whether there are any further groups to process in a current frame. There are two kinds of groups in each frame, including normal groups (or regions) and crowd groups (or regions). The objects within the crowd groups can be processed first, group by group, and then all the remaining objects in the normal groups can be processed. The remaining objects can be referred to as a final list of high confidence trackers (and high confidence bounding boxes) and the remaining foreground bounding boxes can be referred to as final a list of foreground bounding boxes (or blobs). When there is no crowd group in a current frame, the final list of high confidence trackers is equal to the initial list of high confidence trackers (obtained at block 3402) and the final list of foreground bounding boxes is equal to the initial list of foreground bounding boxes (obtained at block 3404), and the crowd-based tracking will not adjust or modify any of the high confidence or foreground bounding boxes.

If a next group is available, the process 3410 determines whether the next group is a crowd group. If the next group is determined to be a crowd group, a conservative tracking process can be performed at block 3412 for the objects within the crowd group. As described in more detail below, the conservative tracking process can be performed to conservatively adapt the high confidence bounding boxes of the objects towards the background subtraction results.

A crowd determination process can be performed to determine whether a current group is a crowd group and thus should be processed to determine whether one or more high confidence bounding boxes in the crowd group should be adjusted according to its one or more associated blobs (foreground bounding boxes). If such a process returns false (a "no" decision at block 3410), the region is considered not to be a crowd group and tracking of the current group can be performed using the normal tracking process at block 3416. If the process returns true (a "yes" decision at block 3410), the group is determined to be a crowd group and the conservative tracking process or mode applies to the group at block 3412. The conservative tracking process is described in more detail below.

In some cases, the crowd determination process can determine whether a current group is a crowd group based on a number of high confidence trackers (and associated high confidence bounding boxes) in the current group relative to a threshold number of high confidence bounding boxes. For example, if a number of high confidence bounding boxes is less than 2, the crowd determination process can return a false result. A current group can also be determined to be a crowd group based on a number of foreground bounding boxes in the current group being greater than a threshold number of foreground bounding boxes. For example, if number of foreground bounding boxes in a current group is larger than the threshold number of foreground bounding boxes and the number of high confidence bounding boxes in the current group is larger than the threshold number of high confidence bounding boxes, the crowd determination process can return a true result. The threshold number of foreground bounding boxes can be set to any suitable value, such as 1, 2, or other suitable number. The threshold number of high confidence bounding boxes can be set to any suitable number, such as 2, 3, or other suitable number. In one illustrative example, if the number of foreground bounding boxes in the current group is larger than 1 and the number of high confidence bounding boxes in the current group is larger than 2, a true result is returned. In such an example, the fact that there are more high confidence bounding boxes in a group than foreground bounding boxes can indicate that there may be a merge situation, where two or more objects have been detected as a single blob (represented by a single foreground bounding box).

In some cases, the crowd determination process can determine whether a current group is a crowd group based on whether a sum of sizes of one or more foreground bounding boxes in the current group is less than a sum of sizes of one or more high confidence bounding regions in the current group. For example, the sum of all foreground bounding boxes inside the current group (denoted as sumFgSize) can be determined by adding up the sizes of the foreground bounding boxes. The sum of all the high confidence bounding boxes inside the group (denoted as sumFgSize) can also be determined by adding up the sizes of the high confidence bounding boxes. If the sumFgSize of the current group is larger than the sumObjectSize of the current group, the crowd determination process can return a false result. In some cases, if the sumFgSize is less than the sumObjectSize, the crowd determination process can return a true result. In some cases, the crowd determination process can subtract the sumObjectSize of a current group by the size of any intersection regions between any two high confidence bounding boxes in the current group. For example, an intersection region (e.g., intersecting region 1408) between a first high confidence bounding box (e.g., $BB_A$ 1402) in a current group and a second high confidence bounding box (e.g., $BB_B$ 1404) in the current group can be subtracted from the sumObjectSize of the current group. The subtraction result can be denoted as sumObjectSizeSubOverlap. In such cases, if the result of the subtraction (sumObjectSizeSubOverlap) is larger than sumFgSize, the crowd determination process can return a false result. In some cases, if the sumObjectSizeSubOverlap is not larger than sumFgSize, the crowd determination process can return a true result.

In one illustrative example, the crowd determination process can include the following steps:
 (a) If number of high confidence trackers is less than 2, return false;
 (b) If number of foreground bounding boxes is larger than 1 and number of high confidence bounding boxes is larger than 2, return true;
 (c) If the sum of all foreground bounding boxes inside the region (denoted as sumFgSize) is larger than the sum of all the high confidence box inside the region (denoted as sumObjectSize), return false;
 (d) Subtract the sumObjectSize by size interaction of bounding boxes of any two high confidence trackers, denote the results as sumObjectSizeSubOverlap; If the subtraction result, sumObjectSizeSubOverlap, is larger than sumFgSize, return false.

If the next group is determined not to be a crowd group at block 3410, in which case the group is determined to be a normal group, the high confidence trackers (and their high confidence bounding boxes) of the normal group can be included in the final list of high confidence trackers 3414, and the foreground bounding boxes of the normal group can be included in the final list of foreground bounding boxes 3418, as shown in FIG. 34. The final list of high confidence trackers 3414 and the final list of foreground bounding boxes 3418 can be processed by the normal tracking process at block 3416. Also, when a next group is determined to be a normal group at block 3410, the process 3400 can again determine if a next group is available at block 3408. If a next group is determined not to be available at block 3408, the process 3400 proceeds to perform normal tracking at block 3416 using the final list of high confidence trackers 3414 and the final list of foreground bounding boxes 3418.

The normal tracking process is performed at block 3416 for objects in one or more normal groups. For example, the final list of high confidence trackers 3414 and the final list of foreground bounding boxes 3418 are provided for processing by the normal tracking process at block 3416. The normal tracking process 3416 can associate tracker bounding boxes with blob bounding boxes using, for example, the techniques described above with respect to the object tracking system 106 shown in FIG. 4 (e.g., cost determination, data association, and tracker updates).

If one or more high confidence trackers (and their associated high confidence bounding boxes) are removed using the region refinement process described above, a current group may need to be rechecked using the crowd determination process after the one or more high confidence trackers are removed to determine whether the current region is a crowd region. Any high confidence trackers and associated high confidence bounding boxes removed using the region refinement process described above may be considered as belonging to one or more normal groups (not to any crowd groups). In some cases, when a high confidence tracker is removed from a group using the region refinement process, the high confidence tracker (and its bounding box) can be included in the final list of high confidence trackers 3414 that will be processed using the normal tracking at block 3416. In some cases, when a high confidence tracker is removed from a group, the high confidence tracker (and its bounding box) can be tracked with a "bypass mode," which is described in more detail below.

Figure 35:
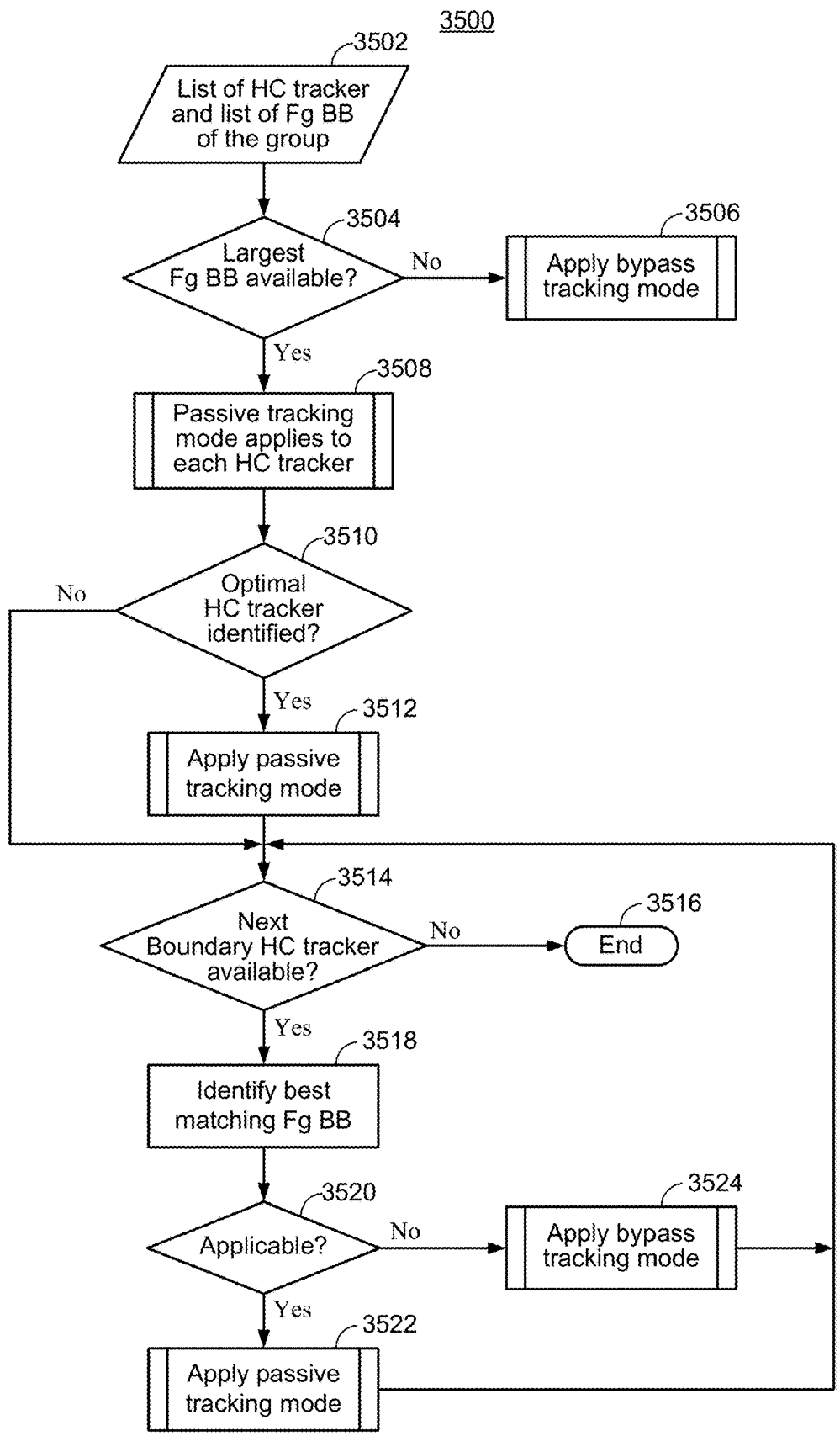
FIG. 35 is a flowchart illustrating an example of a conservative tracking process, in accordance with some examples.

FIG. 35 is a flowchart illustrating an example of a conservative tracking process 3500 of the crowd-based tracking mode. The conservative tracking process applies to a crowd group. In some cases, the conservative tracking process can be applied such that only one or more selective groups may be updated according to the detected foreground bounding boxes and other groups may be tracked by keeping the same bounding boxes as in the previous frame. As noted above, in some cases, the crowd-based tracking mode applies for non-key frames only. In such cases, some high confidence trackers are bypassed in non-key frames. A tracker which is bypassed (for tracking) is denoted as being tracked with bypass mode. As used herein, bypass mode for a group means that the group is not considered to be a crowd region. Any tracker (object) or bounding region that belongs to a group that is not a crowd group will be tracked using the normal tracking mode (e.g., normal association between high confidence bounding boxes and foreground bounding boxes to determine a final set of bounding boxes for tracking). For key frames, such a crowd-based tracking mode may not be applied, and any high confidence tracker may have a much higher chance to have its high confidence bounding box updated more precisely, in which case the associated object can be tracked more precisely.

The process 3500 uses as input the list of high confidence trackers (and their high confidence bounding boxes) and the list of foreground bounding boxes for a current group (the next group determined at block 3408 of the process 3400). At block 3504, the process 3500 determines if a significant foreground bounding box is available in the list of foreground bounding boxes. For example, the most significant foreground bounding boxes in the list can firstly be identified and used to update the associated high confidence bounding boxes of the high confidence trackers. In some cases, only one significant foreground bounding box (e.g., the biggest foreground bounding box in the group) may be identified and used to update the high confidence bounding boxes that are associated with that foreground bounding box. In some cases, multiple significant foreground bounding boxes can be identified in a group (e.g., any foreground bounding box that is larger than the threshold size described below).

For example, the object associated with the largest foreground bounding box in the group is identified if one exists. To qualify as the significant foreground bounding box for the group, the largest foreground bounding box in the group must be larger than a threshold size. The threshold size is equal to rSmallObjet of the smallest object size in the group. The smallest object size in the group is denoted as minObjectSize, and is measured by the bounding box sizes of the high confidence trackers in the previous frame (a high confidence tracker's predicted bounding box in the current frame). The threshold rSmallObject may be set to any suitable value, such as 0.05, 0.06, 0.08, 0.1, or other suitable value. For example, the largest foreground bounding box in the group qualifies as the most significant foreground bounding box in the current group if the foreground bounding box is larger than rSmallObject (e.g., 0.06) of the smallest predicted high confidence bounding box in the current group. Otherwise, a significant foreground bounding box is not identified for the current group (a "no" decision at block 3504). For example, when an object in the group is static or moving slowly, a part of the object can be detected as background, causing small blobs (foreground bounding boxes) to be detected for other parts of the object. If one of these small foreground bounding boxes is the largest bounding box in the group, and are not at least the threshold size, these bounding boxes are not determined to be a most significant foreground bounding box for the group.

If a most significant foreground bounding box is not identified for the current group at block 3504, the process 3500 applies bypass tracking mode for all of the high confidence trackers in the current group. For example, when a most significant foreground bounding box is not identified for a group, all of the high confidence trackers in that group can be tracked in the current frame with bypass mode, in which case the conservative tracking process 3500 for the current group is ended.

In some cases, small foreground bounding boxes can be removed to avoid being identified as significant foreground bounding boxes. For example, any foreground bounding boxes within the group that are smaller than rIgnoreFg of the smallest object size (minObjectSize) of the group will be removed. The threshold rIgnoreFg may be set to any suitable value, such as 0.08, 0.09, 0.1, or other suitable value.

If a most significant foreground bounding box for the current group is identified, passive tracking mode can be applied to one or more high confidence trackers in the current group at block 3508. The process 3500 can then try to identify an optimal high confidence tracker at block 3510 based on the passive tracking mode that is applied to the one or more high confidence trackers. For example, all high confidence trackers that are overlapping with the most significant foreground bounding box are identified. In addition, the width and height of each high confidence bounding box that is overlapping with the most significant foreground bounding box is inspected to determine which high confidence tracker is to be identified as the associated high confidence tracker (the optimal high confidence tracker) for the most significant foreground bounding box, and also to determine whether the associated high confidence tracker should be tracked with bypass mode. If the associated high confidence tracker is determined not to be tracked with bypass mode, it is tracked using a passive tracking mode.

For example, if there is only one high confidence tracker bounding box overlapping with the significant foreground bounding box, that high confidence tracker can be identified as the associated high confidence tracker for the most significant foreground bounding box. However, if there are multiple high confidence trackers that are overlapping the most significant foreground bounding box, a cost determination can be used to determine which high confidence bounding box is the associated high confidence bounding box. The cost determination is based on adjustment of the high confidence bounding boxes using the passive tracking mode. For example, as described in more detail below, the passive tracking mode matches a foreground bounding box (the most significant foreground bounding box in this case) with a high confidence tracker, so that a portion of the bounding box of the high confidence tracker may be adjusted to align with a portion of the foreground bounding box. In some cases, the adjustment can contain only a minor horizontal shift and a minor vertical shift of the previous (or predicted) bounding box of the high confidence tracker. The total shift of the high confidence tracker bounding box is used to define the cost of the adjustment. When there are multiple high confidence trackers that are overlapping with a given foreground bounding box, the high confidence tracker with the minimum adjustment cost will be chosen to be the high confidence tracker that is associated with the given foreground bounding box.

Whether an associated high confidence tracker should be tracked with bypass mode or passive tracking mode can be determined based on the size of the most significant foreground bounding box, the smallest width of all of the high confidence trackers in the current group, and the smallest height of all of the high confidence trackers in the current group. The smallest width among the high confidence trackers in the current group is denoted as minObjectWidth, and the smallest height among the high confidence trackers in the current group is denoted as minObjectHeight. For example, if a width ratio between the width of the foreground bounding box and the minObjectWidth is within a width ratio range of [RLwa, RLwb], the passive tracking mode may be performed. For example, if a height ratio between the height of the foreground bounding box and the minObjectHeight is within a height ratio range of [RLha, RLhb], the passive tracking mode may be performed. Otherwise, the bypass mode may be performed. In some cases, the width ratio has to be within the width ratio range and the height ratio has to be within the height ratio range in order for passive tracking to be performed for the associated high confidence tracker.

The width ratio range [RLwa, RLwb] can be set to any suitable value. In one illustrative example, [RLwa, RLwb] may be set to [0.66, 2]. The height ratio range [RLha, RLhb] can also be set to any suitable value. In one illustrative example, [RLha, RLhb] may be set to [0.8, 2.5]. The width ratio and height ratio ranges can be used to indicate when the width and the height of the high confidence tracker is close in size to the foreground bounding box width and height. When the widths and heights of the high confidence tracker bounding box and the foreground bounding box are close in size (according to the ranges), passive tracking may be performed for the high confidence tracker.

At block 3512, the passive tracking mode can then be applied to adjust the associated high confidence tracker according to the given foreground bounding box. Further details of the passive tracking mode are described below with respect to FIG. 36A-FIG. 36F.

At block 3514, the process 3500 determines if a next boundary high confidence tracker is available. For example, after one or more most significant foreground bounding boxes have been used to update any associated high confidence trackers, the remaining high confidence trackers are processed by selecting from the high confidence trackers that are along the boundary of the group and that have not already been processed. For instance, once a high confidence tracker that is associated with a significant foreground bounding boxes is processed using the passive tracking mode, the high confidence tracker can be removed from the list of high confidence trackers. The high confidence trackers remaining in the list of high confidence trackers can be processed at block 3514. In some cases, a foreground bounding box used to modify an associated high confidence during the passive tracking mode can be removed from the list of foreground bounding boxes or can be modified, as discussed in more detail below.

In some cases, an iterative process can be applied to select a next boundary high confidence tracker. For example, a next boundary high confidence tracker can be selected from a top-most high confidence tracker bounding box, a bottom-most high confidence tracker bounding box, a left-most high confidence tracker bounding box, and a right-most high confidence tracker bounding box in the group. In one illustrative example, the top-most high confidence bounding box has the minimum y-coordinate relative to top-left point of the union region of the group (e.g., union bounding box 1410), the bottom-most high confidence bounding box has the maximum y-coordinate relative to the top-left point, the left-most high confidence bounding box has the minimum x-coordinate relative to the top-left point, and the right-most high confidence bounding box has the maximum x-coordinate relative to the top-left point. One or ordinary skill will appreciate that any other reference point can be used to determine the high confidence bounding boxes that are on the outer-most perimeter of the group.

Among these identified boundary high confidence trackers, the boundary high confidence tracker that has the most overlap with all of the remaining foreground bounding boxes within the group is selected. Such overlap of each of the boundary high confidence trackers can be defined as the sum of preBBCurHCTrackern̄fgBB[i], where preBB-CurHCTracker is the predicted bounding box (from the previous frame) of a boundary high confidence tracker, fgBB[i] indicates each i-th entry of the remaining foreground bounding boxes within the region, and the ∩ notation denotes the intersection operation.

If a next boundary high confidence tracker is determined not to be available at block 3514, the process ends at block 3516. However, if a next boundary high confidence tracker is selected using the techniques described above, the process 3500 identifies, at block 3518, the best matching foreground bounding box for the selected boundary high confidence tracker. For instance, for the selected boundary high confidence tracker, the process 3500 can identify, from the remaining foreground bounding boxes within the region, the best matching foreground bounding box based on a spatial relationship between the foreground bounding box and the predicted high confidence bounding box (from the previous frame) of the selected boundary high confidence tracker.

One example of a spatial relationship is an intersection-over-union (IoU). Referring to FIG. 14, the IoU of the two bounding boxes 1402 and 1404 can be determined as the overlapping area between the first bounding box 1402 and the second bounding box 1404 (the intersecting region 1408) divided by the union bounding box 1410 of the bounding boxes 1402 and 1404

$$\left(\text{denoted as } IoU = \frac{\text{Area of Intersecting Region 1408}}{\text{Area of Union 1410}}\right).$$

Using IoU as an example of the spatial relationship, the foreground bounding box from among the remaining foreground bounding boxes that has the maximum IoU with the predicted high confidence bounding box can be selected as the best matching foreground bounding box for the selected boundary high confidence tracker.

In some cases, the process 3500 can determine, at block 3520, whether a selected best matching foreground bounding box is applicable. For instance, a selected best matching foreground bounding box can be disregarded if it does not meet one or more conditions, or can be considered applicable if the one or more conditions are satisfied. For example, a first condition can include that the IoU between the selected best matching foreground bounding box and the selected boundary high confidence bounding box is larger than an IoU threshold T. The IoU threshold T can be set to any suitable value, such as 0.25, 0.30, 0.35, 0.40, or other suitable value. For instance, if the IoU between the selected best matching foreground bounding box and the selected boundary high confidence bounding box is larger than an IoU threshold T, the best matching foreground bounding box can be considered as applicable. As another example, a second condition can be based on a width ratio between the selected best matching foreground bounding box and the boundary high confidence bounding box. For example, if the width ratio between the foreground bounding box and the high confidence bounding box is within a range of [Rwa, Rwb], the best matching foreground bounding box can be considered as applicable. The range [Rwa, Rwb] can be set to any suitable value. In one illustrative example, [Rwa, Rwb] may be set to [0.7, 2]. As another example, a third condition can be based on a height ratio between the selected best matching foreground bounding box and the boundary high confidence bounding box. For example, if the height ratio between the foreground bounding box and the high confidence bounding box is within a range of [Rha, Rhb], the best matching foreground bounding box can be considered as applicable. The range [Rha, Rhb] can be set to any suitable value. In one illustrative example, [Rha, Rhb] may be set to [0.6, 1.5].

In one illustrative example, the best matching foreground bounding box can be considered as applicable if all of the following conditions are true:
  (a) IoU between the foreground bounding box and the current high confidence tracker is larger than T (e.g., set to 0.35);
  (b) The width ratio between the foreground bounding box and the current high confidence tracker is within a range of [Rwa, Rwb]; For example, [Rwa, Rwb] may be set to [0.7, 2]; and
  (c) Its height ratio between the foreground bounding box and the current high confidence tracker is within a range of [Rha, Rhb]; For example, [Rha, Rhb] may be set to [0.6, 1.5].

When a best matching foreground bounding box is determined to applicable at block 3520, the passive tracking mode can be applied at block 3522 for the selected high confidence tracker using the best matching foreground bounding box. When the best matching foreground bounding box exists for a selected boundary high confidence tracker (e.g., maximum IoU larger than 0), but is not considered applicable at block 3520, the boundary high confidence tracker is tracked with bypass mode and the matching foreground bounding box can be removed from the list of foreground bounding boxes for the group. In some cases, if a best matching foreground bounding box does not exist for the selected boundary high confidence tracker, the boundary high confidence tracker can be tracked using the bypass mode.

Once a current boundary high confidence tracker is processed (using bypass mode or passive tracking mode), the boundary high confidence tracker can be removed from the list of high confidence trackers maintained for the group. The process 3500 can then return to block 3514 to determine if a next boundary high confidence tracker is available in the group. If a next boundary high confidence tracker is determined not to be available at block 3514, the process ends at block 3516. The boundary high confidence bounding boxes can be selected for processing using the iterative process discussed above in order iteratively reduce the group for analysis. For example, as more and more high confidence trackers on the boundary are processed and removed from the list of high confidence trackers for the group, the union region of the group becomes smaller and smaller until there are no more boundary high confidence trackers left in the group.

As noted above, the passive tracking mode can adjust a high confidence tracker so that a portion of the bounding box of the high confidence tracker aligns with a portion of the associated foreground bounding box. For example, the passive tracking mode can take the predicted high confidence bounding box (from the previous frame) of a high confidence tracker and the associated foreground bounding box as inputs, and can provide a "result bounding box" resulting from the passive tracking mode and the shift as outputs. The predicted bounding box of the high confidence tracker can be denoted as pBB. To produce the result bounding box, the passive tracking mode can keep the result bounding box to be the same size (e.g., the same width and height) as that of the predicted bounding box (pBB) of the high confidence tracker, and can shift the bounding box (pBB) once horizontally and once vertically according to a portion of the foreground bounding box. The horizontal and vertical operations can be performed independently. The portion of the foreground bounding box can include a boundary of the foreground bounding box (e.g., a left boundary, a right boundary, a top boundary, and/or a left boundary), a point on the foreground bounding box (e.g., a centroid, a top-left point, or other suitable point), and/or other suitable part of the foreground bounding box. In some cases, the shift (e.g., left shift, right shift, upward shift, and downward shift) of the high confidence tracker bounding box can be constrained by a shift threshold (denoted as minShift). The shift threshold (minShift) can be set to any suitable value. In one illustrative example, the shift threshold (minShift) can be set to the half of the width of the high confidence bounding box of high confidence tracker. A global shift (denoted as gShift) can be defined to include the total amount of shift (e.g., in both horizontal and vertical directions) for the high confidence tracker. The global shift (gShift) can initially be set to 0 at the beginning of the passive tracking process for the high confidence tracker in the current frame. Each current iteration of the passive tracking process is performed separately for each association (between a high confidence tracker and an associated foreground bounding box) for which the passive tracking mode is applied, and the gShift is set to 0 for each association of each frame. After the shift process, there can be two shifting operations, one in the horizontal direction and one in the vertical direction. The global shift (gShift) can be used to calculate the overall shift. For example, if the high confidence tracker bounding box is shift horizontally by 3 units (e.g., pixels, grid coordinates, or other measure of movement), and is shifted vertically by 5 units, the gShift will be 8.

FIG. 36A-FIG. 36F are diagrams illustrating examples of application of the passive tracking mode to a predicted bounding box (pBB) of a high confidence tracker using an associated foreground bounding box (Fgbb). While the examples include adjusting a boundary of the pBB to be aligned with a boundary of the Fgbb, one of ordinary skill will appreciate the pBB can be aligned with the Fgbb in other ways, such as by aligning the centroid of the pBB with the centroid of the Fgbb, aligning the top-left most point of the pBB with the top-left most point of the Fgbb, or using any other suitable technique. Because the horizontal and vertical operations are done independently, without loss of generality, only the horizontal shift is described for the six different cases shown in FIG. 36A-FIG. 36F. In such cases, the shift (either left or right shift) is constrained by the shift threshold (minShift). The global shift (gShift) can initially be set to 0.

Figure 36A:
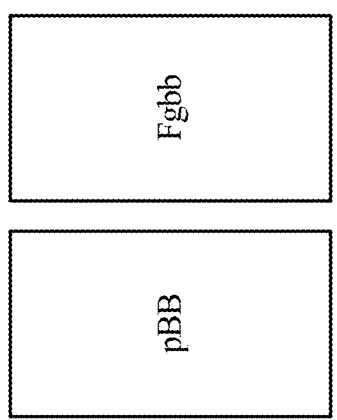
FIG. 36A-FIG. 36F are diagrams illustrating examples of application of the passive tracking process, in accordance with some examples.

In the example illustrated in FIG. 36A, the pBB is completely to the left of the Fgbb. The passive tracking process can set the shift of the pBB to be the minimum of the three values LShift, the RShift, and minShift (the shift threshold). LShift is equal to the shift needed to align the left boundaries of pBB and Fgbb. Rshift is equal to the shift needed to align the right boundaries of pBB and Fgbb. The global shift can be determined as gShift+=shift (or gShift=gShift+shift), where shift is the amount by which the high confidence tracker is currently being shifted by the passive tracking mode. In the scenario shown in FIG. 36A, the pBB is right shifted to generate the result bounding box. For example, the pBB can be shifted to the right so that the right boundary of pBB is aligned with the right boundary of the Fgbb.

Figure 36B:
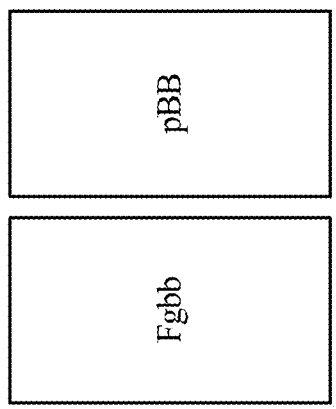

In the example illustrated in FIG. 36B, the pBB is completely to the right of the Fgbb. The passive tracking process can set the shift to be the minimum of the three values LShift, RShift, and minShift. Again, the global shift can be determined as gShift+=shift. In the scenario shown in FIG. 36A, the pBB is left shifted to generate the result bounding box. For example, the pBB can be shifted to the left so that the left boundary of pBB is aligned with the left boundary of the Fgbb.

Figure 36C:
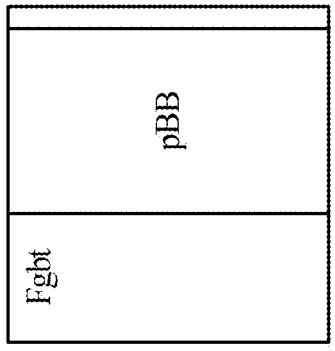

In the example illustrated in FIG. 36C, the pBB is completely within (or inside of) the Fgbb (and is also completely aligned vertically or entirely vertically within the Fgbb). In such a scenario, the passive tracking process can perform no shift of the pBB.

Figure 36D:
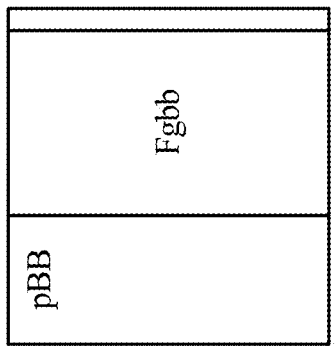

In the example illustrated in FIG. 36D, the fgBB is completely within (or inside of) the pBB (and is also completely aligned vertically or entirely vertically within the pBB). In such a scenario, the passive tracking process can perform no shift of the pBB.

Figure 36E:
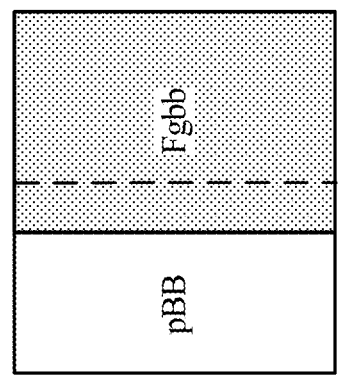

In the example illustrated in FIG. 36E, the pBB is to the left of the Fgbb, but is still overlapped with the Fgbb. The dotted line shown in FIG. 36E illustrates the right boundary of the pBB. The passive tracking process can set the shift to be the minimum of the two values LShift and minShift. Again, LShift equals to the shift needed to align the left boundaries of pBB and Fg BB. The global shift can be updated to be gShift+=shift. In the example of FIG. 36E, the pBB is right shifted to generate the result bounding box. For example, the pBB can be shifted to the right so that the right boundary of pBB is aligned with the right boundary of the Fgbb.

Figure 36F:
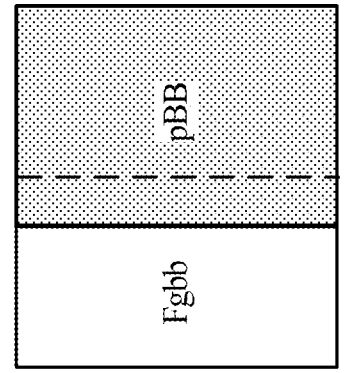

In the example illustrated in FIG. 36F, the pBB is to the right of the Fgbb, but is still overlapped with the Fgbb. The dotted line shown in FIG. 36F illustrates the right boundary of the Fgbb. The passive tracking process can set the shift to be the minimum of the two values RShift and minShift. Again, RShift equals to the shift needed to align the right boundaries of pBB and Fgbb. The global shift can be updated to be gShift+=shift. In the example of FIG. 36F, the pBB is left shifted to generate the result bounding box. For example, the pBB can be shifted to the left so that the left boundary of pBB is aligned with the left boundary of the Fgbb.

As noted previously, after the passive tracking mode is applied to a high confidence tracker, the high confidence tracker can be removed from the list of high confidence trackers for a group. An associated foreground bounding box that was used to modify a high confidence tracker during the passive tracking process can either be removed from the list of foreground bounding boxes for a group or can be modified. A reason for modifying the associated foreground bounding box instead of removing it is to accommodate cases when a foreground bounding box is so big that it covers more than one object (with each object being indicated by a high confidence tracker).

A complete removal process can be performed to determine whether to remove a foreground bounding box from the list of foreground bounding boxes for a group. Conditions for completely removing a foreground bounding box can be based on a size of the foreground bounding box, based on a size of the associated high confidence tracker bounding box, and/or based on the part of the foreground bounding box that is outside of the high confidence tracker's predicted bounding box (the non-overlapping portion). For example, it can be determined whether to remove a foreground bounding box by comparing the sizes of the foreground bounding box and the associated high confidence tracker bounding box, and also the part of foreground bounding box that is outside the high confidence tracker's predicted bounding box. The result bounding box for a high confidence tracker is denoted as resBB, and the overlap bounding box between resBB and the foreground bounding box (Fgbb) is denoted as oBB. In some cases, for resiliency purposes, the process for determining whether to completely remove a foreground bounding box can be performed, for a given high confidence tracker, to any foreground bounding box in the group that has not been previously removed from the list of high confidence trackers.

In one example, if the size of the foreground bounding box (Fgbb) is smaller than a ratio R of the resBB (denoted as size(Fgbb)<R*size(resBB)), the foreground bounding box (Fgbb) is to be removed from the list of foreground bounding boxes. The ratio R can be set to any suitable value, such as 0.20, 0.25, 0.30, or any other suitable value.

In another example, if the size of the area of the foreground bounding box (Fgbb) that is not overlapped with the result bounding box (resBB) is smaller than R2 of the resBB size, the foreground bounding box (Fgbb) is to be removed from the list of foreground bounding boxes. The size of the area of the foreground bounding box (Fgbb) that is not overlapped with the result bounding box (resBB) can be determined as the size of the Fgbb subtracted by the size of the oBB, and the condition can be denoted as (size (Fgbb)–size (oBB))<R2*size(resBB). The term R2 can be set to any suitable value, such as 0.4, 0.5, 0.6, or any other suitable value.

In another example, if the size of the result bounding box (resBB) is larger than R3 of the foreground bounding box (Fgbb) size (denoted as size(resBB)>R3*size(Fgbb)), the foreground bounding box (Fgbb) is to be removed from the list of foreground bounding boxes. The term R3 can be set to any suitable value, such as 0.60, 0.65, 0.67, 0.70, or any other suitable value.

In some cases, all of the above-described conditions may be considered when performing the complete removal process. In one illustrative example, the following steps may be applied by the complete removal process to determine whether to remove a foreground bounding box (Fgbb) from the list of foreground bounding boxes:

(a) If the size of Fgbb is smaller than ratio R of the resBB, where R may be set to 0.25 as an example, the Fgbb is to be removed;

(b) Otherwise, if the size of the area of the Fgbb that is not overlapped with resBB (i.e., the size of Fgbb subtracted by the size of oBB) is smaller than R2 of the resBB size, where R2 may be set to 0.5 as an example, the Fgbb is to be removed;

(c) Otherwise, if the size of resBB is larger than R3 of Fgbb size, the Fgbb is to be removed. Here, R3 may be set to 0.67 as an example.

If the conditions for removing a foreground bounding box (Fgbb) are not met, the foreground bounding box (Fgbb) is not removed from the list of foreground bounding boxes. If a foreground bounding box is not to be removed, and the overlap bounding box between resBB and the foreground bounding box (oBB) is not empty, the foreground bounding box may be modified so that part of the foreground bounding box is kept for use in further tracking operations.

Figure 37:
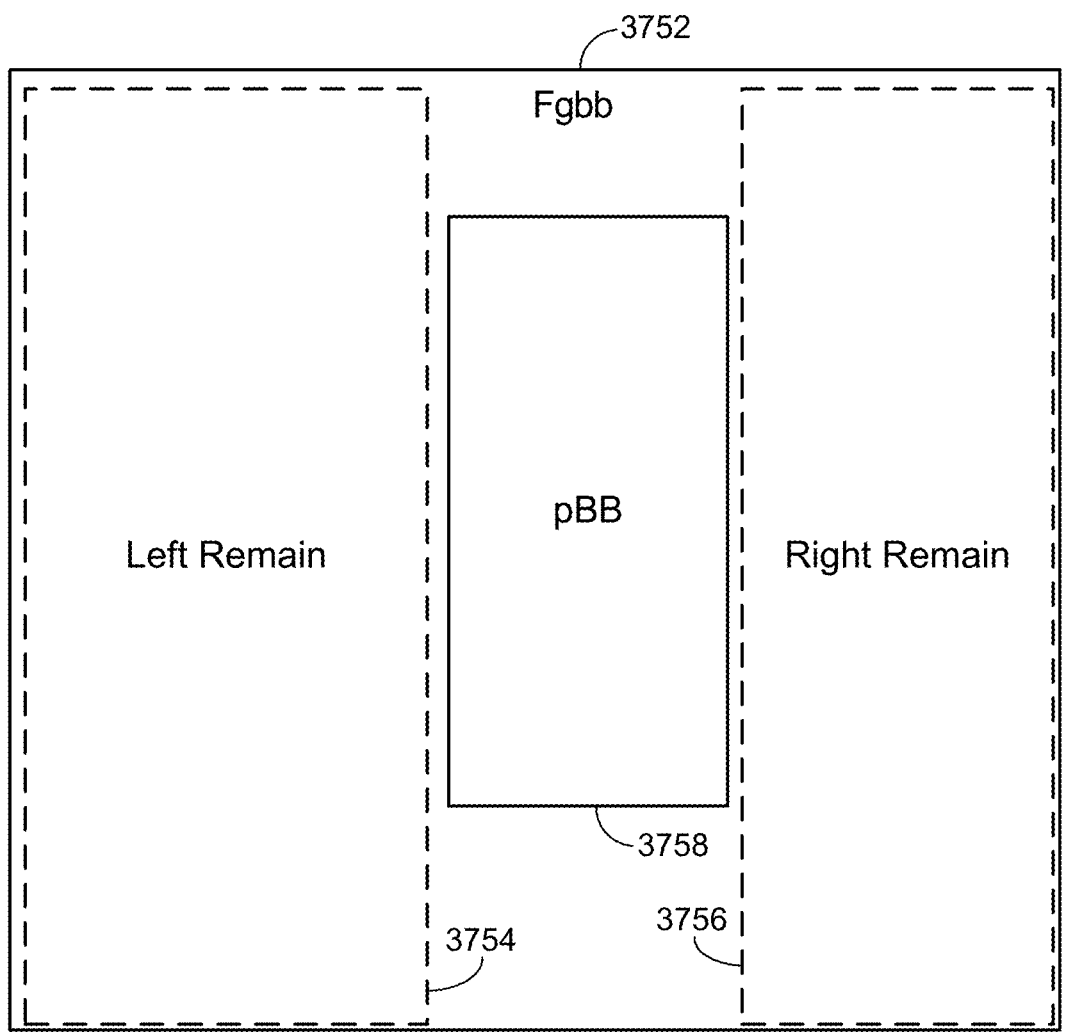
FIG. 37 is a diagram illustrating an example of remain regions of a foreground bounding box after passive tracking is applied, in accordance with some examples.

FIG. 37 is a diagram illustrating an example of modifying a foreground bounding box so that part of the foreground bounding box can be used for tracking. In some cases, it can be assumed that a crowd scene occurs when objects are positioned horizontally side-by-side when modifying the objects. However, the same techniques apply when objects are positioned in additional configurations. As shown in FIG. 37, the bounding box 3754 that has a left boundary aligned with a left boundary of the foreground bounding box (Fgbb 3752), a right boundary aligned with the left boundary of the predicted high confidence bounding box (pBB 3758), and both top and bottom boundaries aligned with the Fgbb 3752 is identified as a "left remain" bounding box of the Fgbb 3752. The bounding box 3756 that has a left boundary aligned with the right boundary of the pBB 3758, a right boundary aligned with the right boundary of the Fgbb 3752, and both top and bottom boundaries aligned with the Fgbb is identified as a "right remain" bounding box of the Fgbb 3752.

If both the "left remain" and "right remain" bounding boxes are present (thus not empty), the bigger bounding box of the two is set to be the final modified foreground bounding box. In the example of FIG. 37, the left remain bounding box is larger than the right remain bounding box, in which case the left remain bounding box can be selected as the final modified foreground bounding box. The final modified foreground bounding box can then be added back to the list of foreground bounding boxes for the group, and can be used again if a next boundary high confidence tracker is determined to be available at block 3514 of the process 3500. If only "remain" bounding box (a "left remain" or "right remain") is present for a Fgbb, the one remain bounding box is added back to the list of foreground bounding boxes for the group. If no remain bounding boxes are present (e.g., because of being removed already due to the complete removal process described above), the entire foreground bounding box (Fgbb) can be removed.

Using the above-described crowd-based tracking techniques, a hybrid video analytics system can accurately and reliably track objects in a crowd scene that includes multiple objects that are in close proximity. For example, the crowd-based tracking mode can be used to track the objects in a crowded scene, which can avoid having significantly degraded bounding boxes at frame level.

FIG. 38-FIG. 45 are video frames illustrating several subjective examples comparing the crowd-based tracking techniques described herein (using a hybrid video analytics system) and a conventional video analytics system that does not use a deep learning based detector. In the examples show in FIG. 38-FIG. 45, the hybrid video analytics solution is based on an SSD detector, and only "person", "cat", "dog", "horse", and "sheep" are kept; bounding boxes with other classes have been filtered out. In the following subjective examples, the anchor version (shown with dashed bounding boxes) did not handle tracking of the crowded objects. The crowd-based tracking techniques described herein (shown with solid bounding boxes) was able to track the persons in the crowded scenes.

Figure 38:
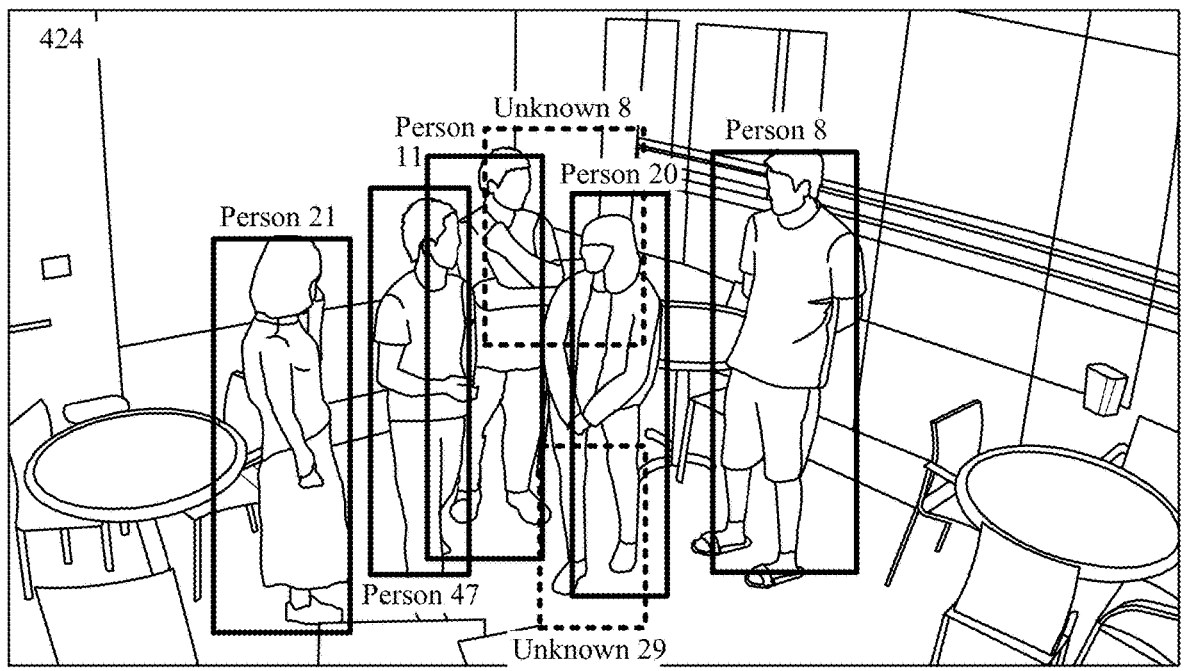
FIG. 38 is a video frame of a crowd scene, in accordance with some examples.

FIG. 38 is a video frame of a crowded scene with several people. The crowd of people are moving slowly, causing the anchor system to only be able to detect limited partial body parts of some of the people. For example, the anchor system (without crowd-based tracking) tracks only the head of a person, as shown by the bounding box labled "unknown 5."

Figure 39:
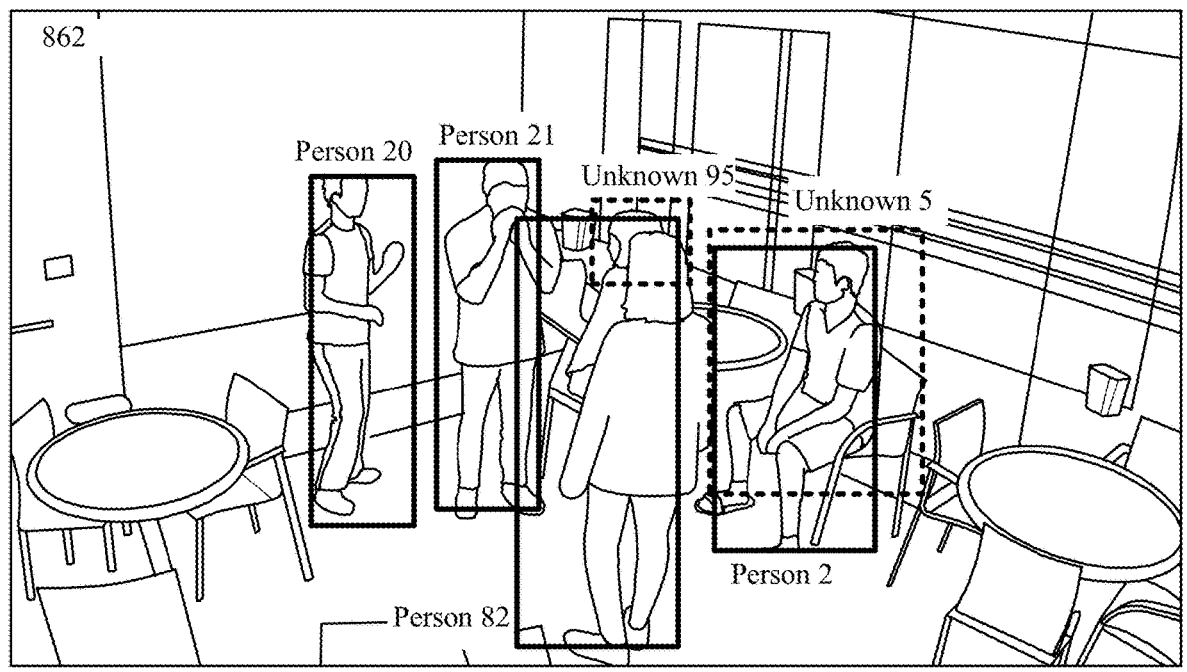
FIG. 39 is another video frame of a crowd scene, in accordance with some examples.

FIG. 39 is another video frame of a crowded scene with several people. Similar to the scene shown in FIG. 38, the crowd of people are moving slowly, in which case the anchor system can only detect limited partial body parts of some of the people. For example, the anchor system only tracks the feet of one of the people, as shown by the bounding box with the label "unknown 5." Also, only a side portion of another person is tracked, as shown by the bounding box with the label "unknown 29."

Figure 40:
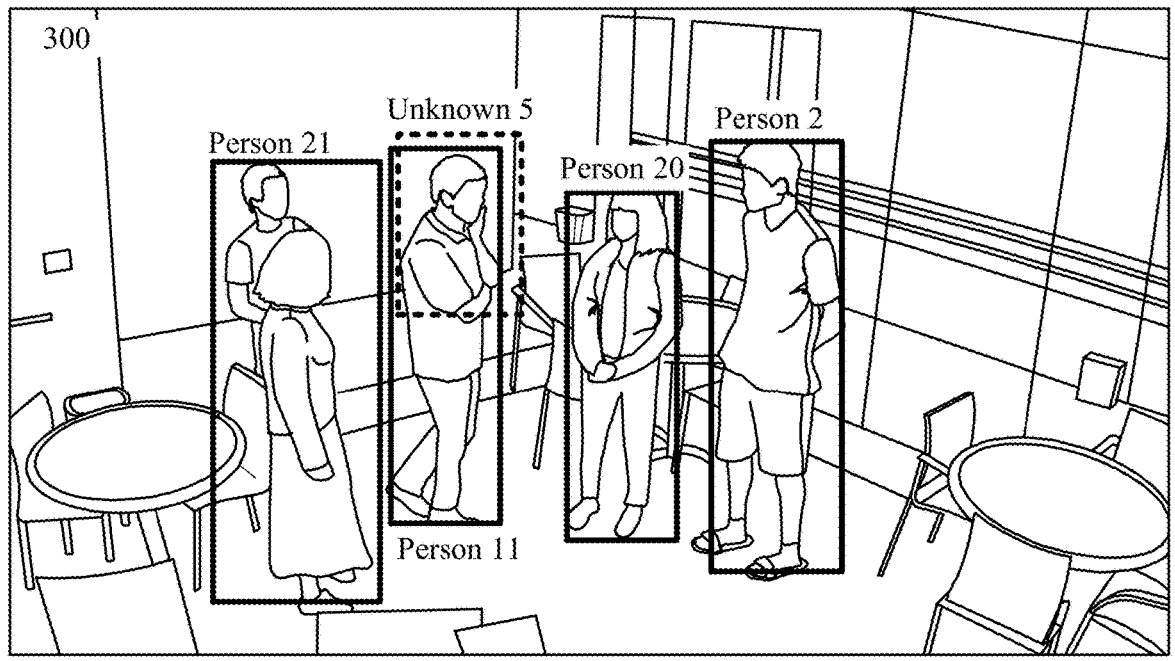
FIG. 40 is another video frame of a crowd scene, in accordance with some examples.

FIG. 40 is another video frame of a crowded scene with several people. The crowd of people are moving slowly, the anchor version can only detect limited partial body parts of some people. For example, the anchor system tracks only the heads of two people using one bounding box labled "unknown 8." Also, only the feet of one of the people is tracked using the bounding box with label "unknown 29."

Figure 41:
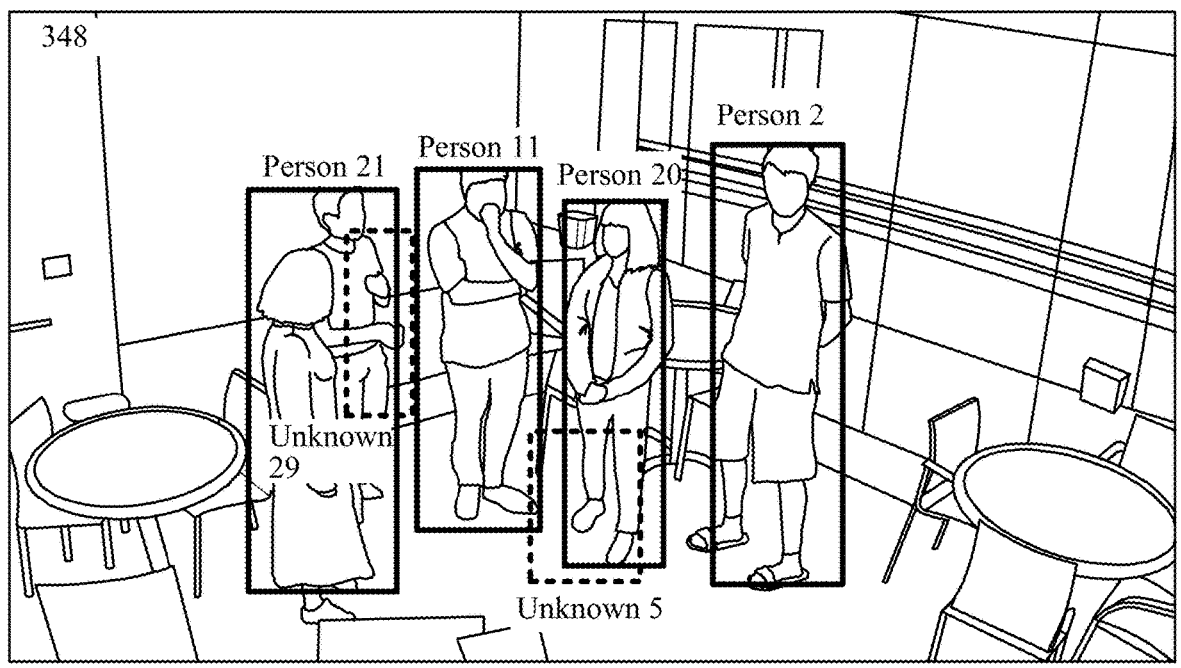
FIG. 41 is another video frame of a crowd scene, in accordance with some examples.

FIG. 41 is another video frame of a crowded scene with several people. The crowd of people are moving slowly, the anchor version can only detect limited partial body parts of some people. Similar to the other scenes shown in FIG. 38-FIG. 40, the crowd of people are moving slowly, causing the anchor system to detect and track only limited partial body parts of some of the people (e.g., tracking only the head of a person using the bounding box with label "unknown 95" and tracking less than all of a person using the bounding box with label "unknown 5").

Figure 42:
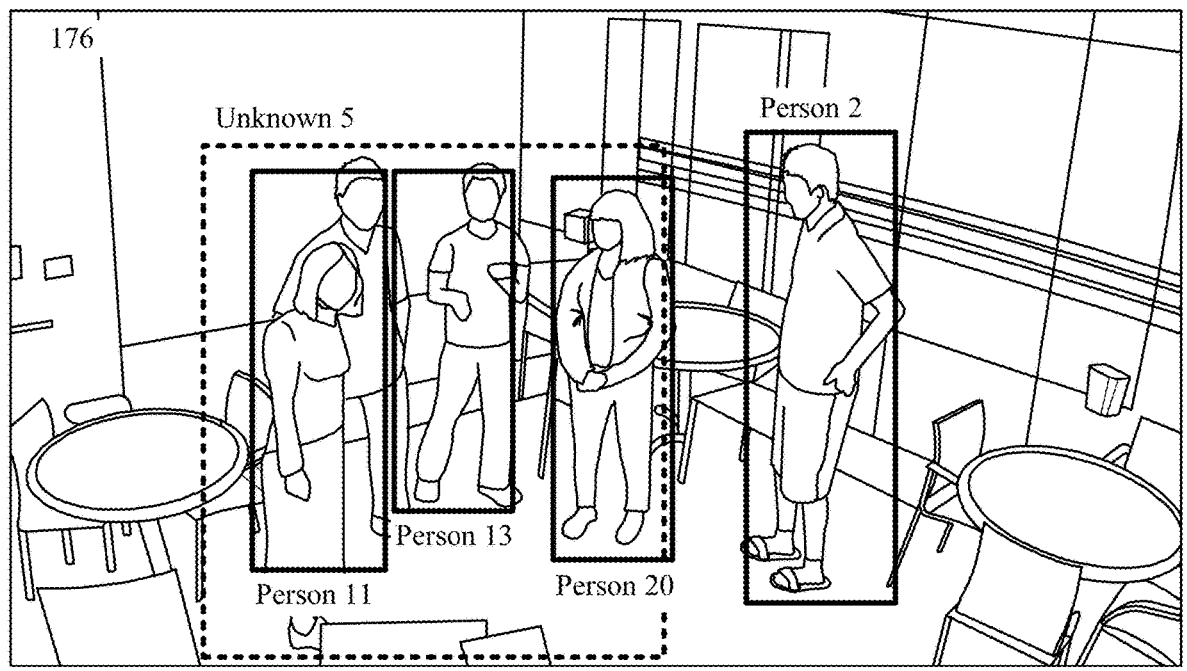
FIG. 42 is another video frame of a crowd scene, in accordance with some examples.

FIG. 42 is a video frame of a crowded scene with several people. In the scene shown in FIG. 42, the anchor system can only detect and track some people coarsely as a merged group (the large dotted bounding box with label "unknown 29").

Figure 43:
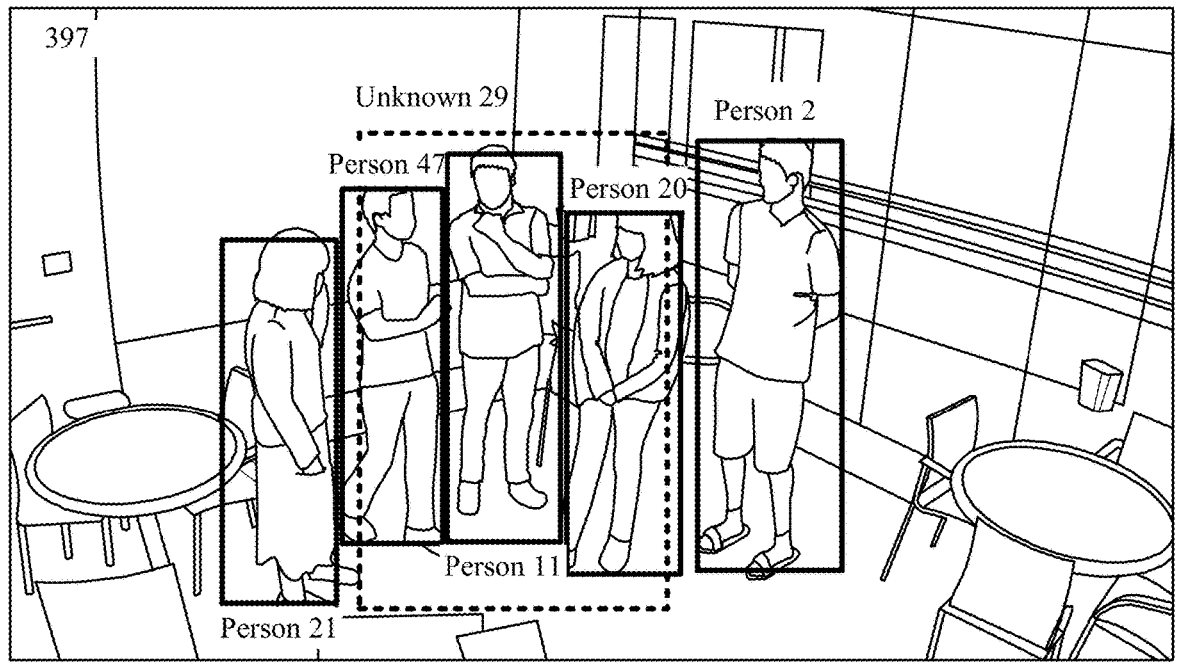
FIG. 43 is another video frame of a crowd scene, in accordance with some examples.

FIG. 43 is a video frame of a crowded scene with several people. In the scene shown in FIG. 43, the anchor system can only detect and track some people coarsely as a merged group (the large dotted bounding box with label "unknown 29").

Figure 44:
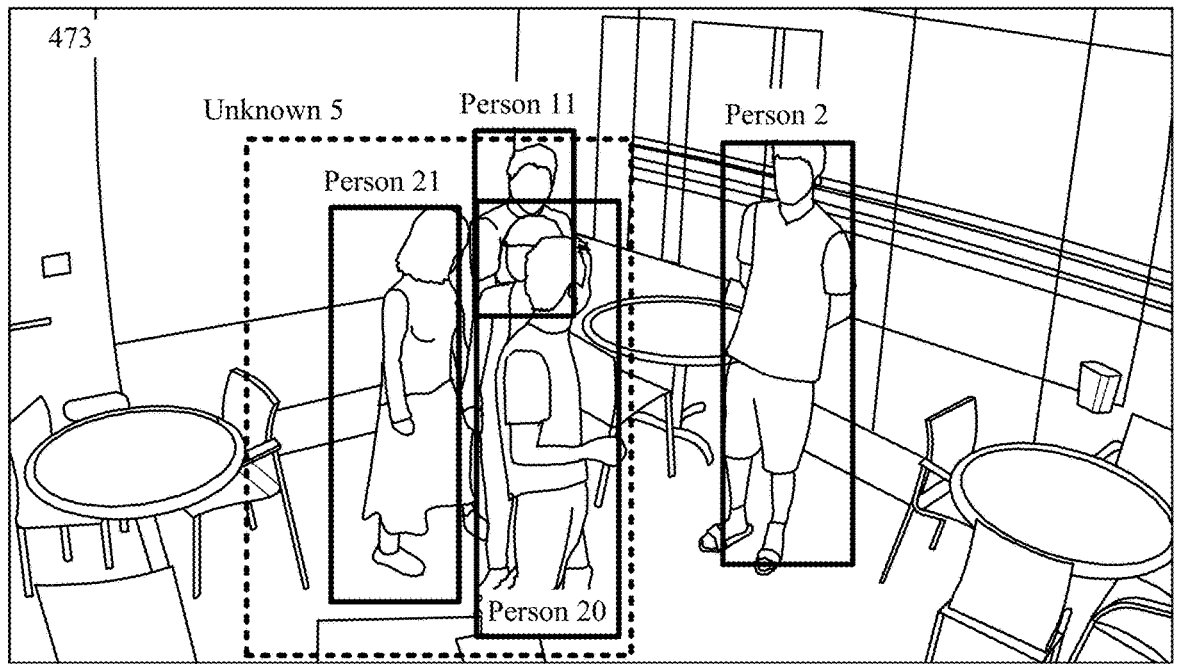
FIG. 44 is another video frame of a crowd scene, in accordance with some examples.

FIG. 44 is another video frame of a crowded scene with several people. In the scene shown in FIG. 44, the anchor system can only detect and track some people coarsely as a merged group (the large dotted bounding box with label "unknown 5").

Figure 45:
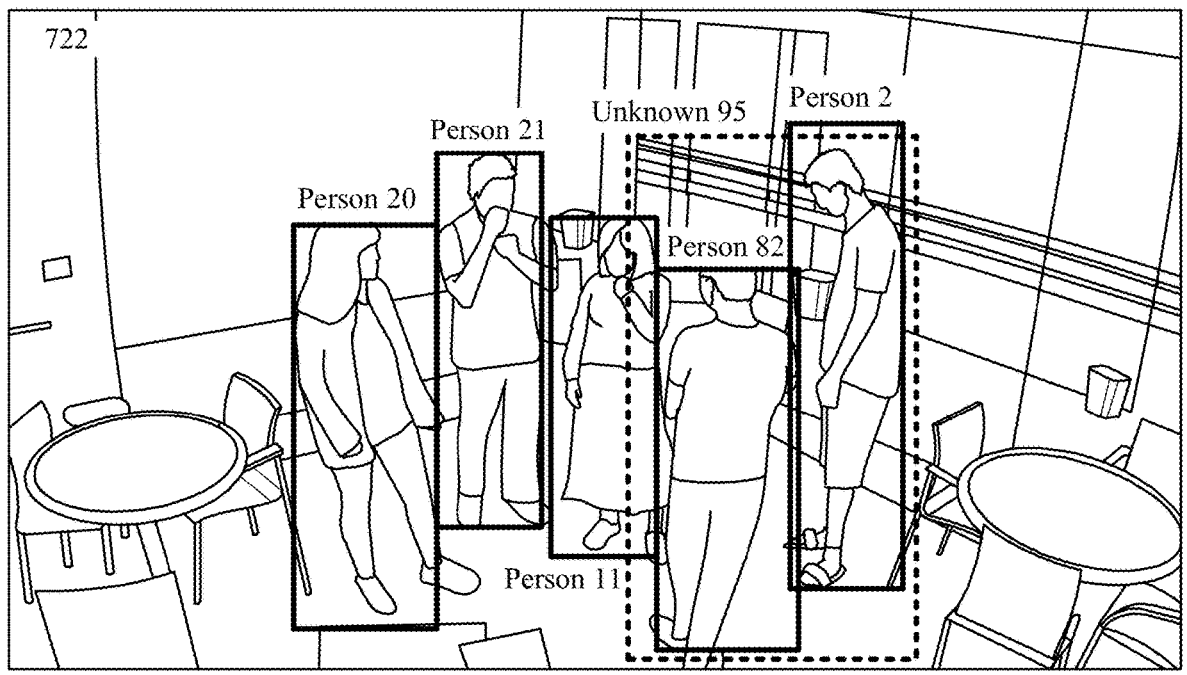
FIG. 45 is another video frame of a crowd scene, in accordance with some examples.

FIG. 45 is a video frame of a crowded scene with several people. In the scene shown in FIG. 45, the anchor system can only detect and track some people coarsely as a merged group (the large dotted bounding box with label "unknown 95").

FIG. 46 is a flowchart illustrating an example of a process 4600 of tracking objects in a sequence of video frames using the techniques described herein. At block 4602, the process 4600 includes obtaining a set of detector bounding regions for a video frame. The detector bounding regions can also be referred to as high confidence bounding regions. The detector bounding regions can include bounding boxes, or regions having any other suitable shape. The set of detector bounding regions are based on application of an object detector to one or more video frames. The set of detector bounding regions are associated with trackers for tracking one or more objects in the video frame. In some cases, the object detector is a complex object detector. In some cases, the object detector (e.g., a complex object detector) can be based on a trained classification network. The object detector can be applied to key frames of the video sequence. As noted above, a key frame is a frame from the sequence of video frames to which the object detector is applied.

At block 4604, the process 4600 includes grouping the set of detector bounding regions into at least a first group of bounding regions and a second group of bounding regions. In some cases, the set of detector bounding regions can be grouped together based on spatial relationships among the detector bounding regions. For example, grouping the set of bounding regions into at least the first group and the second group can include determining a spatial relationship between a first bounding region and a second bounding region, and grouping the first bounding region and the second bounding region into the first group of bounding regions based on the spatial relationship. In some cases, the spatial relationship can include an overlap between the first bounding region and the second bounding region. For example, the first bounding region and the second bounding region can be grouped into the first group of bounding regions when the first bounding region overlaps with the second bounding region. In some examples, two or more groups of bounding regions are merged when at least one bounding region in a group from the two or more groups overlaps with a union of bounding regions in another group from the two or more groups.

At block 4606, the process 4600 includes detecting one or more blobs for the video frame. A blob includes pixels of at least a portion of an object in the video frame. For example, as described above, the blob detection system 1204 can be used to detect or generate the one or more blobs for the video frame. In some cases, blob detection is performed for each video frame of the sequence of video frames to detect one or more blobs in each video frame, and the object detector is applied only to key frames of the sequence of video frames. The frames that the object detector (e.g., the complex object detector) are not applied to are referred to as non-key frames.

At block 4608, the process 4600 includes determining a set of one or more foreground bounding regions for the video frame. The set of one or more foreground bounding regions are associated with the one or more blobs.

At block 4610, the process 4600 includes adding at least one foreground bounding region from the set of one or more foreground bounding regions to the first group. The at least one foreground bounding region can be added to the first group instead of the second group based on a spatial relationship (e.g., an overlap or the like) of the at least one foreground bounding region with the first group and with the second group. For example, the at least one foreground bounding region can be added to the first group based on an overlap between the one or more foreground bounding regions and the first group or the second group. In some cases, the group (e.g., the union of all detector bounding regions within the group) that has the largest overlap with the at least one foreground bounding region can be selected as the group to which the at least one foreground bounding region is added.

At block 4612, the process 4600 includes modifying a first detector bounding region from the first group based on a first foreground bounding region from the first group. As described herein, the first detector bounding region can be modified by shifting a location of the first detector bounding region to align with a location of the first foreground bounding region.

The process 4600 can determine whether the first group is a crowd group. Once the first group is determined to be a crowd group, the first detector bounding region can be modified based on the first foreground bounding region. Determining whether the first group is a crowd group can be based on one or more factors, which can be considered individually or in combination.

For example, in some cases, determining whether the first group is a crowd group can include determining that a number of detector bounding regions in the first group is greater than a threshold number of detector bounding regions. In such cases, the process 4600 can determine that the first group is a crowd group based on the number of detector bounding regions in the first group being greater than the threshold number of detector bounding regions. In some cases, determining whether the first group is a crowd group can include determining that a number of foreground bounding regions in the first group is greater than a threshold number of foreground bounding regions. In such cases, the process 4600 can determine that the first group is a crowd group based on the number of detector bounding regions in the first group being greater than the threshold number of detector bounding regions and also based on the number of foreground bounding regions in the first group being greater than the threshold number of foreground bounding regions.

In some cases, determining whether the first group is a crowd group can include determining a sum of sizes of one or more foreground bounding regions in the first group is less than a sum of sizes of one or more detector bounding regions in the first group. In such cases, the process 4600 can determine that the first group is a crowd group based on the sum of sizes of the one or more foreground bounding regions in the first group being less than the sum of sizes of the one or more detector bounding regions in the first group. In some examples, the process 4600 can determine that the first group is a crowd group based on the number of detector bounding regions in the first group being greater than the threshold number of detector bounding regions, based on the number of foreground bounding regions in the first group being greater than the threshold number of foreground bounding regions, and based on the sum of sizes of the one or more foreground bounding regions in the first group being less than the sum of sizes of the one or more detector bounding regions in the first group. Other factors can also be considered when determining whether a group is a crowd group.

In some cases, the process 4600 can include obtaining a plurality of foreground bounding regions that are in the first group, and selecting the first foreground bounding region from the first group to use for modifying the first detector bounding region. In some examples, the first foreground bounding region can be selected based on its size. For example, the process 4600 can determine that the first foreground bounding region is a largest foreground bounding region in the first group, and can select the first foreground bounding region based on the first foreground bounding region being the largest foreground bounding region in the first group. In some examples, a threshold size can be considered when selecting the first foreground bounding region to use for modifying the first detector bounding region. For example, the process 4600 can determine the first foreground bounding region is larger than a threshold size, and can select the first foreground bounding region based on the first foreground bounding region being the largest foreground bounding region in the first group and based on the first foreground bounding region being larger than the threshold size.

In some cases, the process 4600 can include determining that multiple detector bounding regions in the first group are associated with the first foreground bounding region in the first group. The process 4600 can determine costs associated with the multiple detector bounding regions. As described above, a cost associated with a detector bounding region is based on an amount the detector bounding region needs to be modified to be aligned with the first foreground bounding region. The process 4600 can determine, based on a cost associated with the first detector bounding region being a lowest cost among the determined costs, to modify the first detector bounding region based on the first foreground bounding region. For example, in such cases, the lowest cost detector bounding region can be modified to be align with a portion of the first foreground bounding region.

In some aspects, the process 4600 can include determining one or more detector bounding regions from a boundary region of the first group. For example, the one or more detector bounding regions can be determined from the boundary region of the first group once the first detector bounding region has been modified and removed from a he list of high confidence trackers maintained for the group. The process 4600 can determine an amount of overlap between each of the one or more detector bounding regions and one or more remaining foreground bounding regions in the first group. The process 4600 can then determine a second detector bounding region from the one or more detector bounding regions. The second detector bounding region can be determined based on the second detector bounding region having a largest amount of overlap with the one or more remaining foreground bounding regions in the first group. The process 4600 can also determine a second foreground bounding region from the one or more remaining foreground bounding regions that has a largest spatial relationship with the second detector bounding region. The second detector bounding region can then be modified based on the second foreground bounding region from the first group.

In some examples, the process 4600 can refine the first group of bounding regions. For example, the region refinement process described above can be used to refine the first group of bounding regions. In such examples, refining the first group of bounding regions can include checking a detector bounding region by removing the detector bounding region from the first group of bounding regions, and determining whether foreground bounding regions from the group still overlap with the detector bounding regions that remain in the group. For example, the process 4600 can determine a union region of a set of remaining bounding regions in the first group after the detector bounding region has been removed, and can determine whether all foreground bounding regions in the first group are overlapping with the union region. If all foreground bounding regions in the first group are overlapping with the union region, the process 4600 can update the first group of detector bounding regions by excluding the detector bounding region from the first group.

At block 4614, the process 4600 includes performing object tracking for an object in the video frame using the modified first detector bounding region. In some cases, the object tracking can be performed by the object tracking system 1206 described above. For instance, the modified first detector bounding region can be used by the object tracking system 1206 when performing cost determination (by the cost determination engine 412) and data association (by the data association engine 414).

In some examples, the process 4600 may be performed by a computing device or an apparatus. In one illustrative example, the process 4600 can be performed by the hybrid video analytics system 1200 shown in FIG. 12. In some cases, the computing device or apparatus may include a processor, microprocessor, microcomputer, or other component of a device that is configured to carry out the steps of process 4600. In some examples, the computing device or apparatus may include a camera configured to capture video data (e.g., a video sequence) including video frames. For example, the computing device may include a camera device (e.g., an IP camera or other type of camera device) that may include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 4600 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 4600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As described above, various neural network-based detectors can be used by the deep learning system 1208. Illustrative examples of deep neural networks include a convolutional neural network (CNN), an autoencoder, a deep belief net (DBN), a Recurrent Neural Networks (RNN), or any other suitable neural network. In one illustrative example, a deep learning detector applied by the deep learning system 1208 can include any suitable deep network based detector, such as a single-shot detector (SSD) (as described above with respect to FIG. 8A-FIG. 8C), a YOLO detector (as described above with respect to FIG. 9A-FIG. 9C), or other suitable detector that operates using a deep neural network. Illustrative examples of deep neural networks include a convolutional neural network (CNN), an autoencoder, a deep belief net (DBN), a Recurrent Neural Networks (RNN), or any other suitable deep network.

Figure 47:
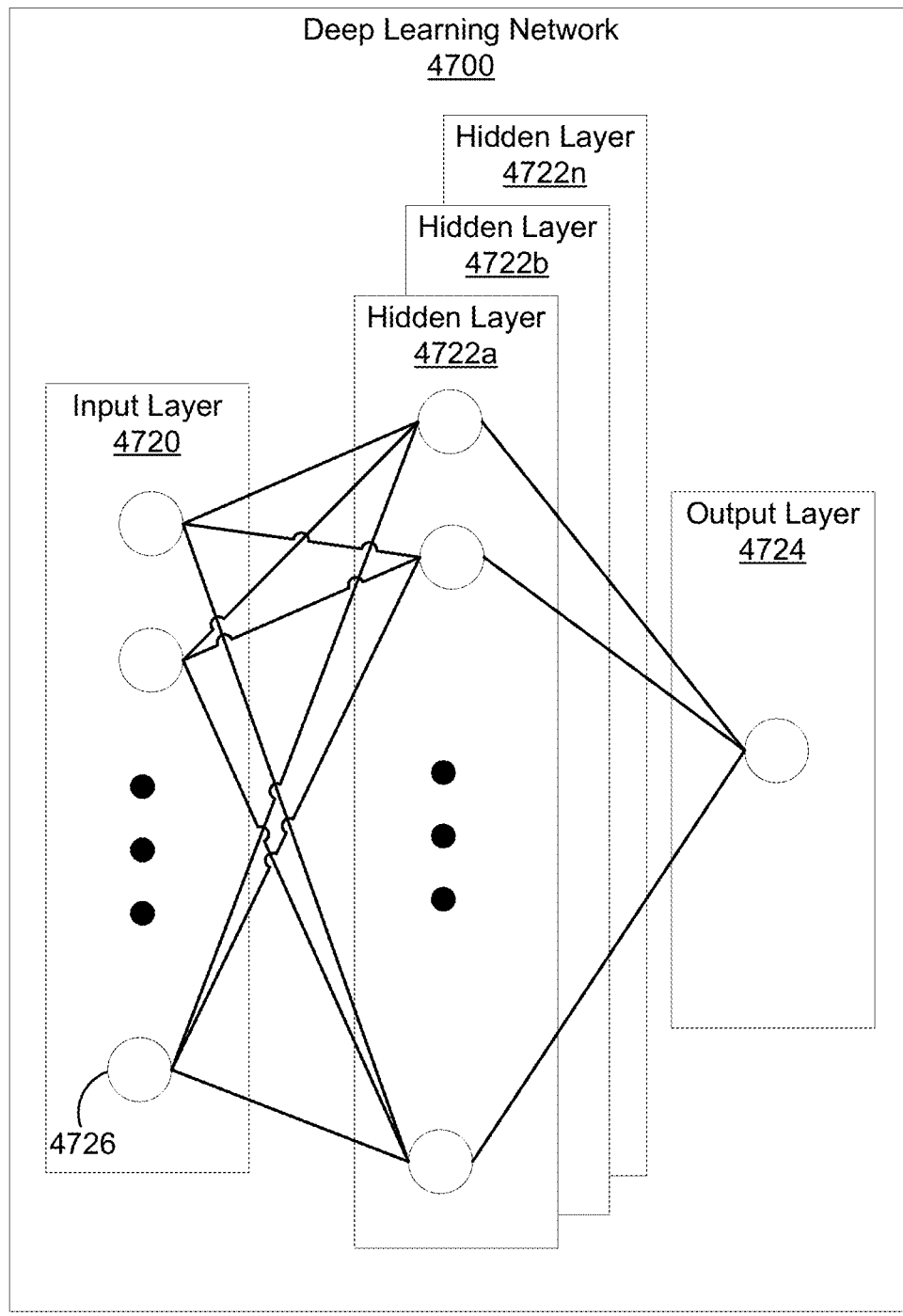
FIG. 47 is a block diagram illustrating an example of a deep learning network, in accordance with some examples.

FIG. 47 is an illustrative example of a deep learning network 4700. An input layer 4720 includes input data. In one illustrative example, the input layer 4720 can include data representing the pixels of an input video frame. The deep learning network 4700 includes multiple hidden layers 4722a, 4722b, through 4722n. The hidden layers 4722a, 4722b, through 4722n include "n" number of hidden layers, where "n" is an integer greater than or equal to one. The number of hidden layers can be made to include as many layers as needed for the given application. The deep learning network 4700 further includes an output layer 4724 that provides an output resulting from the processing performed by the hidden layers 4722a, 4722b, through 4722n. In one illustrative example, the output layer 4724 can provide a classification and/or a localization for an object in an input video frame. The classification can include a class identifying the type of object (e.g., a person, a dog, a cat, or other object) and the localization can include a bounding box indicating the location of the object.

The deep learning network 4700 is a multi-layer neural network of interconnected nodes. Each node can represent a piece of information. Information associated with the nodes is shared among the different layers and each layer retains information as information is processed. In some cases, the deep learning network 4700 can include a feed-forward network, in which case there are no feedback connections where outputs of the network are fed back into itself. In some cases, the network 4700 can include a recurrent neural network, which can have loops that allow information to be carried across nodes while reading in input.

Information can be exchanged between nodes through node-to-node interconnections between the various layers. Nodes of the input layer 4720 can activate a set of nodes in the first hidden layer 4722a. For example, as shown, each of the input nodes of the input layer 4720 is connected to each of the nodes of the first hidden layer 4722a. The nodes of the hidden layer 4722 can transform the information of each input node by applying activation functions to these information. The information derived from the transformation can then be passed to and can activate the nodes of the next hidden layer 4722b, which can perform their own designated functions. Example functions include convolutional, up-sampling, data transformation, and/or any other suitable functions. The output of the hidden layer 4722b can then activate nodes of the next hidden layer, and so on. The output of the last hidden layer 4722n can activate one or more nodes of the output layer 4724, at which an output is provided. In some cases, while nodes (e.g., node 4726) in the deep learning network 4700 are shown as having multiple output lines, a node has a single output and all lines shown as being output from a node represent the same output value.

In some cases, each node or interconnection between nodes can have a weight that is a set of parameters derived from the training of the deep learning network 4700. For example, an interconnection between nodes can represent a piece of information learned about the interconnected nodes. The interconnection can have a tunable numeric weight that can be tuned (e.g., based on a training dataset), allowing the deep learning network 4700 to be adaptive to inputs and able to learn as more and more data is processed.

The deep learning network 4700 is pre-trained to process the features from the data in the input layer 4720 using the different hidden layers 4722a, 4722b, through 4722n in order to provide the output through the output layer 4724. In an example in which the deep learning network 4700 is used to identify objects in images, the network 4700 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the deep neural network 4700 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the network 4700 is trained well enough so that the weights of the layers are accurately tuned.

For the example of identifying objects in images, the forward pass can include passing a training image through the network 4700. The weights are initially randomized before the deep neural network 4700 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the network 4700, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the network 4700 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma \frac{1}{2}(\text{target}-\text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The deep learning network 4700 can perform a backward pass by determining which inputs (weights)

most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The deep learning network 4700 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The deep learning network 4700 can include any other deep network other than a CNN, such as an autoencoder, a deep belief nets (DBNs), a Recurrent Neural Networks (RNNs), among others.

Figure 48:
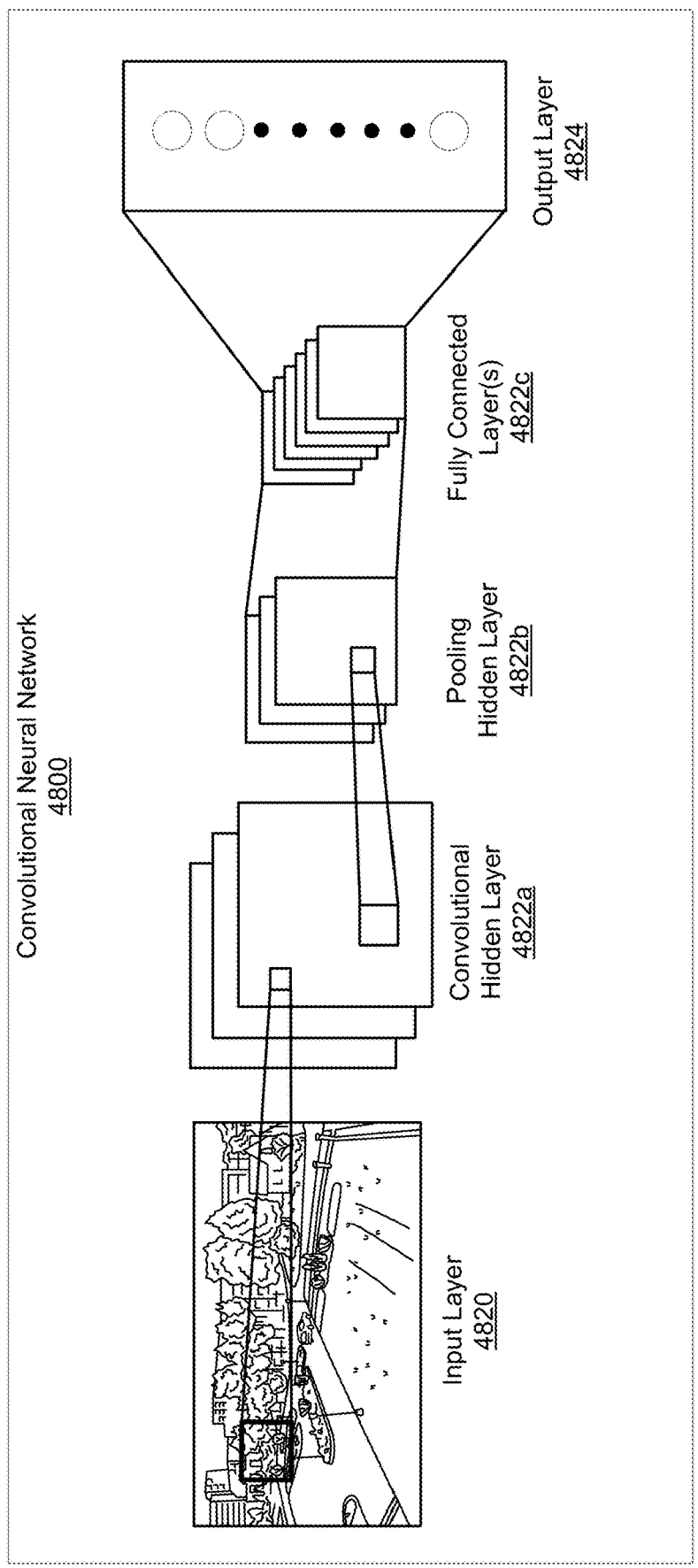
FIG. 48 is a block diagram illustrating an example of a convolutional neural network, in accordance with some examples.

FIG. 48 is an illustrative example of a convolutional neural network 4800 (CNN 4800). The input layer 4820 of the CNN 4800 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 4822a, an optional non-linear activation layer, a pooling hidden layer 4822b, and fully connected hidden layers 4822c to get an output at the output layer 4824. While only one of each hidden layer is shown in FIG. 48, one of ordinary skill will appreciate that multiple convolutional hidden layers, non-linear layers, pooling hidden layers, and/or fully connected layers can be included in the CNN 4800. As previously described, the output can indicate a single class of an object or can include a probability of classes that best describe the object in the image.

The first layer of the CNN 4800 is the convolutional hidden layer 4822a. The convolutional hidden layer 4822a analyzes the image data of the input layer 4820. Each node of the convolutional hidden layer 4822a is connected to a region of nodes (pixels) of the input image called a receptive field. The convolutional hidden layer 4822a can be considered as one or more filters (each filter corresponding to a different activation or feature map), with each convolutional iteration of a filter being a node or neuron of the convolutional hidden layer 4822a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 4822a. Each connection between a node and a receptive field for that node learns a weight and, in some cases, an overall bias such that each node learns to analyze its particular local receptive field in the input image. Each node of the hidden layer 4822a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 4822a is due to each node of the convolutional layer being applied to its corresponding receptive field. For example, a filter of the convolutional hidden layer 4822a can begin in the top-left corner of the input image array and can convolve around the input image. As noted above, each convolutional iteration of the filter can be considered a node or neuron of the convolutional hidden layer 4822a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 4822a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 4822a.

The mapping from the input layer to the convolutional hidden layer 4822a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 4822a can include several activation maps in order to identify multiple features in an image. The example shown in FIG. 48 includes three activation maps. Using three activation maps, the convolutional hidden layer 4822a can detect three different kinds of features, with each feature being detectable across the entire image.

In some examples, a non-linear hidden layer can be applied after the convolutional hidden layer 4822a. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the network 4800 without affecting the receptive fields of the convolutional hidden layer 4822a.

The pooling hidden layer 4822b can be applied after the convolutional hidden layer 4822a (and after the non-linear hidden layer when used). The pooling hidden layer 4822b is used to simplify the information in the output from the convolutional hidden layer 4822a. For example, the pooling hidden layer 4822b can take each activation map output from the convolutional hidden layer 4822a and generates a condensed activation map (or feature map) using a pooling function. Max-pooling is one example of a function performed by a pooling hidden layer. Other forms of pooling functions be used by the pooling hidden layer 4822a, such as average pooling, L2-norm pooling, or other suitable pooling functions. A pooling function (e.g., a max-pooling filter, an L2-norm filter, or other suitable pooling filter) is applied to each activation map included in the convolutional hidden layer 4822a. In the example shown in FIG. 48, three pooling filters are used for the three activation maps in the convolutional hidden layer 4822a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 4822a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 4822a having a dimension of 24×24 nodes, the output from the pooling hidden layer 4822b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 4800.

The final layer of connections in the network is a fully-connected layer that connects every node from the pooling hidden layer 4822b to every one of the output nodes in the output layer 4824. Using the example above, the input layer includes 28×28 nodes encoding the pixel intensities of the input image, the convolutional hidden layer 4822a includes 3×24'24 hidden feature nodes based on application of a 5×5 local receptive field (for the filters) to three activation maps, and the pooling layer 4822b includes a layer of 3×12×12 hidden feature nodes based on application of max-pooling filter to 2×2 regions across each of the three feature maps. Extending this example, the output layer 4824 can include ten output nodes. In such an example, every node of the 3×12×12 pooling hidden layer 4822b is connected to every node of the output layer 4824.

The fully connected layer 4822c can obtain the output of the previous pooling layer 4822b (which should represent the activation maps of high-level features) and determines the features that most correlate to a particular class. For example, the fully connected layer 4822c layer can determine the high-level features that most strongly correlate to a particular class, and can include weights (nodes) for the high-level features. A product can be computed between the weights of the fully connected layer 4822c and the pooling hidden layer 4822b to obtain probabilities for the different classes. For example, if the CNN 4800 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 4824 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

The video analytics operations discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. An apparatus for tracking objects in one or more video frames, comprising:
   a memory configured to store the one or more video frames; and
   a processor coupled to the memory and configured to:
      determine a first set of one or more bounding regions for a video frame based on a trained classification network applied to the video frame, wherein the first set of one or more bounding regions are associated with one or more objects in the video frame;
      detect one or more blobs for the video frame, wherein a blob includes pixels of at least a portion of an object in the video frame;
      determine a second set of one or more bounding regions for the video frame, wherein the second set of one or more bounding regions are associated with the one or more blobs;
      determine a final set of bounding regions for the video frame using the first set of one or more bounding regions and the second set of one or more bounding regions, wherein the final set of one or more bounding regions includes at least a portion of a bounding region of the second set of one or more bounding regions that is not associated with any bounding regions of the first set of one or more bounding regions; and
      perform object tracking for the video frame using the final set of one or more bounding regions.

2. The apparatus of claim 1, wherein the video frame is part of a sequence of video frames, wherein blob detection is performed for each video frame of the sequence to detect one or more blobs in each video frame, and wherein the trained classification network is applied to less than all video frames of the sequence of video frames.

3. The apparatus of claim 1, wherein a bounding region of the first set of one or more bounding regions is associated with an object classification, the object classification indicating a category of an object associated with the bounding region.

4. The apparatus of claim 1, wherein the processor is further configured to:
   identify an object classification associated with a bounding region of the first set of one or more bounding regions, the object classification indicating a category of an object associated with the bounding region;
   determine the category of the object is not a category of interest; and
   remove the bounding region from the first set of one or more bounding regions in response to determining the category of the object is not a category of interest.

5. The apparatus of claim 1, wherein the processor is further configured to:
   determine an overlapping region between a first bounding region of the first set of one or more bounding regions and a second bounding region of the second set of one or more bounding regions;
   determine an area of the first bounding region or the second bounding region within the overlapping region is greater than an overlapping threshold; and
   determine the first bounding region is associated with the second bounding region in response to determining the area of the first bounding region or the second bounding region within the overlapping region is greater than the overlapping threshold.

6. The apparatus of claim 1, wherein determining the final set of one or more bounding regions includes:
   determining a bounding region of the second set of one or more bounding regions is not associated with any bounding regions of the first set of one or more bounding regions; and
   excluding the bounding region from the final set of one or more bounding regions in response to determining the bounding region is not associated with any bounding regions of the first set of one or more bounding regions.

7. The apparatus of claim 6, wherein the bounding region is removed from the second set of one or more bounding regions only when at least one of an indoor scene is captured by the video frame or when objects of interest in the scene are larger than a threshold size.

8. The apparatus of claim 1, wherein the processor is further configured to:
   determine a confidence value associated with a bounding region of the first set of one or more bounding regions is above a confidence threshold; and
   determine that, during object tracking for the video frame, a tracker associated with the bounding region will be output in response to determining the confidence value associated with the bounding region is above the confidence threshold.

9. The apparatus of claim 1, wherein determining the final set of one or more bounding regions includes:
   determining a confidence value associated with a first bounding region of the first set of one or more bounding regions is above a confidence threshold;
   determining a second bounding region of the second set of one or more bounding regions that is associated with the first bounding region of the first set of one or more bounding regions; and
   excluding the second bounding region from the final set of one or more bounding regions in response to determining the confidence value associated with the first bounding region is above the confidence threshold.

10. The apparatus of claim 1, wherein determining the final set of one or more bounding regions includes:
    determining a confidence value associated with a bounding region of the first set of one or more bounding regions is below a confidence threshold;
    determining the bounding region is associated with at least one bounding region of the second set of one or more bounding regions; and
    adding the bounding region to the final set of one or more bounding regions in response to determining the bounding region is associated with at least one bounding region of the second set of one or more bounding regions.

11. The apparatus of claim 1, wherein determining the final set of one or more bounding regions includes:
    determining a confidence value associated with a bounding region of the first set of one or more bounding regions is below a confidence threshold;
    determining the bounding region is not associated with any bounding regions of the second set of one or more bounding regions; and
    excluding the bounding region from the final set of one or more bounding regions in response to determining the bounding region is not associated with any bounding regions of the second set of one or more bounding regions.

12. The apparatus of claim 11, wherein the bounding region is excluded from the final set of one or more bounding regions only when at least one of an outdoor scene is captured by the video frame or when objects of interest in the scene are smaller than a threshold size.

13. The apparatus of claim 1, wherein determining the final set of one or more bounding regions includes:
    determining a bounding region of the second set of one or more bounding regions is associated with at least two bounding regions of the first set of one or more bounding regions; and
    adding the at least two bounding regions to the final set of one or more bounding regions in response to determining the bounding region is associated with at least two bounding regions of the first set of one or more bounding regions.

14. The apparatus of claim 1, wherein determining the final set of one or more bounding regions includes:
    determining a bounding region of the second set of one or more bounding regions is associated with at least one bounding region of the first set of one or more bounding regions; and
    determining first bounding region is associated with a true positive object in response to determining the bounding region is associated with at least one bounding region of the first set of one or more bounding regions.

15. The apparatus of claim 14, wherein the processor is further configured to replace the bounding region with the at least one bounding region of the first set of one or more bounding regions.

16. The apparatus of claim 1, wherein the at least a portion of the boundary region of the second set of one or more bounding regions does not overlap a bounding region of the first set of one or more bounding regions.

17. The apparatus of claim 16, wherein the bounding region is added to the final set of one or more bounding regions only when at least one of an outdoor scene is captured by the video frame or when objects of interest in the scene are smaller than a threshold size.

18. The apparatus of claim 1, wherein the processor is further configured to:
    obtain a subsequent video frame, the subsequent video frame being obtained later in time than the video frame, wherein the trained classification network is not applied to the subsequent video frame;
    determine, for the subsequent video frame, an associated bounding region is not detected for a bounding region of the first set of one or more bounding regions determined for the video frame; and
    maintaining, for the subsequent video frame, the bounding region of the first set of one or more bounding region determined for the video frame.

19. The apparatus of claim 1, further comprising:
    grouping the first set of one or more bounding regions into at least a first group of bounding regions and a second group of bounding regions;
    adding at least one bounding region from the second set of one or more bounding regions to the first group;
    modifying a first bounding region from the first group based on a second bounding region from the first group, the second bounding region being from the added at least one bounding region from the second set of one or more bounding regions; and
    performing object tracking for an object in the video frame using the modified first bounding region.

20. The apparatus of claim 19, wherein modifying the first bounding region from the first group based on the second bounding region from the first group includes shifting a location of the first bounding region to align with a location of the second bounding region.

21. The apparatus of claim 19, wherein grouping the first set of one or more bounding regions into at least the first group and the second group comprises:
   determining a spatial relationship between at least two bounding regions from the first set of one or more bounding regions; and
   grouping the at least two bounding regions into the first group of bounding regions based on the spatial relationship.

22. The apparatus of claim 21, wherein the spatial relationship includes an amount of overlap between the at least two bounding regions, and wherein the at least two bounding regions are grouped into the first group of bounding regions when the at least two bounding regions overlap.

23. The apparatus of claim 1, further comprising a camera for capturing the one or more video frames.

24. The apparatus of claim 1, further comprising a display for displaying the one or more video frames.

25. A method of tracking objects in one or more video frames, the method comprising:
   determining a first set of one or more bounding regions for a video frame based on a trained classification network applied to the video frame, wherein the first set of one or more bounding regions are associated with one or more objects in the video frame;
   detecting one or more blobs for the video frame, wherein a blob includes pixels of at least a portion of an object in the video frame;
   determining a second set of one or more bounding regions for the video frame, wherein the second set of one or more bounding regions are associated with the one or more blobs;
   determining a final set of bounding regions for the video frame using the first set of one or more bounding regions and the second set of one or more bounding regions, wherein the final set of one or more bounding regions includes at least a portion of a bounding region of the second set of one or more bounding regions that is not associated with any bounding regions of the first set of one or more bounding regions; and
   performing object tracking for the video frame using the final set of one or more bounding regions.

26. The method of claim 25, wherein the video frame is part of a sequence of video frames capturing images of a scene, wherein blob detection is performed for each video frame of the sequence to detect one or more blobs in each video frame, and wherein the trained classification network is applied to less than all video frames of the sequence of video frames.

27. The method of claim 25, wherein a bounding region of the first set of one or more bounding regions is associated with an object classification, the object classification indicating a category of an object associated with the bounding region.

28. The method of claim 25, further comprising:
   identifying an object classification associated with a bounding region of the first set of one or more bounding regions, the object classification indicating a category of an object associated with the bounding region;
   determining the category of the object is not a category of interest; and
   removing the bounding region from the first set of one or more bounding regions in response to determining the category of the object is not a category of interest.

29. The method of claim 25, further comprising:
   determining an overlapping region between a first bounding region of the first set of one or more bounding regions and a second bounding region of the second set of one or more bounding regions;
   determining an area of the first bounding region or the second bounding region within the overlapping region is greater than an overlapping threshold; and
   determining the first bounding region is associated with the second bounding region in response to determining the area of the first bounding region or the second bounding region within the overlapping region is greater than the overlapping threshold.

30. The method of any claim 25, wherein determining the final set of one or more bounding regions includes:
   determining a bounding region of the second set of one or more bounding regions is not associated with any bounding regions of the first set of one or more bounding regions; and
   excluding the bounding region from the final set of one or more bounding regions in response to determining the bounding region is not associated with any bounding regions of the first set of one or more bounding regions.

* * * * *